(12) United States Patent
Ensing

(10) Patent No.: US 11,615,134 B2
(45) Date of Patent: *Mar. 28, 2023

(54) SYSTEMS AND METHODS FOR GENERATING TARGETED MEDIA CONTENT

(71) Applicant: Maris Jacob Ensing, Orange, CA (US)

(72) Inventor: Maris Jacob Ensing, Orange, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 17/334,035

(22) Filed: May 28, 2021

(65) Prior Publication Data

US 2021/0294837 A1 Sep. 23, 2021

Related U.S. Application Data

(63) Continuation-in-part of application No. 17/079,042, filed on Oct. 23, 2020, now Pat. No. 11,157,548,
(Continued)

(51) Int. Cl.
*G06F 16/535* (2019.01)
*G06V 40/12* (2022.01)
(Continued)

(52) U.S. Cl.
CPC ............ *G06F 16/535* (2019.01); *G06V 20/52* (2022.01); *G06V 20/625* (2022.01); *G06V 40/1365* (2022.01); *G06V 40/16* (2022.01)

(58) Field of Classification Search
CPC .... G06F 16/535; G06F 16/532; G06F 16/587; G06F 16/29; G06F 3/0482; G06F 2221/2111; G06F 2201/805; G06F 21/88; G06F 21/32; G06F 21/31; G06F 21/554; G06F 2221/2149; G06F 21/50;
(Continued)

(56) References Cited

U.S. PATENT DOCUMENTS 4,769,697 A 9/1988 Gilley et al.
6,072,894 A 6/2000 Payne
(Continued)

FOREIGN PATENT DOCUMENTS

KR 10-2011-0137469 A 12/2011
KR 10-2016-0027576 A 3/2016
(Continued)

OTHER PUBLICATIONS

U.S. Appl. No. 17/079,042, filed Oct. 23, 2020.
(Continued)

*Primary Examiner* — Nimesh Patel
(74) *Attorney, Agent, or Firm* — KOS IP Law LLP

(57) ABSTRACT

Systems and methods for generating targeted media content capture an image from an image capture device. The system may analyze the image to recognize a visual identifier for each entity in the image, each of which may have one or more group identifiers. The system may aggregate the group identifiers to identify the number of each group in the audience area and select media content to display to the audience based on the aggregate numbers of each group identified in the audience area. The system may also derive time restrictions for groups identified in the audience area to help optimize how groups traverse through one or more areas.

20 Claims, 47 Drawing Sheets

Related U.S. Application Data which is a continuation of application No. 16/380,847, filed on Apr. 10, 2019, now Pat. No. 10,831,817, which is a continuation-in-part of application No. 16/142,435, filed on Sep. 26, 2018, now Pat. No. 10,484,818, said application No. 17/079,042 is a continuation-in-part of application No. 16/111,109, filed on Aug. 23, 2018, now abandoned, which is a continuation-in-part of application No. 16/036,625, filed on Jul. 16, 2018, now abandoned.

(51) Int. Cl.
*G06V 20/62* (2022.01)
*G06V 20/52* (2022.01)
*G06V 40/16* (2022.01)

(58) Field of Classification Search
CPC ..... G06F 17/2765; G06F 21/60; G06V 20/52; G06V 20/625; G06V 40/1365; G06V 40/16; G06Q 50/01; G06Q 10/10; G06Q 30/0261; G06Q 10/02; G06Q 30/02; G06Q 30/0601; G06Q 10/00; G06Q 30/0207; G06Q 20/0453; G06Q 20/3278; G06Q 20/40145; G06Q 30/0258; G06Q 30/0259; G06Q 30/0267; G06Q 20/4014; G06Q 20/32; G06Q 50/22; G06Q 50/265; G06Q 30/0643; G06Q 10/1097; H04L 51/32; H04L 67/306; H04L 67/18; H04L 67/02; H04L 51/38; H04L 51/20; H04L 63/0861; H04L 63/107; H04L 43/08; H04L 43/04; H04L 4/02; H04L 12/06; H04L 64/00; H04L 12/08; H04L 12/12; H04L 8/16; H04L 88/02; H04L 4/021; H04L 4/025; H04L 4/027; H04L 4/029; H04L 41/0806; H04L 63/08; H04L 67/303; H04L 63/10; H04L 63/1416; Y02D 70/1262; Y02D 70/142; Y02D 70/144; Y02D 70/146; Y02D 70/164; Y02D 70/22; Y02D 70/1242; Y02D 70/1222; Y02D 10/24; Y02D 70/166; Y02D 70/26; Y02D 70/23; H04W 4/21; H04W 4/02; H04W 4/023; H04W 4/029; H04W 4/021; H04W 52/0254; H04W 4/027; H04W 12/06; H04W 64/00; H04W 52/0258; H04W 12/08; H04W 4/025; H04W 52/0225; H04W 52/0251; H04W 12/12; H04W 8/16; H04W 88/02; H04W 4/90; G06K 9/00288; G06K 9/00677; G06K 9/00711; G06K 9/00228; G06K 9/00013; G06K 9/00221; G06K 9/00335; G06K 9/00369; G06K 9/00778; G06K 9/00302; G06K 9/00771; G06K 9/4642; G06K 9/00785; G01S 2205/006; G01S 2205/008; G01S 5/0009; G01S 5/0018; G01S 5/0054; G01S 19/17; G01S 5/0231; H04N 7/181; H04N 7/188; H04N 21/21805; H04N 21/2187; H04N 21/8153; H04N 5/2259; H04N 5/23206; H04N 5/23212; G08B 13/1963; G08B 21/10; G08B 13/00; G08B 13/1961; G08B 13/19641; G08B 13/19697; G08B 25/006; G08B 25/08; G08B 25/14
See application file for complete search history.

(56) References Cited

U.S. PATENT DOCUMENTS

| | | |
|---|---|---|
| 6,549,118 B1 | 4/2003 | Seal et al. |
| 7,024,180 B2 | 4/2006 | Waters et al. |
| 8,504,843 B2 | 8/2013 | Tu |
| 8,539,357 B2 | 9/2013 | Hildreth |
| 8,589,968 B2 | 11/2013 | Alberth et al. |
| 8,700,451 B2 | 4/2014 | Jayakody |
| 8,712,110 B2 | 4/2014 | Eckhoff et al. |
| 8,725,567 B2 | 5/2014 | Huang et al. |
| 8,791,787 B2 | 7/2014 | Hardacker et al. |
| 8,965,170 B1 | 2/2015 | Benea et al. |
| 9,363,155 B1 | 6/2016 | Gravino et al. |
| 9,575,558 B2 | 2/2017 | Almen et al. |
| 9,767,346 B2 | 9/2017 | Govindara et al. |
| 9,875,719 B2 | 1/2018 | Eckhoff et al. |
| 10,123,066 B2 | 11/2018 | Zhang et al. |
| 10,165,333 B2 | 12/2018 | Patel et al. |
| 10,484,818 B1* | 11/2019 | Ensing .................. H04W 4/02 |
| 10,831,817 B2* | 11/2020 | Ensing .................. G06V 20/52 |
| 11,157,548 B2* | 10/2021 | Ensing .................. G06V 20/52 |
| 2001/0031072 A1 | 10/2001 | Dobashi et al. |
| 2005/0225637 A1 | 10/2005 | Eghbalian |
| 2007/0024580 A1 | 2/2007 | Sands et al. |
| 2007/0271580 A1 | 11/2007 | Tescher et al. |
| 2007/0291998 A1 | 12/2007 | Takizawa et al. |
| 2008/0004951 A1 | 1/2008 | Huang et al. |
| 2009/0133051 A1 | 5/2009 | Hildreth |
| 2009/0217315 A1 | 8/2009 | Malik et al. |
| 2010/0071003 A1 | 3/2010 | Sychkov et al. |
| 2010/0177193 A1 | 7/2010 | Flores |
| 2011/0052012 A1 | 3/2011 | Bambha et al. |
| 2011/0072452 A1 | 3/2011 | Shimy et al. |
| 2012/0102409 A1 | 4/2012 | Fan et al. |
| 2012/0174143 A1 | 7/2012 | Zang et al. |
| 2012/0304043 A1 | 11/2012 | Shahraray et al. |
| 2013/0061258 A1 | 3/2013 | Takaya et al. |
| 2013/0125154 A1 | 5/2013 | Price et al. |
| 2013/0194406 A1 | 8/2013 | Liu et al. |
| 2013/0219417 A1 | 8/2013 | Gilson et al. |
| 2013/0243260 A1 | 9/2013 | Burry et al. |
| 2013/0312018 A1 | 11/2013 | Elliott et al. |
| 2014/0140575 A1 | 5/2014 | Wolf |
| 2014/0168477 A1 | 6/2014 | David |
| 2015/0150031 A1 | 5/2015 | Sibbon et al. |
| 2015/0160035 A1 | 6/2015 | Longo et al. |
| 2015/0271548 A1 | 9/2015 | Daub |
| 2015/0304727 A1 | 10/2015 | Vandichalrajan |
| 2015/0319506 A1 | 11/2015 | Kansara et al. |
| 2016/0110591 A1 | 4/2016 | Smith et al. |
| 2016/0140107 A1 | 5/2016 | Cecchi et al. |
| 2016/0343237 A1 | 11/2016 | Herman et al. |
| 2017/0171613 A1 | 6/2017 | Xu et al. |
| 2017/0177923 A1 | 6/2017 | Zheng et al. |
| 2017/0214728 A1 | 7/2017 | Chan et al. |
| 2017/0228804 A1 | 8/2017 | Soni et al. |
| 2017/0289596 A1 | 10/2017 | Krasadakis et al. |
| 2017/0295215 A1 | 10/2017 | Syed |
| 2017/0352256 A1 | 12/2017 | Miwa |
| 2018/0091854 A1 | 3/2018 | Greenberger et al. |
| 2018/0108040 A1 | 4/2018 | Kim et al. |
| 2018/0211187 A1 | 7/2018 | Chen et al. |
| 2018/0357667 A1 | 12/2018 | Hall et al. |
| 2018/0357981 A1 | 12/2018 | Ng et al. |
| 2019/0034710 A1 | 1/2019 | Dickinson et al. |

FOREIGN PATENT DOCUMENTS

| | | |
|---|---|---|
| KR | 10-2017-0011862 A | 2/2017 |
| WO | 2009067670 | 5/2009 |

OTHER PUBLICATIONS

U.S. Appl. No. 16/380,847, filed Apr. 10, 2019.
U.S. Appl. No. 16/142,435, filed Sep. 26, 2018.
U.S. Appl. No. 16/111,109, filed Aug. 23, 2018.

(56) References Cited

OTHER PUBLICATIONS

U.S. Appl. No. 16/036,625, filed Jul. 16, 2018.
Non-Final Office Action on co-pending US application (U.S. Appl. No. 16/036,625) dated Apr. 5, 2019.
Non-Final Office Action on co-pending US application (U.S. Appl. No. 16/142,435) dated Apr. 29, 2019.
Non-Final Office Action on co-pending US application (USSN 16/1111,109) dated Dec. 31, 2019.
International Search Report on corresponding PCT application (PCT/US2019/041431) from International Searching Authority (KIPO) dated Jan. 30, 2020.
Written Opinion on corresponding PCT application (PCT/US2019/041431) from International Searching Authority (KIPO) dated Jan. 30, 2020.
Non-Final Office Action on co-pending US application (U.S. Appl. No. 16/036,625) dated Feb. 24, 2020.
Final Office Action on co-pending US application (U.S. Appl. No. 16/111,109) dated Apr. 2, 2020.
Final Office Action on co-pending US application (U.S. Appl. No. 16/036,625) dated Aug. 21, 2020.
Non-Final Office Action on co-pending US application (U.S. Appl. No. 16/036,625) dated Dec. 28, 2020.
Final Office Action on co-pending US application (U.S. Appl. No. 16/036,625) dated Apr. 1, 2021.

* cited by examiner

SYSTEMS AND METHODS FOR GENERATING TARGETED MEDIA CONTENT

CROSS-REFERENCE TO RELATED APPLICATIONS

This application is a Continuation-In-Part of co-pending U.S. patent application Ser. No. 17/079,042, filed Oct. 23, 2020; which is a Continuation-In-Part of U.S. patent application Ser. No. 16/380,847, filed Apr. 10, 2019, now U.S. Pat. No. 10,831,817; which is a Continuation-In-Part of U.S. patent application Ser. No. 16/142,435, filed Sep. 26, 2018, now U.S. Pat. No. 10,484,818; and a Continuation-In-Part of U.S. patent application Ser. No. 16/111,109, filed Aug. 23, 2018, now abandoned; which was a Continuation-In-Part of U.S. application Ser. No. 16/036,625, filed Jul. 16, 2018. The subject matter of all applications cited herein is hereby incorporated by reference in its entirety as if set forth herein.

FEDERALLY FUNDED RESEARCH OR DEVELOPMENT

Not Applicable

BACKGROUND

The present disclosure relates generally to providing or supplementing media content based on one or more images captured by an image capture device.

There are many types of media delivery systems used by companies to display media to consumers in a variety of locations. Often, to enhance the viewer experience, these media delivery systems will provide media content, for example to inform, educate or entertain a target audience, to guide them around a venue, town or city and/or to advertise goods or services. The media content is often played back on a display using a monitor, projector or other video display device, speakers, headphones, and/or other playback devices, such as, for example, a portable or handheld device (e.g., a tablet or smartphone).

One aspect of providing media content to supplement a media delivery system is providing content that will be of interest or entertaining to the audience members. Each audience may be made up of various members that have different interests and needs. Thus, those skilled in the art are constantly striving to provide systems and methods that provide media content that supplements media delivery systems to meet the needs of each particular audience member.

SUMMARY

Systems and methods in accordance with various aspects of this disclosure provide targeted media content based upon a set of images captured. The media content computer system may be electronically coupled to one or more media content playback devices and image-capturing devices of the system to select media content to play on a media content playback or interactive media device based upon images captured by one or more image capturing devices. An electronic or a functional connection may allow two or more electronic devices to transmit data to one another. An electronic connection may be wired or wireless using any suitable data-coupling technology.

In some embodiments, a set of images is analyzed to determine the most effective targeted media content appropriate for an audience captured in the set of images and that media content may be canned or it may be generated in real time for that audience. One or more images may be generally analyzed by a media content computer system in a set to generate visual identifiers as a function of image fingerprints found in a set of images, for example by transmitting queries to an image database that correlates image fingerprints with visual identifiers.

The media content computer system may also be programmed to analyze visual identifiers to determine related identifiers that are not found in a set of images, for example by transmitting queries to a relationship database that correlates identifiers that are related to one another. Exemplary related identifiers include identifiers of occupants (e.g. drivers and/or passengers, or passengers on public transport) that are known to ride within an identified vehicle, or identifiers of students that are known to follow an identified teacher. In some embodiments, the media content computer system may generate new relationships and/or attributes through analysis of a set of images, and may also create expiration times or new time restrictions for any relationships such that a relationship may be deleted by the system upon a time threshold being reached. For example, a media content computer system may analyze a set of images that contain three people identified via facial recognition algorithms who all enter a vehicle having a license plate or another unique identifier of the vehicle (e.g. a set of dents, scratches, or other imperfections that together may be used to create a unique vehicle fingerprint similar to a facial fingerprint). Unique identifiers of each of the three people and the unique identifier of the vehicle may be associated with one another in the relationship database, such that each person has a relationship with the vehicle. Relationships may be set to expire as a function of an algorithm, for example a person who sits in a driver's seat may be configured to have a permanent relationship or a relationship that expires within a year while a person who sits in a passenger seat may have a relationship set to expire within a threshold time period (e.g. a few days or weeks). Any vehicle capable of holding multiple people could be used, such as a car, a boat, an amusement park vehicle (e.g. roller coaster car or dark ride), or a multi-person bicycle.

An exemplary time restriction attribute may be provided to the system via a third party, such as a vehicle rental company, that restricts the association between a driver and a license plate to the time period when that driver is renting the vehicle. A system may be configured to receive a plurality of attributes from such third parties, such as a time restriction for an associated relationship (e.g. rental vehicle is rented within a defined time period, so the time restricted association between the license plate and the passengers of the vehicle starts at the start of the time period and ends at the end of the time period). With such information, the system may be configured to add a time restriction to passengers captured by an image capture system. For example, the system may capture images of three people exiting a vehicle, and the system may retrieve information on all three people to determine that one of the persons is a renter of the vehicle for a period of time based upon a correlation found between the license plate of the vehicle and a facial fingerprint that identifies the driver of the vehicle. The system may then be configured to register the two other people in the vehicle as passengers of the vehicle for a period of time, such as a day or until termination of the rental period, creating a time restriction relationship between the people and the vehicle that may be saved in an attribute database for retrieval later.

The media content computer system may use some or all of the identifiers to determine attributes that are related to the identifiers, for example by transmitting queries to an attribute database that correlates an identifier with one or more attributes. In some embodiments, the media content computer system may further populate the attribute database by analyzing one or more transactions. A set of images may be taken of an individual identified by their facial fingerprint, and recognition of an action indicative of a transaction taking place, for example a movement to swipe an RFID (Radio Frequency Identifier) chip in front of a gas station pump or a movement to provide a credit card to a cash register attendant. That transaction identifier may be correlated with a transaction that is recorded by a transactional capture device, such as a cash register or a gas station pump via any suitable means, for example via a time-stamp or a bar code, such that transaction information may then be associated with the person's identifier in the attribute database. The transactional capture device may be associated with a unique identifier that may be used to create a relationship between the audience member and the transactional capture device in a relationship database. Such correlation data may be used to associate metrics of the transactional capture device with the audience member, such as the location of the capture device or a good that was purchased by the audience member using the transactional capture device, which may then be saved as attribute data for the audience member and used to select media content.

With such gleaned attributes, one or more samples of media content may be generated, for example by transmitting queries to a media content database that correlates one or more attributes with media content. For example, an individual who purchases a certain type of good may be provided media content associated with that good, or an individual who prefers media content with subtitles may be provided media content with subtitles and an individual who needs guidance is given generated guidance content. The media content system may further monitor individuals' actions in response to the playing media content to alter the media content, for example an individual who is not looking at a display within a threshold period of time may trigger the media content system to cycle the playing media content with a different media content file. Attributes in the attribute database may also further be modified as a function of observed actions.

An attribute for an entity or a group saved in the attribute database may comprise one or more time allocation requirements, which may be used to modify attributes of an entity or a group. A time allocation requirement comprises a time period having requirements associated with the time period, such as a time period to finish touring a venue, (e.g. museum, theme park), a time period they are allowed to dwell (in person or in a vehicle) in a given location or area (e.g. a smart theme park or a smart city), a time period that they are allowed to use public transport or that they are allowed access to a certain route, or a time period to rent a vehicle. One or more time allocation requirements may be used by the media content computer system to prioritize media content that is selected. For example, if an entity or a group of entities has a time allocation requirement of a half an hour to finish touring an area, then the system may select only media content having a playtime of at most half an hour, or may only select media content having routing guidance to direct the entity or group of entities towards exhibits that are labeled as being able to be reviewed within a half an hour. In another example, if an entity or a group of entities has a time allocation requirement of renting a vehicle within a given number of days, then any visual identifiers associated with that vehicle, such as a license plate, may be associated with that entity or group of entities within that given number of days, but may not be associated with that vehicle during time periods outside that given number of days. Any visual identifiers may be used to identify a vehicle, such as a vehicle license plate, a vehicle brand, a vehicle model number, and a vehicle logo, or the occupants or other identifiers in relevant captured imagery related to the vehicle or its surrounding area. In some embodiments, a vehicle may be identified using non-unique identifiers that, in aggregate, uniquely identify the vehicle. For example, a set of dents, scratches, and other imperfections on a vehicle may be used to create a vehicle fingerprint, similar to a facial fingerprint for a human face.

An occupancy database may be used to keep track of an occupancy of exhibits in a venue, such as a museum or a theme park. Any suitable venue may be monitored to provide data that is used to provide media content to attendees, for example a museum, a theme park, a restaurant, a theater, a concert hall, a sports arena, a store, a shopping mall, a drive-through restaurant, a coffee shop, a cruise ship, or even a smart city. The media content computer system could be configured to update the occupancy database using data gleaned from one or more image capture devices. For example, a set of image capture devices could be used to capture a set of images about an exhibit and identify visual identifiers that correspond with a number of entities captured in the set of images. For example, for each distinct face identified in a set of images, the media content computer system may be configured to tally one distinct entity to determine how many people are at an exhibit, and may update the occupancy database with a number of entities at the exhibit at that time. Alternatively, the media content computer system may identify groups in a set of images by identifying visual identifiers in a set of images, retrieve group identifiers associated with the identified image identifiers from the group database, and retrieve a number of entities within each group as an attribute of each group from the attribute database. Using such correlations allows a media content computer system to aggregate a number of entities within a set of images by adding the retrieved number of entities for each identified group in the set of images without needing to individually tally each person identified in a set of images.

The media content computer system may use the occupancy data for each exhibit to guide members through an area by using media content having routing guidance. For example, the media content computer system may be configured to optimize a route to visit preferred exhibits identified in an attribute database by advising groups finished with one exhibit to visit an exhibit with a lower occupancy, in accordance with occupancy data retrieved from an occupancy database. Where the media content system has also retrieved a time allocation requirement for a group, the media content system may determine which exhibits a group may visit in order to satisfy the time allocation requirement, and then may prioritize an exhibit based upon a lower occupancy as compared to the occupancy of another exhibit that satisfies the group's time allocation requirement.

A media content computer system may be programmed to identify a transaction, for example a payment for fuel at a filling station or a payment for one or more items at a cash register or other electronic payment station. In some embodiments, the media content computer system may be programmed with an advanced algorithmic analysis program that recognizes transactional movements and goods from a detailed set of images to derive transaction attributes (e.g., identifies a facial fingerprint, identifies a purchase, and identifies a good to associate an identifier of the facial fingerprint with an attribute of that good, or correlates the transaction with a third party system that provides information on the detail on the purchase or transaction identified). In some embodiments, the media content computer system cooperates with transactional devices or transactional capture devices configured to capture a set of transaction attributes and a captured transaction identifier. Such captured transaction identifiers captured by the transactional capture device may then be matched with generated transaction identifiers derived from an analysis of a set of images. Contemplated transaction identifiers include time-stamp values and partial or whole account numbers (e.g. credit card account numbers or membership IDs). Contemplated transactional capture devices include filling station pumps, service kiosks, and cash register computer systems. Matched transaction identifiers may then be used to update an attribute database using transaction attributes captured by a transactional capture device correlated with identifiers derived from an image fingerprint.

In one embodiment, a media content system and method may also determine playback parameters for the media content. In accordance with some aspects, a configuration of an interactive touchscreen or other input device may be modified based upon the captured image. In accordance with a number of these aspects, a subsequent image may be captured, and the media content and/or playback parameters are updated based upon the subsequent image. For example, an image may identify a height of a person relative to a height of a touchscreen, which triggers the system to move a user interface of the touchscreen to a new height as a function of the person's height, or an image may identify a person having an English primary language attribute, which triggers the system to play media non-English content with English subtitles.

A media content-providing system in accordance with this disclosure may optionally include one or more of an exhibit control system, module, or functionality; a content control system, module, or functionality; an image analysis system, module, or functionality; and a facial recognition system, module, or functionality. The exhibit control function may advantageously be provided by a computer system that is connected to an image capture device (e.g., a camera) focused on an audience area near the exhibit, and one or more media playback devices. Contemplated image capture devices may capture images in one or more spectrums, such as an infrared spectrum or an ultraviolet spectrum. The computer system may control the image capture device to capture images of the audience area, process the image to recognize identifiers associated with attributes, and provide the attributes to a content control system, module, or functionality. The computer system then receives media content information to download media content from a third party or it receives media content directly or modifies media dependent on the attributes. The media content is then played back by the playback devices. The media content information may include playback parameters for the media content, and the computer system may advantageously adjust the playback parameters based on information from the facial recognition system. The content control function may be performed by a computer system, a database storing media content associated with the exhibit, and a database that stores audience member information. The content control system or module receives the image from the exhibit control system or module and provides the image to the image analysis system or module and/or facial recognition system or module. The content control system or module then receives audience information from the image analysis system or module and/or the facial recognition system or module, and it determines the media content and playback parameters that are sent to the exhibit control system or module. The image analysis system or module receives the image of the audience area from the content control system or module, analyzes the image, and returns audience information attributes determined based on the image analysis to the content control system or module.

Contemplated media delivery systems further include any device suitable for delivering media content to an audience member, preferably in a video/audio format, although other forms of media content may be used, for example smell, taste, or tactile formats. In accordance with some aspects of this disclosure, a media delivery system includes an image capture device operable to obtain an image, a media content playback device, a processor, and memory that stores instructions for the processor, media content that may be played on the playback device, and a database that stores identifier relationships between media content and identified entities within a captured image. The instructions cause one or more processors of the media delivery system to receive the image from the image capture device. The image is analyzed to determine image identifiers, and the image identifiers are matched with related media content in the database to determine what types of media are the most appropriate to display on the media content playback device.

In accordance with some other aspects of the disclosure, a method for providing media content for an exhibit is performed in the following manner: An image of an entity is captured by an image capture device. A processor performs image analysis on the captured image to identify one or more image identifiers. The processor then matches the image identifiers against media content that is related with one or more of the image identifiers. The processor then selects media content and transmits it to the media content playback device.

DETAILED DESCRIPTION

Figure 1:
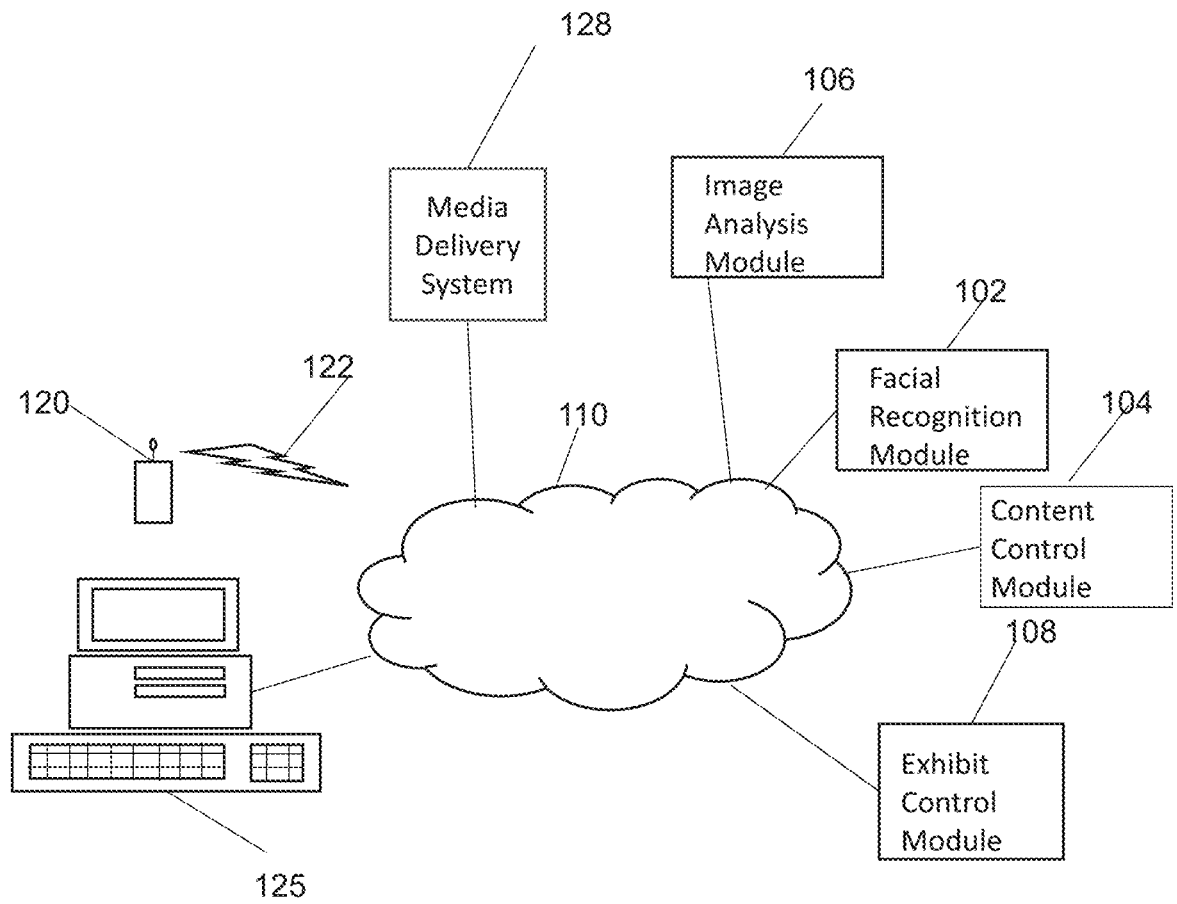
FIG. 1 is a diagrammatic embodiment of systems and devices that perform processes for providing media content to supplement an exhibit in accordance with aspects of the disclosure.

Systems and methods in accordance with various aspects of this disclosure provide targeted media content based upon a set of images captured. A set comprises at least one item, such that a set of images may comprise only a single image, or several images, but never zero images. It should be appreciated that any captured, received, or generated data may comprise a single data element or a plurality of data elements.

Media content that may be provided by the disclosed systems comprises any type of content that may be sensed by human being during playback. Examples of media content include, but are not limited to, visual, audio, tactile, vibrational, smell, taste, or any other form of media that may be sensed by a human user. Accordingly, a media content playback device may be any suitable electronic device that is configured to play the media content to a user, for example a video display, an audio speaker, a braille display, an olfactometer, or any combination thereof.

At least one display and image capturing device are preferably accessed and controlled by a media content computer system that cross-references information gleaned from a set of captured images against one or more databases to select targeted media content. Contemplated computer systems may comprise any suitable combination of computing or compute devices, such as desktops, laptops, cellular phones, blades, servers, interfaces, systems, databases, agents, peers, engines, modules, or controllers, operating individually or collectively. Computer systems may be considered to comprise at least a processor configured to execute software instructions stored on a tangible, non-transitory computer readable storage medium (e.g., hard drive, solid state drive, RAM, flash, ROM, etc.). The software instructions preferably configure the computer system to execute the functionality as disclosed. In some embodiments, a computer system may be distributed across a network, while in other embodiments, a computer system may comprise only a single embedded system.

Aspects of the disclosure may be embodied as a system, method or program code/instructions stored on one or more machine-readable media. Accordingly, aspects may take the form of hardware, software (including firmware, resident software, micro-code, etc.), or a combination of software and hardware aspects that may all generally be referred to as a circuit, module, or system. The functionality provided as individual modules/units in the example illustrations may be organized differently in accordance with any one of platform (operating system and/or hardware), application ecosystem, interfaces, programmer preferences, programming language, administrator preferences, etc.

Any combination of one or more non-transitory machine-readable medium(s) may be utilized. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory machine-readable storage medium may be any tangible medium that may contain or store a program for use by or in connection with an instruction execution system, apparatus, or device. A non-transitory machine-readable storage medium may be machine-readable, but preferably program instructions are not stored on a non-transitory storage medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that may communicate, propagate, or transport a program for use by or in connection with an instruction execution system, apparatus, or device.

Program code such as the C programming language, assembly language, or similar programming languages embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the C programming language or similar programming languages. The program code may execute entirely on a stand-alone machine, may execute in a distributed manner across multiple machines, and may execute on one machine while providing results and or accepting input on another machine.

The program code/instructions may also be stored in a non-transitory machine-readable medium that may direct a machine to function in a particular manner, such that the instructions stored in the machine-readable medium produce an article of manufacture including instructions which implement the function/act specified in the flowchart and/or block diagram block or blocks.

An image fingerprint may comprise any portion of an image that may be analyzed to provide a characteristic. The characteristics may be unique, for example a facial fingerprint used to perform facial recognition on a photo of a person's face, or they may be non-unique, for example a uniform worn by one of a plurality of people within a group. Likewise, identifiers may also be unique, for example a person's social security number or a UID (Unique Identifier assigned by the system), or non-unique, for example a name of a school a group of students attend. Contemplated image fingerprints include facial fingerprints, license plate numbers, logos, bar codes, clothing/accessories, or any other suitable image that may be tagged with a feature. Contemplated identifiers include social security numbers, UIDs, license plate alphanumeric codes, vehicle make/model, and group names (e.g. name of school, name of class, name of company).

An attribute may be saved in any suitable form, for example a numerical value or an alphanumeric string. Contemplated attributes include preferences for goods and/or services (e.g., a preference quantified by a number between 0 and 100) and demographics (e.g., age, sex, race, group membership).

The provided flowcharts aid in understanding the illustrations and are not to be used to limit scope of the claims. The flowcharts depict exemplary operations that may vary within the scope of the claims. Additional operations may be performed; fewer operations may be performed; the operations may be performed in parallel; and the operations may be performed in a different order. Each block of the flowchart illustrations and/or block diagrams, and combinations of blocks in the flowchart illustrations and/or block diagrams, may be implemented programmatically by executing program code on a computer system using one or more processors.

Plural instances may be provided for components, operations or structures described herein as a single instance. Boundaries between various components, operations and data stores may be defined arbitrarily. Particular operations are preferably illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

Cloud Computing: The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" is intended to refer to a plurality of disparate computer systems electronically coupled using a network, and cloud computing allows shared resources, for example, software, data, processors, bandwidth, and information to be available, on-demand, like a public utility.

Exemplary cloud computing providers deliver business applications online which are accessed from another web service or software like a web browser, while the software and data are stored remotely on servers. The cloud computing architecture may use a layered approach for providing application services. A first layer may be an application layer that is executed at client computers. After the application layer, a cloud platform and cloud infrastructure may be implemented, followed by a server layer that includes hardware and computer software designed for cloud specific services. The various disclosed systems may be a part of the server layer for using the innovative techniques described above.

FIG. 1 illustrates a system 100 for providing media content, for example to supplement an exhibit, in accordance with an aspect of the disclosure. The system 100 may include a facial recognition module 102 and/or an image analysis module 106; a content control module 104; and exhibit control module 108, each of which may be communicatively connected to one another by a network 110. A portable personal communication device 120 and a computer 125 may also be connected to the network 110. Although shown as separate devices or functionalities in FIG. 1, the facial recognition module 102, one or more of the content control module 104, the image analysis module 106, and the exhibit control module 108 may be provided by a single computing system, such as a server, or they may be distributed on a cloud computer system or a computer system. Alternatively, the processes that provide one or more of the facial recognition module 102, the content control module 104, the image analysis module 106, and the exhibit control module 108 may be distributed across multiple systems that are communicatively connected via the network 110.

The facial recognition module 102 may be implemented or functionalized by a computer system that includes a memory and a processing unit configured to perform the processes for providing facial recognition, for example by capturing a set of images, identifying facial fingerprints in the set of images, and cross-referencing the identified facial fingerprints against a database that contains relationships between facial fingerprints and identifiers. The computer system that implements the facial recognition module, functionality, or system may include one or more servers, routers, computer systems, and/or memory systems that are communicatively connected via a network to provide facial recognition and/or other image analysis, and to return identifiers that may be used to derive appropriate media content. Such identifiers could be, for example, a unique alphanumeric identifier of a person that can be used to retrieve attributes about the person in a database.

The content control module 104 may be implemented or functionalized by a computer system that includes a memory and a processing unit to perform processes for storing, organizing, and providing media content for one or more exhibits in a venue. The content control module 104 may also advantageously store and update audience information, such as attributes for audience members or identified groups of audience members, for use in determining the media content to provide to a media content playback device, such as one at or near an exhibit or other location of interest. The content control functionality may be provided by a central control computer system for the venue. Specifically, the content control module 104 may be implemented or functionalized by a system that includes one or more servers, routers, computer systems, and/or memory systems that are communicatively connected via a network to store and provide media content for one or more exhibits in the venue, as well as to store and update audience information for use in determining the content to provide to an exhibit.

The image analysis module 106 may be implemented or functionalized by a computer system that includes a memory and a processing unit to perform the processes for providing image analysis. A computer system that implements the image analysis module, functionality, or system may include one or more servers, routers, computer systems, and/or memory systems that are communicatively connected via a network to provide facial recognition and/or other image analysis.

The exhibit control module 108 may be implemented or functionalized by a computer system that controls devices in the exhibit area that include an image capture device and various playback devices for media content that supplements the exhibit. Advantageously, one computer system may control devices for more than one exhibit. An exhibit control module 108 may be implemented or functionalized by a system that includes one or more servers, routers, computer systems, memory systems, an image capture device, and/or media playback devices that are communicatively connected via a local network to obtain and present media content for the exhibit.

The network 110 may advantageously be the Internet. Alternatively, the network 110 may be a Wide Area Network (WAN), a Local Area Network (LAN), or any combination of Internet, WAN, and LAN that may be used communicatively to connect the various devices and/or modules shown in FIG. 1.

The portable personal communication device 120 may comprise a smart phone, tablet, Personal Digital Assistant (PDA), a laptop computer, or any other device that is connectable to the network 110 via wireless connection 122. The computer system 125 may advantageously connect to the network 110 via either a wired or a wireless connection. The computer 125 may be, for example, a desktop computer, a laptop, a smart television, and/or any other device that connects to the network 110. The portable personal communication device 120 and/or the computer 125 allow a user to interact with one or more of the above-described modules to provide information such as, for example, personal information to be added to audience member information of the user. In some embodiments, the portable personal communication device 120 or a media delivery system 128 may be used as the playback device of the supplemental media content for an exhibit.

Although a particular system of devices and/or functional modules is described above with respect to FIG. 1, other system architectures that, add, remove, and/or combine various devices and/or modules may be used to perform various processes in accordance with various other aspects of the disclosure.

Figure 2:
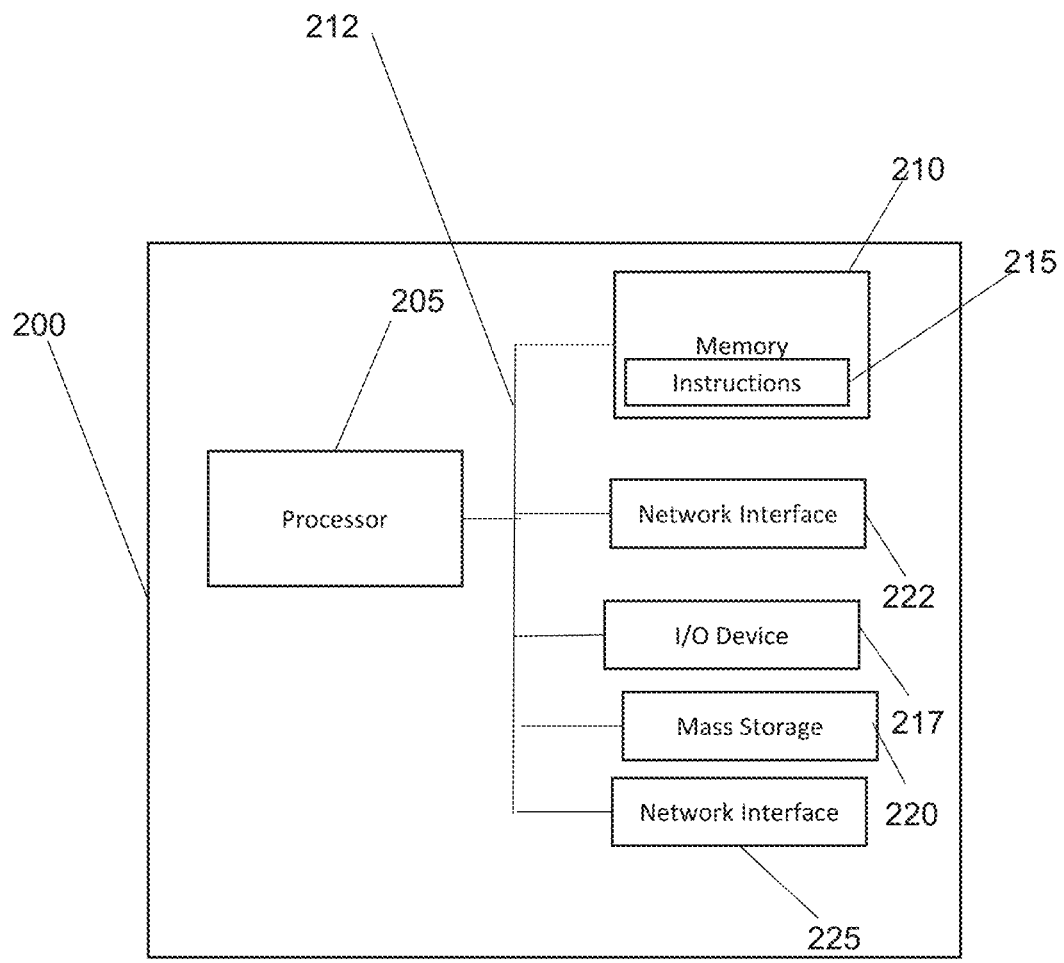
FIG. 2 is a block diagram of an exemplary computer processing system in accordance with an aspect of the disclosure.

FIG. 2 is a high-level block diagram showing an example of the architecture of a processing system 200 that may be used according to some aspects of the disclosure. The processing system 200 may represent a computer system that provides a facial recognition functionality, a content control functionality, an image analysis functionality, an exhibit control functionality, and/or other components or functionalities described herein.

Processing system 200 includes one or more processors 205 in operative communication with a memory 210 and coupled to a bus system 212. The bus system 212, as shown in FIG. 2, is a schematic representation of any one or more separate physical buses and/or point-to-point connections, connected by appropriate bridges, adapters and/or controllers. The bus system 212, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as Firewire).

The one or more processors 205 are the central processing units (CPUs) of the processing system 200 and, thus, control its overall operation. In certain aspects, the one or more processors 205 accomplish this by executing software stored in memory 210. The processor(s) 205 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 210 represents any form of random access memory (RAM), read-only memory (ROM), flash memory, or the like, or a combination of such devices. Memory 210 includes the main memory of the processing system 200. Instructions 215 implementing any of the process steps described herein may reside in memory 210 and may be executed by the processor(s) 205 from memory 210.

Also advantageously connected operatively to the processor(s) 205 through the bus system 212 may be one or more internal or external mass storage devices 220, and a network interface 222. The mass storage device(s) 220 may be, or may include, any conventional medium for storing large volumes of data in a non-volatile manner, such as one or more solid state, magnetic, or optical based disks. The network interface 222 may provide the processing system 200 with the ability to communicate with remote devices (e.g., storage servers) over a network, and may be, for example, an Ethernet adapter, a Fiber Channel adapter, or the like.

The processing system 200 also may advantageously include one or more input/output (I/O) devices 217 operatively coupled to the bus system 212. The I/O devices 217 may include, for example, a display device, a keyboard, a mouse, etc.

Figure 3:
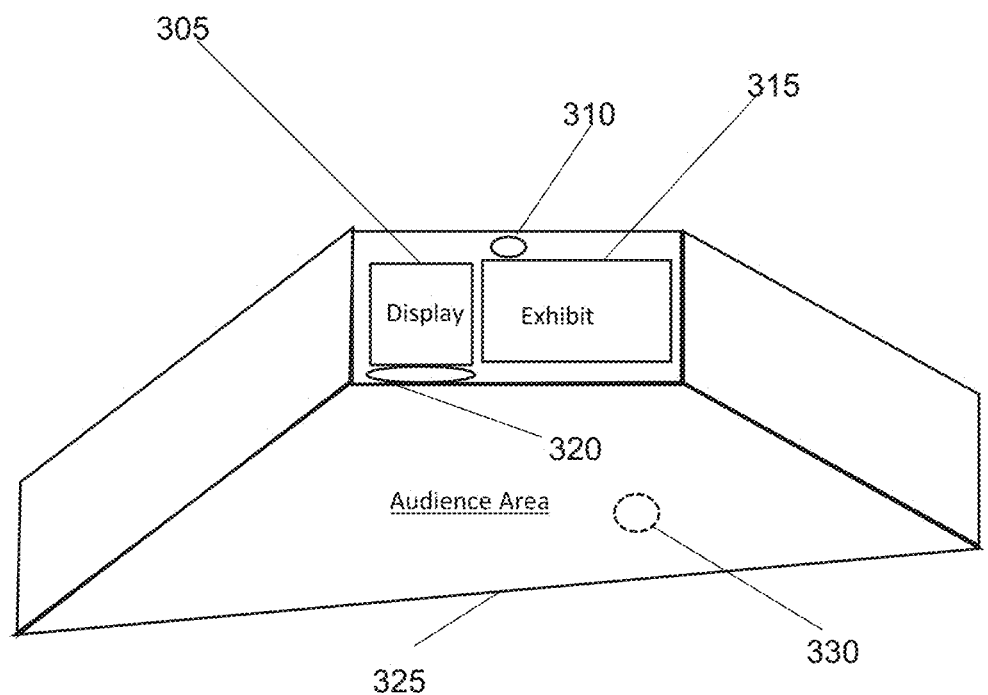
FIG. 3 is conceptual perspective view of an exemplary room with an exhibit including playback devices to provide supplemental media content accordance with an aspect of the disclosure.

FIG. 3 illustrates an exhibit display area. As shown, an exhibit 315 may be located in a room 300. For example, the exhibit 315 may be mounted on a wall of a room (as shown), placed on the floor, or hanging from the ceiling. Alternatively, the exhibit 315 may be disposed on a stage or other raised platform where performances by actors, artists, musicians, or others may be staged.

To provide supplemental media content, one or more media playback devices may be provided to present the supplemental media content to an audience. For example, a personal device, such as a smart phone, tablet, or other media playback device may be carried or worn by one or more audience members and/or exhibit staff members. The personal devices may communicate with the exhibit control module via a wireless connection, either directly to the exhibit control module, or through a network connection in accordance with various aspects to obtain and/or present the supplemental media content.

In FIG. 3, a playback device is shown as a display 305 and speakers 320. The display 305 may comprise a monitor or other video playback device that is located proximate the exhibit 315 to display video content of the supplemental media content for an audience area 325 of the exhibit 315.

The speakers 320 may be auditory playback devices that may advantageously be mounted to the wall, or be standing or disposed proximate the wall, under the display 305, or elsewhere in the room, and may be configured to play auditory content of the supplemental media content. The display 305, speakers 320, and/or other playback devices may be located or mounted anywhere proximate the exhibit 315 to enable an audience member of the exhibit 315 to receive audio and/or video output from a playback device, such as the display 305 and the speakers 320, and may be are advantageously placed to provide sufficient coverage of an audience area 325 to allow a desired number of audience members to view, hear, and/or in some other way sense or experience the presentation of the media content.

An audience area 325 is shown as being proximate the exhibit 315. The audience area 325 may be positioned to allow an audience member in the audience area 325 to simultaneously view the exhibit 315, view the display 305, and listen to audio output from the speakers 320. In FIG. 3, the audience area 325 may be the floor in front of the exhibit 315; however, the audience area 325 may be any defined area where an audience may be expected to stand, sit, or otherwise be disposed to be able to view the exhibit. For example, the audience area 325 may comprise benches or seats in front of an exhibit, such as the exhibit 315. A sensor 330, such as, for example, a pressure sensor, a motion detector, or any other type of sensor that senses the presence of at least one audience member, may be located in or near to audience area 325 and be configured to trigger a signal when the sensor detects the presence of at least one audience member in the audience area 325. Such a sensor 330 may be configured to transmit a signal to a system to gather image data of the audience area 325.

An image capture device 310, such as, for example, a camera may be located proximate the exhibit 315, e.g., in the wall, and may be configured and disposed to capture images of at least a portion of the audience area 325. Contemplated cameras include traditional video cameras that film in a visible spectrum, infrared or ultraviolet cameras that film in non-visible spectrums, or still cameras that periodically capture images in any spectrum (e.g. visible, ultra-violet, infra-red). The image capture device 310 may be configured to capture still images and/or video images of the audience as the audience views the display 305 and/or the exhibit 315. Although shown as wall-mounted proximate the exhibit 315, the image capture device 310 may be placed anywhere in the area of the exhibit 315 that will allow the device to capture images of at least a portion, if not all, of the audience members that are in and/or proximate to the audience area 325. While a single image capture device 310 is shown, a plurality of image capture devices may be disposed about the audience area 325 to capture one or images or a video of the audience area 325.

Although an exemplary exhibit area is described above with reference to FIG. 3, other configurations may be used to add, remove, combine, and/or move components relative to one another are possible.

Figure 4A:
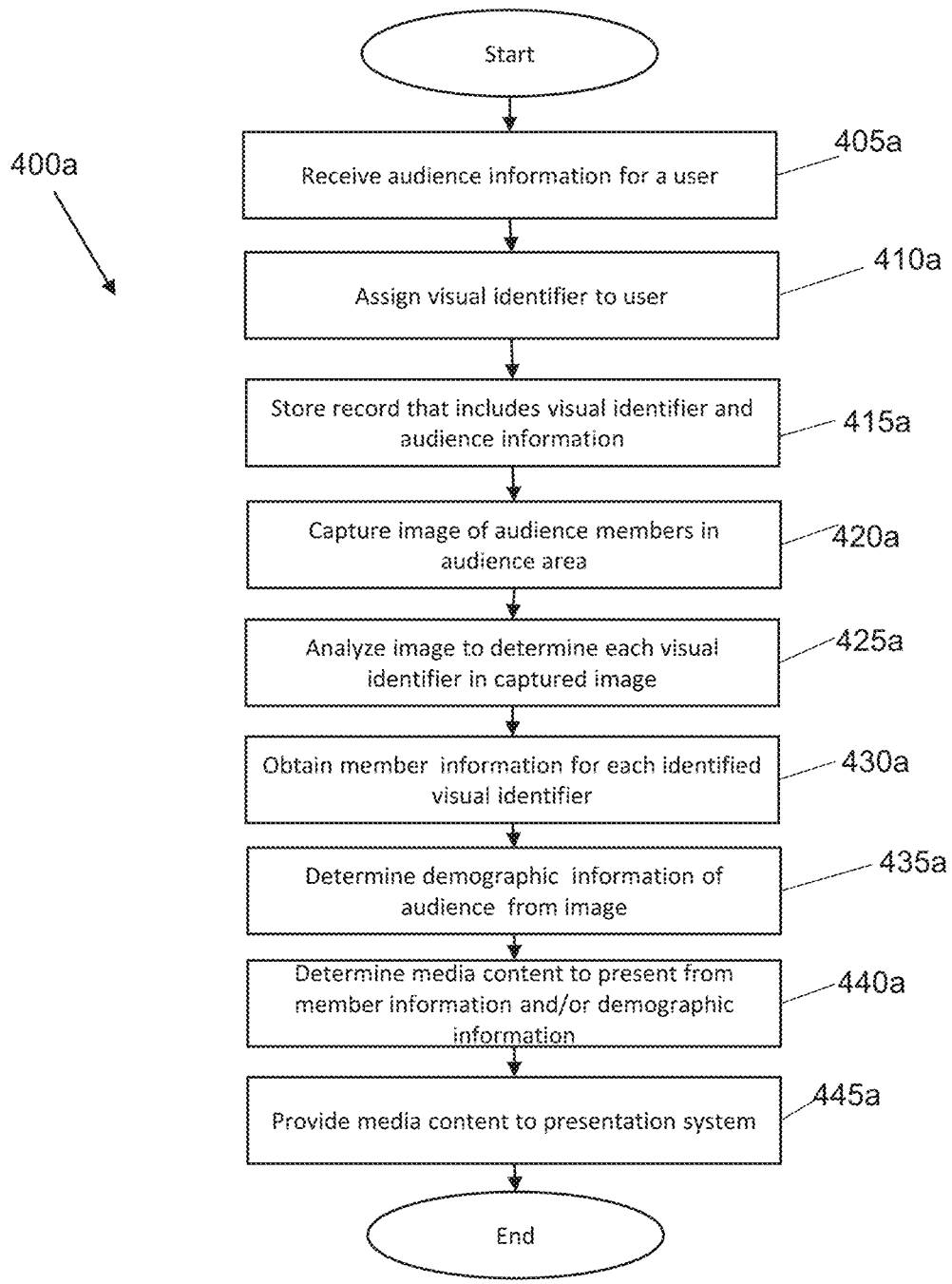
FIG. 4A is a flow diagram of an overview of an exemplary process for providing supplemental media content for an exhibit based upon an image of an audience area of the exhibit in accordance with an aspect of the disclosure.

FIG. 4A illustrates a flow diagram 400a of a general process or method for providing supplemental media content for an exhibit using image processing of a captured image of the audience area of the exhibit. Process 400a starts by receiving information about an audience member 405a. The information may be particular to the individual audience member. The information may pertain to a group that includes the audience member. A group may be any set of audience members that have common characteristics that may be used to determine media content to provide to that group. Examples of groups may include, but are not limited to, classes, tour groups, families, people with similar disabilities, ages, nationalities, languages (e.g. primary, secondary, preferred), races, heights, genders, education levels, heights, special needs (e.g. special accessible input/control needs, visual/audible/other aids required), and areas of study (e.g. science vs history). Information about an audience member or a group of audience members may be stored in an attribute database such as the ones that are described in more detail below.

A visual identifier may be assigned for the audience members (4010). A visual identifier may be particular to an individual audience member. For example, a facial image of the audience member may be assigned as a visual identifier of the audience member. The visual identifier may alternatively be a visual identifier that is assigned to each member of a related group of audience members. For example, the visual identifier may be, but is not limited to, a particular color or pattern for garments worn by the group or may be a color, pattern, or symbol on a lanyard, badge, or tag worn or held by each member of the group that is distributed to each member of the group by the venue. A visual identifier may be located or may comprise an identification object that is worn or held by an audience member, such as a sculpture, a toy (e.g. a teddy bear), or a piece of clothing (e.g. a hat). The visual identifier may have a color, pattern, or a shape that identifies an audience member or a group of audience members. Such visual identifiers may be isolated from an image by recognizing a shape or recurring pattern in an image, and then isolating that shape or recurring pattern to isolate the visual identifier. For example, audience members may wear a badge of a predetermined shape or pattern that may be recognized by a recognition module, and then isolated to determine a visual identifier printed on the badge. Alternatively, audience members may wear an article of clothing, such as a tie or a scarf or the like, having a recurring pattern, such as stripes, which may be isolated by a recognition module to be analyzed for a visual identifier. The system may be configured to recognize a plurality of visual identifiers for each audience member in a set of images or a video that is received, including, for example a facial image of the audience member, a colored badge of the audience member, and/or a food item that the audience member is holding.

A record that includes an identifier associated with the audience member, a visual identifier, and information relevant in determining the media content to present may be stored (415a). Such a record may comprise a group record that identifies a group name or other group identifier, a visual identifier associated with the group, and/or group information that has information relevant in determining the media content, such as attributes of the group. Such information could be saved in a group database that correlates visual identifiers with media content, or an attribute database that correlates group identifiers with attributes, for example, that are described in more detail below. A record may comprise an audience member record that stores a name or other identifier (e.g., a unique alphanumeric identifier) corresponding with an individual audience member, a facial image, a facial fingerprint, some other particular visual identifier of the audience member, or some other unique identifier of the audience member, and member information relevant to, or which may be used to determine, appropriate media content for the audience member.

The process 400a may captures an image, or a set of images, of audience members in an audience area proximate the exhibit (420a). An image analysis process may then be performed on the captured image, or set of images, to identify each visual identifier in the captured image (425a). The system may associate each visual identifier with an audience member in each image. As discussed in further detail below, image processing may be used to process visual identifiers of audience members. For example, an image processing method may be configured to recognize visual identifiers of a color, pattern, or symbol, which may be correlated with a group, or may be configured to recognize visual identifiers of a facial image, which may be correlated with an individual entity using facial recognition. The computer system may be programmed to derive such information from a set of images, and make decisions upon cross-referencing that information against one or more tables or databases. For example, the computer system may analyze a set of images to determine what color particular entities in a set of images wear, and/or what pattern the entities have on a tag, or what symbol from a set of recognized symbols exist in a set of images. Alternatively, or in addition, the computer system may be programmed to derive facial fingerprints from a set of images. Member and/or group information correlated with each identified visual identifier (e.g., with appropriate user information) may be obtained by cross-referencing visual identifiers against one or more data sources, such as a table or a database (430a). Demographic information and, optionally, other audience-related information for the audience as whole may also be determined or obtained by the image analysis device or module, or the facial recognition device or module (435a). Identifier information may be entered into, or stored in, a table or a database that matches identifiers against media content (e.g. show media content A to groups where a majority of entities wear red, show media content B to groups where a majority of entities wear blue), or a table or database that matches identifiers against attributes, which may then be used as a query in another database to select media content. For example, one type of symbol may be worn by speakers of a first language (e.g., English), and another type of symbol may be worn by speakers of any other language (e.g., Spanish). Using this information, the computer system may be configured to then show media content to audience members as a function of the type of symbol worn (e.g., showing media content in English to English speakers while showing media content in, for example Spanish to Spanish speakers). The media content to present to the audience may be determined based on the obtained group and/or user information and/or from the determined demographic information for the audience (440a). Playback parameters for each piece of media content to be provided may also be selected as a function of attributes that are derived either directly (e.g., direct analysis of a set of images) or indirectly (e.g., indirect analysis by cross-referencing information, such as a visual identifier, from the image against one or more databases). The media content and/or playback parameters may then be provided to the exhibit control device or module for playback using the media playback devices (4045), after which the process 4000 ends.

Figure 4B:
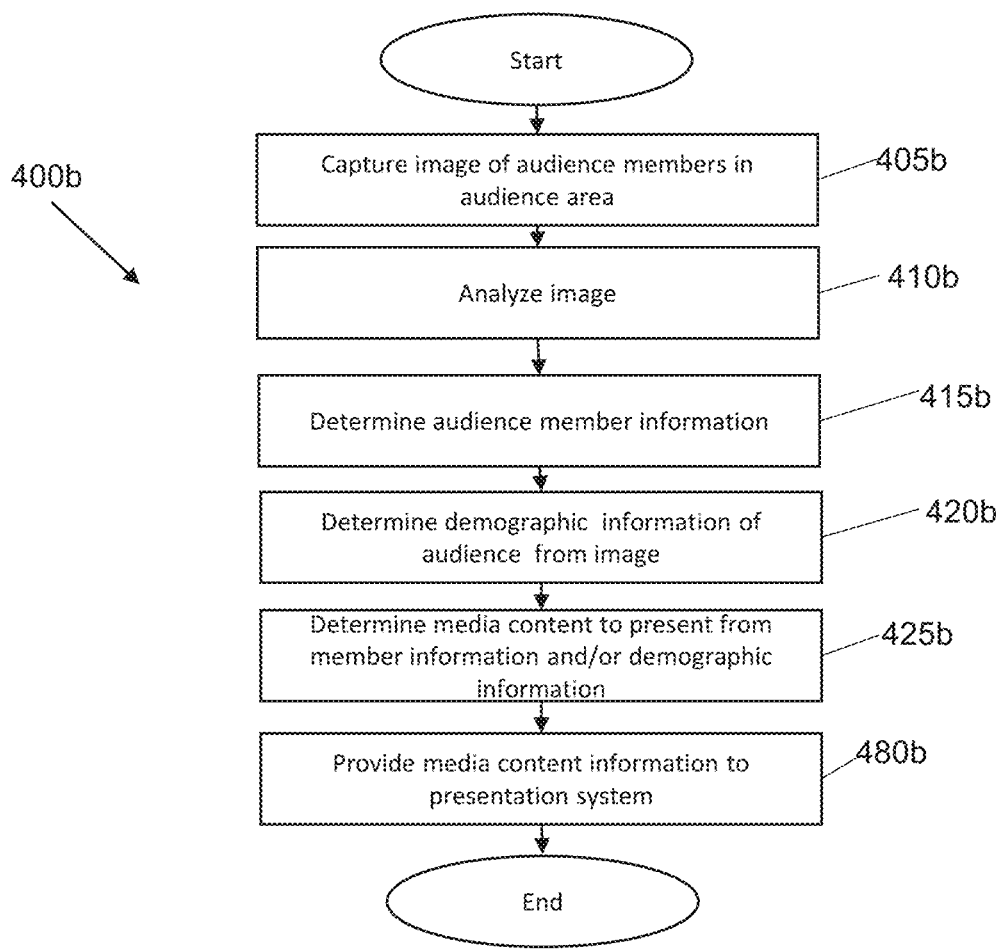
FIG. 4B is a flow diagram of an exemplary process for providing supplemental media content for an exhibit based upon visual identifiers of one or more groups identified in an image of an audience area of the exhibit in accordance with an aspect of the disclosure.

FIG. 4B illustrates a flow diagram of a process 400b for providing supplemental media content for an exhibit based upon group information and one or more visual identifiers that identify an audience member as part of one or more particular groups. In some particular embodiments, the image processing performed may comprise color recognition. The process 400b may capture an image of audience members in an audience area, which may be proximate the exhibit (405b).

Image analysis may be performed on the captured image, or set of images, of the audience area (410b) to identify (e.g., with appropriate group or attribute information) current audience information (415b). Demographic information and, optionally, other audience-related information for the audience as a whole, such as attribute information, may also be determined or obtained by the above-mentioned image analysis device or module 106 (420b). The media content to present to the audience may be determined based on the current audience information identified from the captured image of the audience area and/or from the determined demographic information for the audience (425b). Playback parameters for each piece of media content to be provided may also be determined or obtained. The media content and/or playback parameters are provided to the exhibit control device or module for playback using the media playback devices (430), after which the process 400b ends.

Figure 4C:
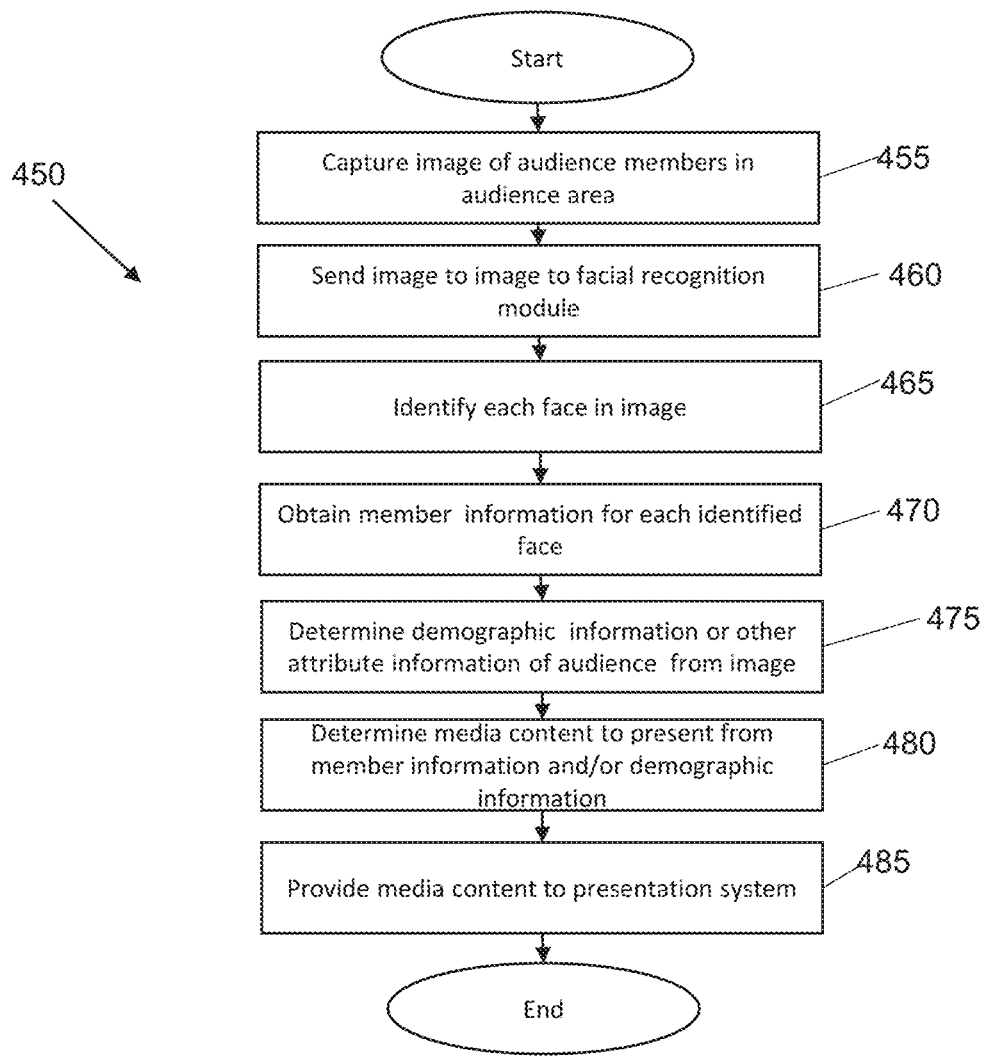
FIG. 4C is a flow diagram of an exemplary process for providing supplemental media content for an exhibit based upon facial recognition of audience members in an image of an audience area of the exhibit in accordance with an aspect of the disclosure.

FIG. 4C illustrates another flow diagram of a process 450 for providing supplemental media content for an exhibit using facial recognition of audience members in the captured image of the audience area. The process 450 may capture an image(s) of audience members in an audience area of an exhibit, which may be proximate the exhibit (455). The captured image(s) or facial fingerprints derived from the image(s) may advantageously be provided to a facial recognition device or module that processes an image to otherwise identify visual identifiers for a set of images (460). The facial recognition device or module may identify the desired portions of the captured image of the audience area that include the facial image, or one or more visual identifiers, of one or more audience members in the set of images (465).

In embodiments using a facial recognition process, the facial recognition function may be performed on each identified portion of the captured image to identify (e.g., with appropriate user information) each audience member (470). Such functions may be performed, for example, by deriving a facial fingerprint for each audience member, and cross-referencing that facial fingerprint against a database that returns information about that audience member, such as a unique identifier of the audience member, group information associated with the audience member, or attributes of the audience member. Demographic information and, optionally, other audience-related information for the audience as whole, such as attributes or media content preferences, may also be determined or obtained by the facial recognition device or module (475), preferably by cross-referencing identified information against an image, relationship, and/or attribute database. The media content to present to the audience may be determined based on, or as function of, information gleaned from a set of images, for example an identifier of a person (e.g., cross-referenced against a table or database that associates that person's identifier with the media content), an attribute of a person (e.g., cross-referenced against a table or database that associates that person's identifier with an attribute), or a relationship of a person (e.g., cross-referenced against a table or database that associates that person's identifier with another identifier) the audience members identified from the portions of the images that include a face and/or from the determined demographic information for the audience (480). In embodiments that use both a person's identifier and demographic information, both of those may be used as queries in an attribute database that returns media content or attributes that may be aggregated or weighted in any suitable manner. Playback parameters for each piece of media content to be provided may also be determined. The media content and/or playback parameters may be provided to the exhibit control device or module for playback using the media playback devices (485), after which the process 450 ends.

While the above describes an overall process for providing media content to supplement an exhibit in accordance with one aspect of the disclosure, other processes that add, combine, remove, and/or reorder the steps of the process are possible.

Figure 5:
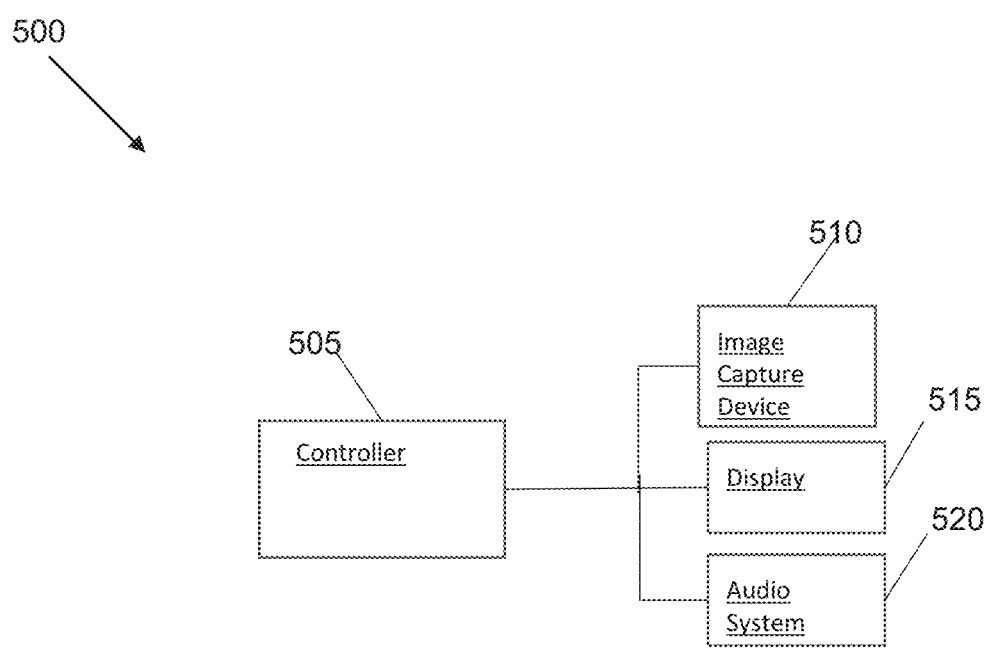
FIG. 5 is a block diagram of components of an exhibit control system in accordance with an embodiment of the disclosure.

As discussed above, in embodiments employing a facial recognition function, as well as in embodiments employing recognition of a color, pattern, or symbol, an exhibit control device or module may be configured to capture the images of the audience and play back the media content that is selected based upon the captured image. FIG. 5 is a block diagram of the components of an exemplary exhibit control device or module 500 which may include a controller 505, an image capture device 510, a display 515, and an audio system 520.

The controller 505 may be implemented as a processing system that controls the image capture device 510 in capturing images of the audience area to obtain the media content information provided based upon analysis of the captured image. In accordance with some aspects, the controller 505 may also control one or more components of the exhibit. These components may include, for example, valves, hydraulic lifts, animatronics that provide motion in the exhibit, and any other components that receive instructions to perform a task to facilitate the presentation of the exhibit. In some other aspects, the control system for more than one exhibit may be provided by a processing system.

The image capture device 510 may be any suitable device that may capture a set of images, such as a camera that captures still images and/or a video camera that captures video images. In the exemplary embodiment shown in FIG. 5, the image capture device 510 may be a separate device including a processing system that is communicatively connected to the controller 505 via a wireless or wired connection. The image capture device 510 may be an I/O device of the processing system or module including the controller 505. As discussed above, the image capture device 510 may be positioned such that the device is focused on the audience area in a manner to capture images that include facial images of the audience, and/or images of other visual identifiers, such as a specific color, pattern, or symbol associated with members of the audience. The image capture device 510 may also capture, record, or otherwise provide other information, such as depth information for the imaged objects, information that indicates an age of an audience member, a nationality of an audience member, a height of an audience member, a gender of an audience member, or a good that the audience member has (e.g. food being eaten by an audience member or a hat being worn by an audience member).

The display 515 may be communicatively connected to the controller 505. The display 515 may, in some embodiments, comprise a monitor that is controlled by the processing system of the controller 505. Alternatively, the display 515 may be one or more signs that are lighted by a lighting element that is controlled by the controller 505. Alternatively, the display 515 may be a touch screen that allows interaction with an audience member. The controller 505 may be configured to trigger visual media content to be played on or by the display 515.

The audio system 520 may include one or more speakers that are placed around the exhibit and/or audience area, and it may further include a processing system communicatively connected to the controller 505. In some embodiments, the audio system may include an audio transducer configured as an I/O device of the controller 505. The controller 505 may be configured to trigger audio media content to the played by the audio system 520.

Although an exemplary embodiment of an exhibit control device or module is described above with respect to FIG. 5, other embodiments that add, combine, rearrange, and/or remove components are possible.

Figure 6:
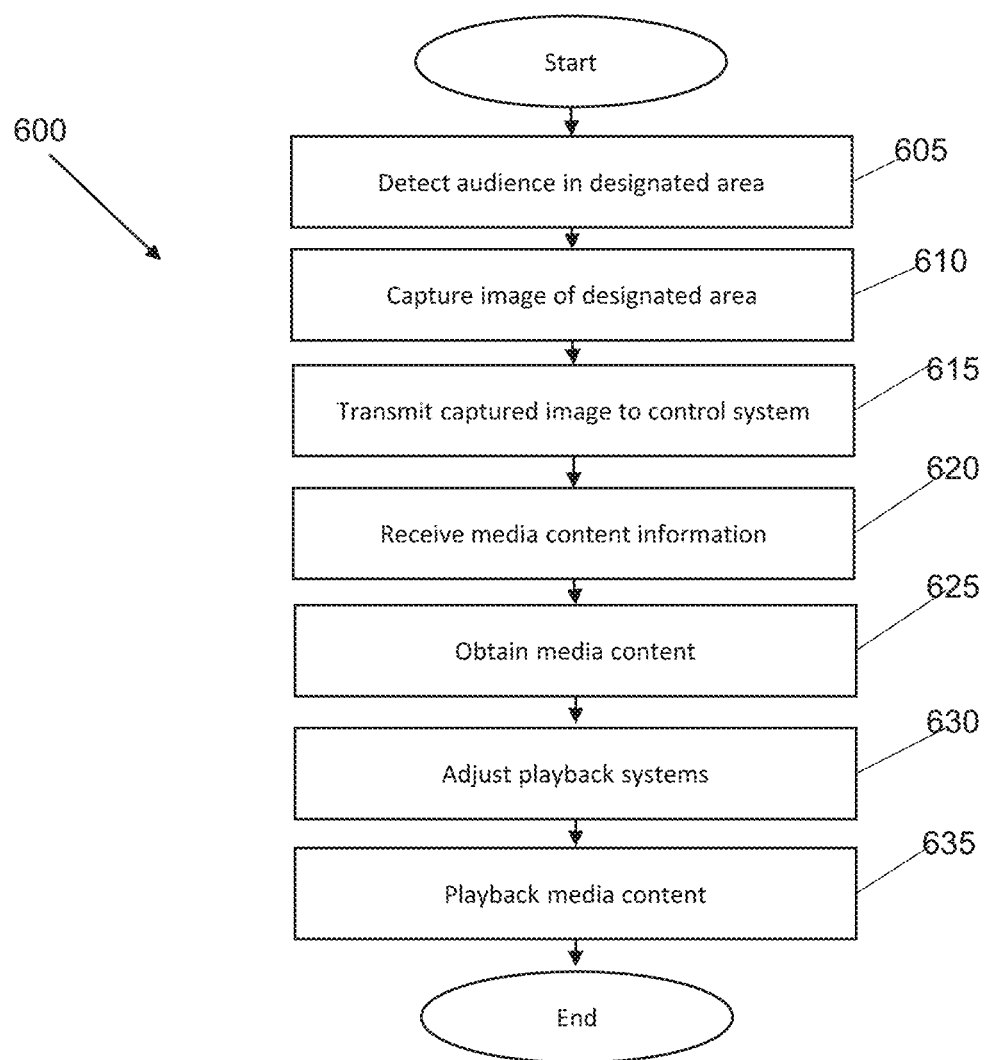
FIG. 6 is a flow diagram of an exemplary process performed by the exhibit control system to obtain and playback supplemental media content in accordance with an aspect of the disclosure.

FIG. 6 illustrates a flow diagram of a process 600 performed by an exhibit control device or module to provide supplemental media content. In the process 600, an audience may be detected in the audience area (605) by, for example, motion sensors, heat sensors, and/or any other type of sensor that may detect the presence of one or more audience members in the audience area.

An image may be captured of the audience area (610), for example, in response to the detection of one or more audience members in the audience area. In other words, the system may be configured to trigger another device upon detection of an entity within the audience area, such as an image capture device. Alternatively, the image capture device may periodically capture an image at pre-defined intervals of time, or a video feed of the audience area may be continuously captured, allowing a system to dynamically collect image data without needing a separate sensor. The system could be configured to recognize shapes that indicate an audience member, such as a shape recognized as a human, or a badge that audience members are authorized to wear, which would allow the system to detect an audience member in a designated area by performing analytics on sets of images that are regularly and periodically captured of an audience area.

The captured image may be transmitted to a content control device or module (615), optionally with other information about the image. Such other image information may include, for example, camera settings, depth information, lighting information, and/or other like information related to the image. The image information may be transmitted separately, or it may be transmitted in or with the captured image. Optionally, a video feed may be provided to the content control device or module. The exhibit control device or module may be configured to optionally monitor a video feed and only send an image that includes audience members that is taken from the feed when an audience is detected in the audience area. The exhibit control device or module may optionally be configured to perform image processing to improve image quality prior to transmitting the image, and/or it may optionally be configured to isolate facial images from the captured image and send only portions of the image that include facial images to the content control device or module.

The exhibit control device or module may be configured to receive media content information (620) to supplement the exhibit that is determined based upon the captured image, as discussed further below. The media content information may advantageously include the media content to present, and/or it may include identifiers, such as, for example, internet addresses, file directory identifiers, or other identifiers that may be used to obtain the media content and/or stream the content from an identified content provider. The video, or media, content information may optionally include playback parameters for adjusting the parameters of the playback devices to provide the desired playback. For example, the media content information, may include brightness, contrast, resolution, language, closed caption, exhibit routing, or other information for video playback, and/or it may include volume and/or balance information for an audio playback.

The media content may be obtained (625), e.g., by being read from memory in the exhibit control device or module, and/or by being received from one or more specific media content storage systems for playing. The media content may optionally be streamed using adaptive bit rate streaming or some other streaming technique from a content provider.

The playback parameters of the individual playback devices may be adjusted based on the received media content information (630), and the media content may be presented by the playback devices (635), at which point the process 600 may end. However, the process may be periodically repeated during playback to update the media content being presented to account for the composition of the audience changing as audience members arrive and depart during the playback.

Although an exemplary process performed by the exhibit control device or module to provide media content to supplement an exhibit in accordance with aspects of this disclosure is discussed above with respect to FIG. 6, other processes performed by the exhibit control device or module to provide the media content that add to, combine, rearrange, or remove any of the described steps are possible and are considered within the scope of this disclosure.

Figure 7:
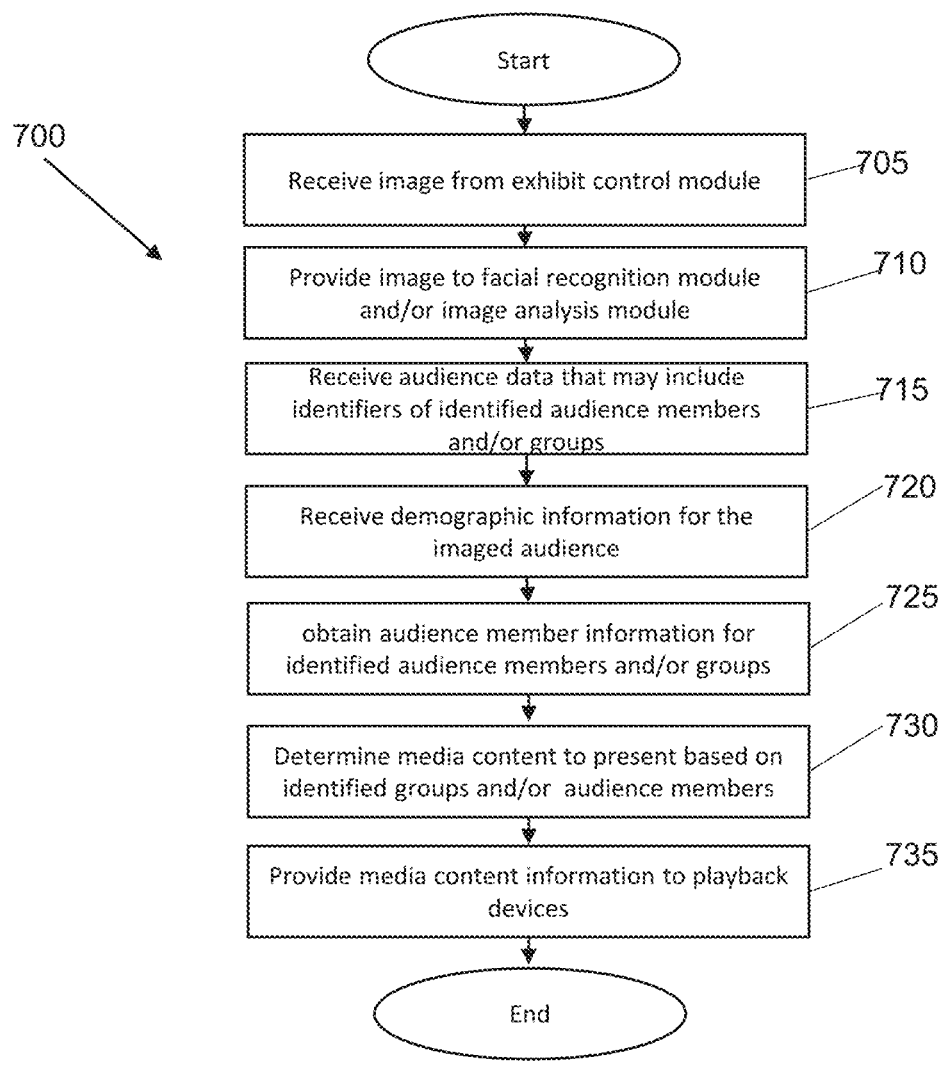
FIG. 7 is a flow diagram of an exemplary process performed by a content control system to provide supplemental media content to an exhibit in accordance with an aspect of the disclosure.

FIG. 7 illustrates a flow diagram of a process 700 performed by the content control device or module to determine the media content to provide to the exhibit control device or module, based upon the captured image. The process 700 may be performed for each image received, or it may be performed on a set of images. Thus, the process 700 may be performed once to determine the media content to present at one time in accordance, or, alternatively, the process 700 may be periodically performed during the presentation of media content to update the media content being presented to account for changes in the audience of the exhibit over time.

In the process 700, a captured image of the audience area may be received from an exhibit control device or module (705). As discussed above, additional image information may optionally be configured to be received with the image, such as a time indicator or a portion of the audience area at which the camera (or other image capture device) is aimed. In some embodiments, the image may then be provided to a facial recognition device or module and/or an image analysis device or module for image analysis (710). The content control device or module may be configured to do some image processing prior to providing the image to the facial recognition device or module/and or image analysis device or module. The analysis may include, for example, isolating a facial image and/or a visual group identifier (e.g. a pre-defined color, pattern, or symbol) in the image, modifying the image to improve image quality, and/or analyzing the image to determine or obtain other image information. In some embodiments, such other image information may be provided by the captured image to the facial recognition device or module and/or the image analysis module.

The process 700 may receive audience information that may include identifiers of audience members and/or groups identified in the captured image (715). The identifiers may be from audience information that the content control device or module, or some other system, device or module, previously provided to the image analysis device or module and/or the facial recognition device and/or module, as discussed further below. In some aspects, the identifiers may be provided in a list of audience members and/or groups identified. Demographic information for the audience may also be received (720). The demographic information may comprise information about the characteristics of the audience that the image analysis device or module and/or facial recognition device or module generates during analysis of the image. The demographic information may be in the form of a list for each audience member, or it may be in the form of a number representing a quantification of one or more particular characteristics, such as each member's height or level of understanding a language. The demographic information may include, for example, the ages, nationalities, races, heights, genders, languages (primary, secondary, preferred), education levels, special needs (e.g. accessibility input/output control needs, visual/audio/tactile/medical aids required), areas of study (e.g. science, history), or other miscellaneous demographics (e.g. how easy it is to scare an audience member) of the people in the audience. Other audience information may optionally be provided, such as the general emotional state of the audience even of individual audience members. Such audience information may be collected using other devices, such as a survey machine that is located in the exhibit area that could be used to collect attribute information from an audience member to be associated with the audience member in an attribute database, or a camera and/or body temperature device that may be used by a system to estimate a mood of an audience member based upon captured facial expressions, movements, and/or temperature of an audience member.

The content provider device or module may obtain the audience member information and/or group information associated with each identifier received (725), for example from a group database, media database, or an attribute database. The audience member information may comprise information about the identified audience member stored by the content provider device or module that provides insight into the interests and requirements of the particular audience member, thereby indicating the media content that will be of likely interest to the member. The group information may be information about the identified group stored by the content provider device or module that provides insight into the interests and requirements of the particular audience member, thereby indicating the media content that will be of interest to the member. The information may be used directly or indirectly to select media content, as explained in further detail below. It could also be correlation on information from cameras in one or more spectrums (e.g. visible and invisible spectrums). A set of images captured by a plurality of cameras that capture images of the same audience area (e.g. a video camera and an infrared camera) may be considered a single set of images for analysis by systems configured to parse data displayed by such images.

Figure 8A:
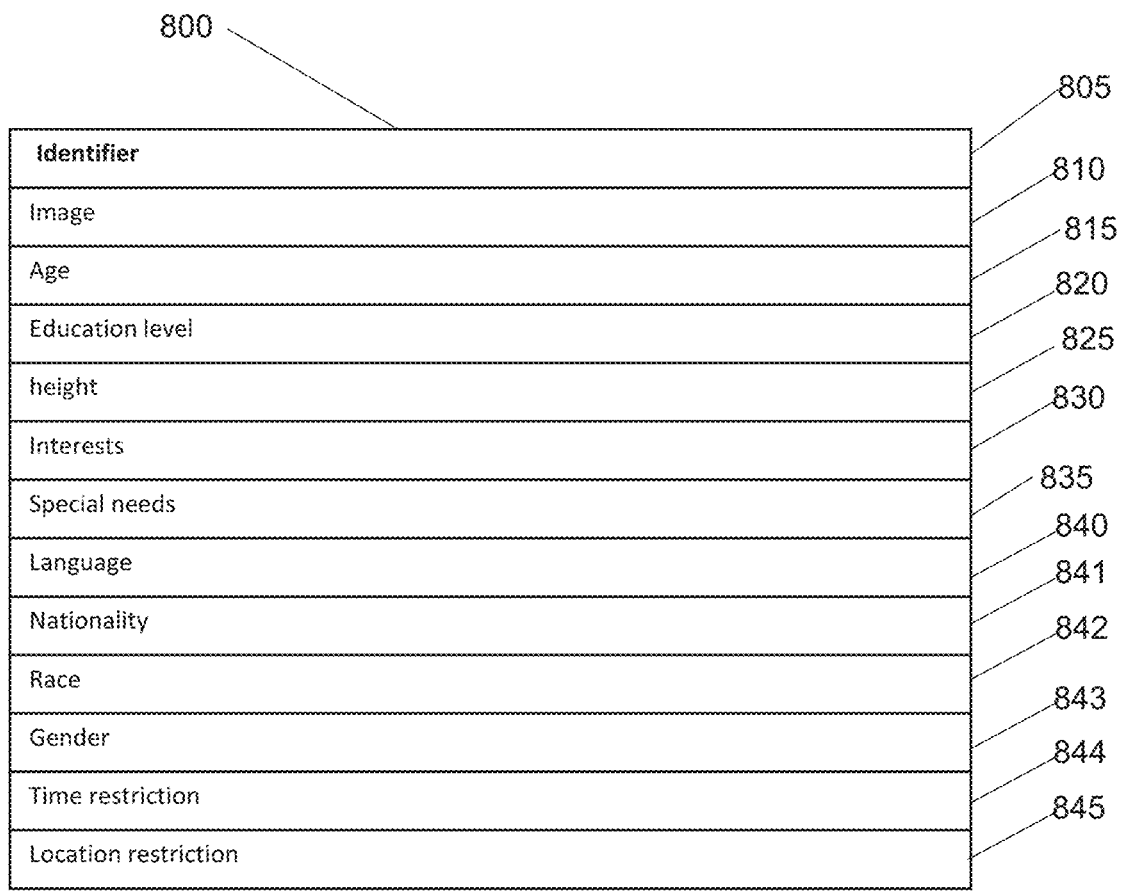
FIG. 8A is conceptual diagram of a data record for an audience member stored by an exemplary content control system for using in determining the proper media content to provide in accordance with an aspect of the disclosure.

FIG. 8A illustrates an example of an audience member record maintained by the content provider device, module, or database in accordance with an aspect of this disclosure. The audience member record 800 may include an identifier 805, such as a name, member number, or other unique identifier for the audience member. The record 800 may also include one or more facial images 810 or facial fingerprints of the member that the audience member may have provided to the content provider device or module, or that may have been captured from the audience member during a registration process. The record 800 may also include fields for particular information about the audience member that may be used to determine media content that may be of the most interest to the audience member, such as attribute information or group information. The fields in the record 800 may include fields for one or more personal characteristics, such as, for example, the member's age 815, the member's education level 820, the member's height 825, the member's particular interests 830, any special needs of the member 835, one or more languages used by the member 840 (e.g., the primary language, any secondary languages, proficiency levels of the languages, whether the audience member may understand language through audio, closed-captioning, or tactile means), a nationality of the audience member 841, a race of the audience member 842, a gender of the audience member 843, a time restriction for the audience member 844, and/or a location restriction for the audience member 845. Examples of particular interests may include, for example, areas of study (such as science and history) that the member is interested in understanding or is enrolled at a school. Examples of special needs may include, for example, any visual aids, audio aids, and/or other aids that the user may need to perceive the media content, and requirements, such as specially-accessible inputs that a member may need to interact with the media content owing to a physical limitation. Examples of time restrictions may include, for example, how much longer an audience member has (e.g., to enjoy an area having an exhibit or to rent a vehicle such as a car or a bike), the start/stop time an audience member has. Examples of location restrictions may include, for example, the boundaries that an audience member must remain within to not violate a condition (e.g., boundaries that demarcate an adult-only area vs. a child-only area, or boundaries that demarcate areas for guests vs. areas for employees), or distance thresholds for an audience member to be from an entity, such as a teacher or a leader of a group. Each record may optionally include other fields and/or subfields that define particular categories in these fields that may be used to determine the proper media content to provide, and/or presentation requirements that may be needed by the playback device for the member to best experience the content.

Figure 8B:
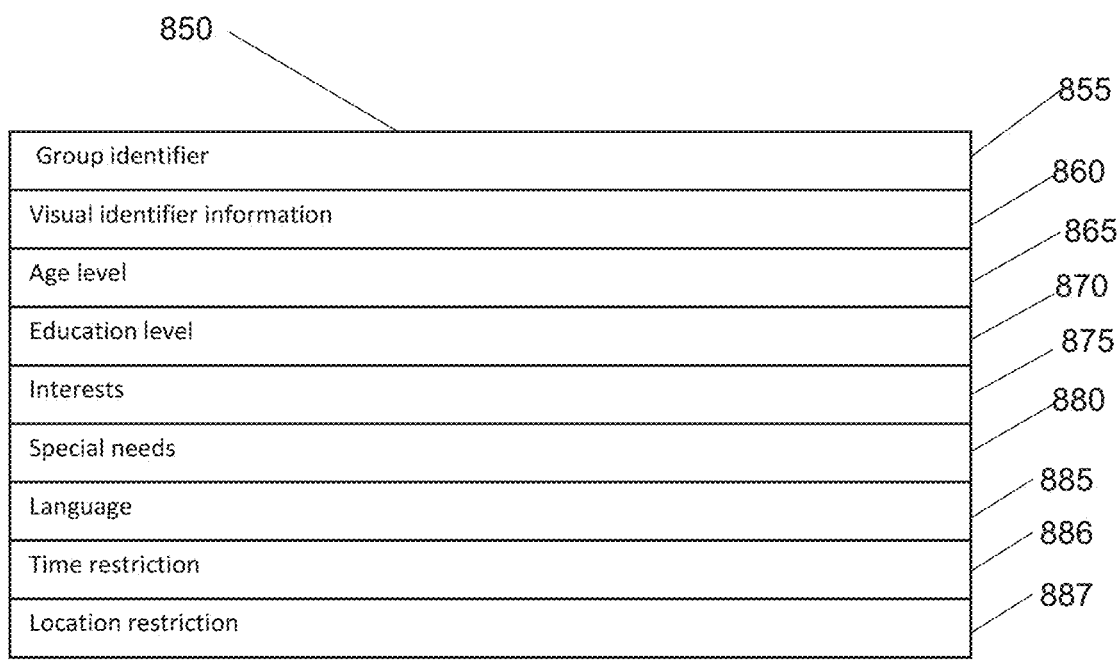
FIG. 8B is conceptual diagram of a data record for a group stored by the content control system of FIG. 8A for using in determining the proper media content to provide in accordance with an aspect of the disclosure.

FIG. 8B illustrates an example of a group record 850 maintained by the content provider device or module in accordance with another aspect of this disclosure. Such a group record may be saved in a group database. The group record 850 advantageously includes a group identifier 855, such as a name, group number, an alphanumeric identifier, a color identifier, or other identifier for the group. The record 850 may also include a group visual identifier 860 of the member that the audience member may have provided to the content provider device or module, or that may have been captured from the audience member during a registration process. The record 850 may also include fields for particular information about the group that may be used to determine media content that may be of the most interest to the group members. The fields in the record 850 may advantageously include fields for one or more group characteristics, such as the group's age level or average age 865, the group's education level 870, the group's particular interests 875, any special needs of the group members 880, one or more languages used by the group member 885 (e.g., the primary language used by the group members, any secondary languages, skill levels), a time restriction for the group, and/or a location restriction for the group. Further nuanced data regarding the language proficiency of the group members may be saved in a group record 850, such as indicators of how many members of a group may speak Spanish, English, or Chinese, or any other language as a primary language, which the system may use to select what audio language and what closed captioning language to use (e.g., use English as the audio language and Chinese as the closed-captioned language). Each record may optionally include other fields and/or subfields that define particular categories in these fields that may be used to determine the proper media content to provide and/or presentation requirements that may be needed by the playback device for the member to best experience the content.

Returning to the process 700 shown in FIG. 7, the process 700 may be configured to use the audience member information of each identified audience member and/or identified group; and/or the demographic information to determine the media content to present to supplement the exhibit (730). In situations in which the media content is to be played back by the personal devices of audience members, the process 700 may optionally use member information of a particular member to determine the media content to provide to that member. The demographic information may also or alternatively be used to determine the content to provide where there is no specific audience member record for the identified audience member.

In accordance with some aspects, the group, audience member, and/or demographic information may be applied to an algorithm that then determines the media content that will be of most interest to the broadest range of audience members. The algorithm, for example, may be an artificial intelligence algorithm, such as, for example, a neural network algorithm that takes at least a portion of the audience member and/or demographic information available and selects the media content available for the exhibit that will appeal to the greatest number of audience members. For example, the algorithm may choose an audio presentation in a language that is used by the greatest number of identified audience members, or a language determined by the greatest number of a particular nationality identified in the demographic or group information. The algorithm may then select a closed caption track for the language used by the second greatest number of audience members or another group. In some embodiments, the algorithm may weight input values differently.

The subjects covered by the media content provided may be determined to appeal to the greatest number of, or largest aggregated weighted value of, audience members in accordance with some aspects. For example, the algorithm may determine that most of the audience is comprised of members interested in the scientific aspect of the exhibit as opposed to the historical aspect. As such, the algorithm may be configured to select video and audio media content directed to the scientific aspects of the exhibit. The algorithm may also consider the age of the audience members in selecting the content. For example, the algorithm may select content directed to younger students if the average age of the audience is younger, and more mature content if the audience average age is determined to be in the adult range.

Furthermore, the algorithm may weight some of the audience member information based upon quality of service parameters. For example, some audience members may have bought a subscription to a service that entitles them to have preferential treatment over other audience members. As such, the information for these members may be given added weight in the algorithm when determining the content to provide. For example, a first group of audience members may comprise a first tier of members, while a second group of audience members may comprise a second tier of members, and the primary language for the first group of members may be weighted to have a higher value than the primary language for the second group of members. The aggregated weighted values may then be used to select media content for the audience members.

In accordance with some aspects, the algorithm may give more or less weight to the information of the identified members than to the demographic information of the entire audience. Alternatively, the algorithm may give more weight to the demographic information to try to appeal to the greatest number of audience members.

In accordance with some aspects, the special needs of an audience member may include a time restriction, such as a time allocation to spend at a particular exhibit or at the venue as a whole, and/or a location restriction, such as a bounded area to remain within. As such, the algorithm may use time allocation information to select media content that has a playback time that conforms to the time allocation requirements of one or more audience members. In some of these aspects, the media content may also include suggestions guiding the audience member(s) to other exhibits in order to guide the member through the venue in the allocated time and/or see the exhibits that most interest the member(s). Any suitable venue may be monitored to provide data that is used to provide media content to attendees, for example a museum, a theme park, a restaurant, a theater, a concert hall, a sports arena, a store, a shopping mall, a drive-through restaurant, a coffee shop, a cruise ship, or even a smart city.

Other types of time restrictions and uses of time restrictions to choose media may be used. For example, a time restriction may comprise a time-limited relationship having a start and stop time, for example a driver of a vehicle for a period of time, a passenger of a vehicle for a period of time, or an admittee of a venue having a start/stop time. The system may be configured to analyze the time restrictions of an audience, and give a higher weight to a language of an audience member that has less time to enjoy the venue as opposed to an audience member that has more time, comparatively, to enjoy the venue, or may give a higher weight to media content preferences for a member that has less time to enjoy the venue as opposed to an audience member that has more time to enjoy the venue, or vice-versa. Time threshold equations may also be used, such as giving higher weight to specified attribute metrics for audience members that have less than a specified amount of time, e.g., 10 minutes, to enjoy a venue.

The system may also be configured to generate one or more optimal exhibit paths for one or more audience members, guiding the members through the venue using the media content. For example, the system may determine that a first group of audience members has a first optimal path through an exhibit venue based upon their time allocation requirement (e.g., with a time allocation requirement of 30 minutes, the optimal path for group 1 is exhibits 5, 6, and 8) and may determine that a second group of audience members has a second optimal path through an exhibit venue based upon their time allocation requirement (e.g. with a time allocation requirement of 2 hours, the optimal path for group 2 is exhibits 7, 8, 5, and then 6). Accordingly, the system may display media content showing routing data for the audience members (e.g., closed captioning that indicates that group 1 should head to exhibit 5 while group 2 should head to exhibit 7). The media content may not contain routing data, but it may be selected based upon an optimal path generated by the system. For example, an optimal path may select exhibit 6 as the next best exhibit for a group of audience members to visit, and thus may select a set of media content that corresponds with exhibit 6, which may be used to influence a group to choose exhibit 6 as the next exhibit to visit.

The system may also use time requirements in conjunction with occupancy requirements to chart optimal paths through an exhibit venue. For example, each exhibit may have a set of image capturing devices that capture and recognize a number of audience members at each exhibit. Such numbers could be dynamically sent to an occupancy database that tracks occupancy data of each exhibit at the venue. Such occupancy data may be used in conjunction with the time requirement data of each audience member to map out optimal routes by estimating the time it takes to travel to an exhibit, and/or fully experience an exhibit as a function of the occupancy data.

Once the algorithm has determined the media content to provide and/or the playback parameters that meet the needs of the audience, the media content information and/or playback information may be generated and provided to the exhibit control device or module (735), at which point the process 700 may end. As discussed above, the process 700 may be periodically repeated to update the media information and/or playback parameters to account for the changing composition of the audience.

An exemplary process for selecting the media content to supplement an exhibit performed by a content control device or module in accordance with an embodiment of the disclosure is described above with reference to FIG. 7. However, other processes for selecting the media content that add, combine, rearrange, and/or remove one or more steps described above are possible in accordance with other embodiments.

In some embodiments, the analysis of the captured image of the audience area may be performed by a facial recognition system (i.e., device or module) in accordance with various aspects of the disclosure. In order to perform facial recognition, the facial recognition device or module needs facial images of the audience members to perform comparisons. In accordance with some aspects of the disclosure, the facial image of a member is provided by the audience member and/or captured by the system during a registration process used to generate an audience member record, such as the record described above with respect to FIG. 8A. In accordance with some other embodiments, a group visual identifier such as, for example, one or more of a color, a symbol, or a pattern is provided by a user generating the group record or is generated elsewhere and is to generate a group record during a registration process. The color, pattern, or symbol may be provided to each individual in a particular audience in the form of an article of clothing (e.g., a hat, T-shirt, or scarf), a badge, a pin, a lanyard, a flag, a banner, a balloon, or any other appropriate item that may be worn or carried by the individuals in the audience. The registration process may be performed by a central control system or the content control device or module in accordance with various aspects of this disclosure. The facial image and/or an identifier of the audience member, and/or a visual group identifier, is then provided by the registration process to the facial recognition device or module and/or an image analysis module.

Figure 9A:
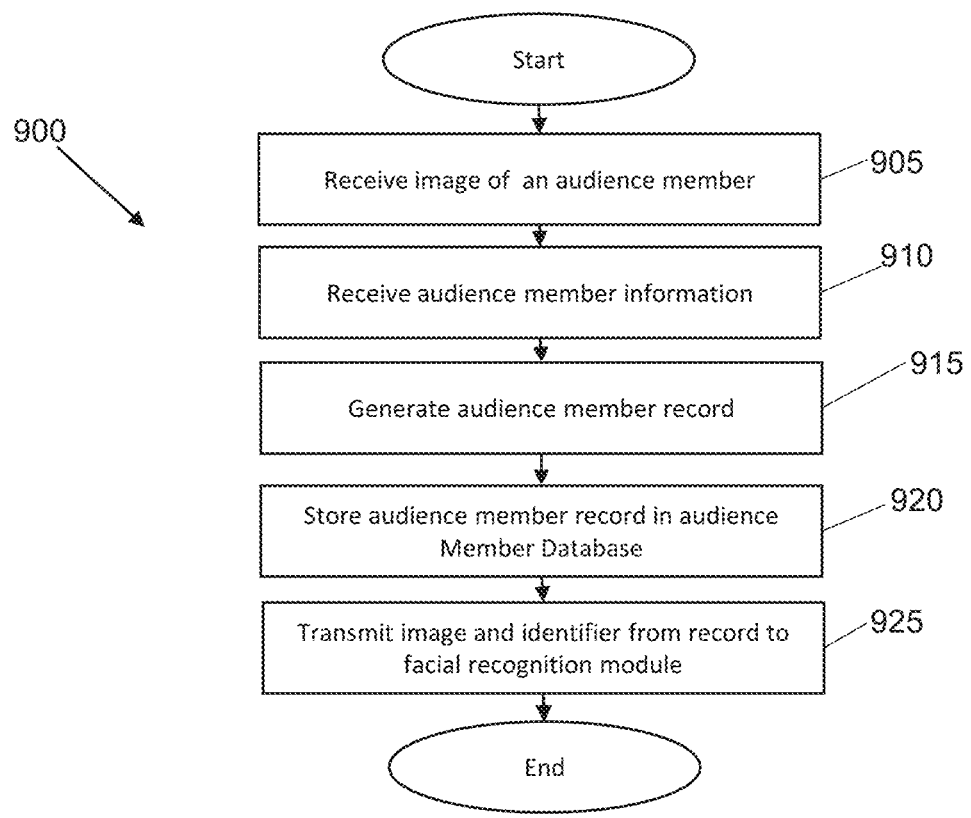
FIG. 9A is a flow diagram of a process performed by an exemplary content control system to obtain audience member information and generate an audience member record in accordance with an aspect of this disclosure.

FIG. 9A illustrates a flow diagram of a registration process 900 that may be performed by a central control system or the content control device or module in which facial recognition of audience members may be used. Such a registration process could take place, for example, at a front desk of a venue or on an app of a mobile device connected to a network. In the registration process 900, a facial image of the audience member that is registering with the system may be received (905). The process 900 may issue a command (for example, by a wireless communication) that directs the user device to capture the facial image using an image capture device associated with the user device, and to provide the image to the process 900. In response, the audience member may provide a facial image stored on the user device that audience member is using to register in any suitable means, for example by uploading a stored photo or by taking a photo or video using a camera of the device using an application running on the storage device that transmits the photo to the system. The process 900 may also receive audience member information for the member (910). A user, such as the audience member or a teacher that has been provided authorization access to provide attribute information about the audience member to the system, may then use any suitable user interface to provide such attributes to the system, for example a keyboard, a mouse, or an I/O interface that transmits attributes from another database to a system database, such as an attribute database. The registering member may input the information to a personal device that provides the information to the process 900. The audience member information may include at least a portion of the information discussed above with reference to FIG. 8A. However, the information may also include any information that may be needed to select media content using a particular algorithm.

An audience member record may include the received audience member information and the captured facial image is generated (915) and stored in an audience member database (920). The captured facial image and an identifier of the audience member may be provided to the facial recognition device or model (925), and the process 900 may then end.

An exemplary process for registering an audience member in accordance with embodiments of the disclosure is described above with respect to FIG. 9A. Other registration processes that add, combine, rearrange, and/or remove one or more steps described above are possible in accordance with other embodiments.

Figure 9B:
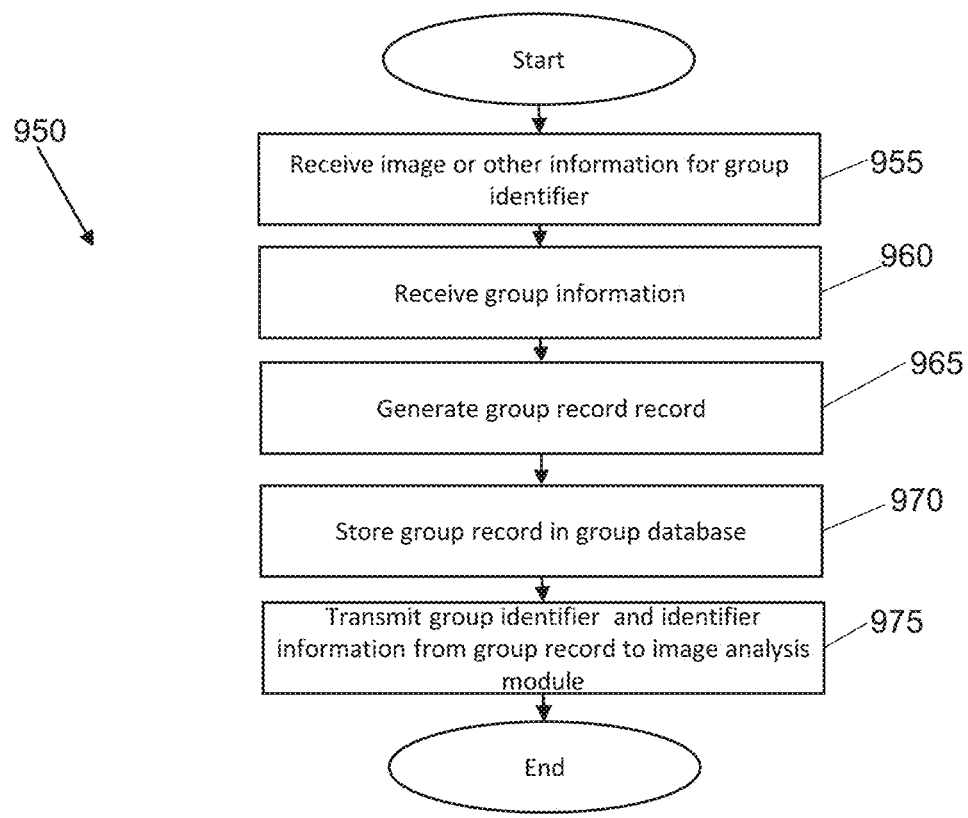
FIG. 9B is a flow diagram of a process performed by an exemplary content control system to obtain group information and generate a group record in accordance with an aspect of this disclosure.

FIG. 9B illustrates a flow diagram of a registration process 950 performed by a central control system or the content control device or module using group identifiers of groups of audience members to determine audience information. In the registration process 950, visual identifier information of the group that is registering with the system may be received (955). For example, the members of the group may be provided, for registration, with an item to be carried or worn and that displays a particular color, symbol, or pattern, as described above. Patterns include, for example, bar codes, alphanumeric identifiers, and logos. The process 950 may also receive group information for the members (960) individually or as a group, which may be stored as attributes corresponding to an individual entity or a group of entities. A user registering the group may input the information to a personal device that provides the information to the process 900. The group information may include at least a portion of the information discussed above with reference to FIG. 8B. However, the information may also include any information that may be needed to select media content using a particular algorithm.

A group record that includes the received group identifier information and the group visual identifier for the group is generated (965) and stored in a group database (970). The group visual identifier information and an identifier of the group is provided to the image analysis device or module (975), and the process 900 may then end.

An exemplary process for registering a group in accordance with embodiments of the disclosure is described above with respect to FIG. 9B. Other registration processes that add, combine, rearrange, and/or remove one or more steps described above are possible in accordance with other embodiments.

Figure 10A:
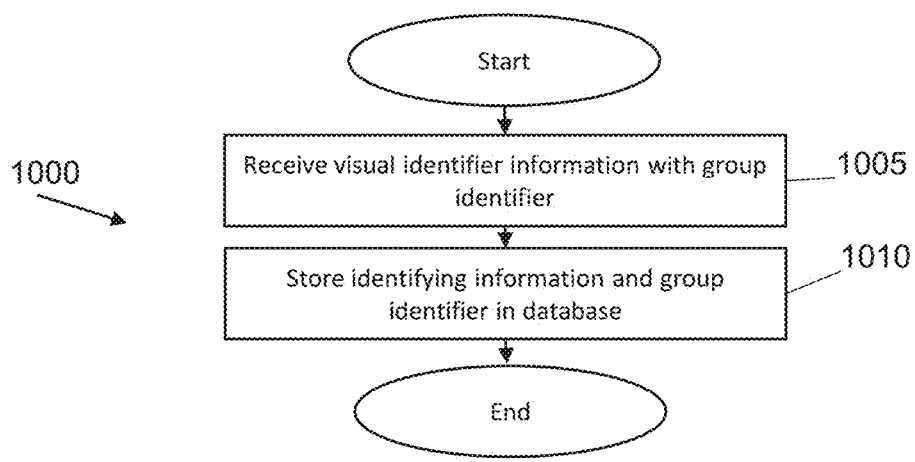
FIG. 10A is a flow diagram of a process performed by an embodiment of image analysis system to store data records of images of audience members in accordance with an aspect of the disclosure.

FIG. 10A illustrates a process 1000 that may be performed by the recognition device or module in response to receiving an image and an identifier of an audience member in accordance with some embodiments of this disclosure that use recognition to determine audience information. In the process 1000, a recognition device or module may be configured to receive an image and derive one or more visual identifiers of an audience member from a central control system or content control device or module (1005). Any suitable visual identifier could be used, for example a facial image, a color image, a symbol, or a pattern. A recognition record may be generated and stored (1010), for example in an attribute database or a group database. The generation of the recognition record may include, for example, analyzing the image to generate facial parameters, such as a facial fingerprint, that may be used for image comparisons during a facial recognition process, as discussed further below, and analyzing the image to identify visual indicators of a group, such as a colored badge or a recognized symbol. The system may then store an association between a group identifier and a facial fingerprint in the database, for example by storing a unique identifier or a facial fingerprint of an audience member in a group database entry, or by storing a group identifier in an attribute database entry for an audience member.

An exemplary process for obtaining audience member visual identifiers images in a recognition system in accordance with embodiments of the disclosure is described above with respect to FIG. 10A. Other processes for obtaining images that add, combine, rearrange, and/or omit one or more steps described above are possible in accordance with other embodiments.

Figure 10B:
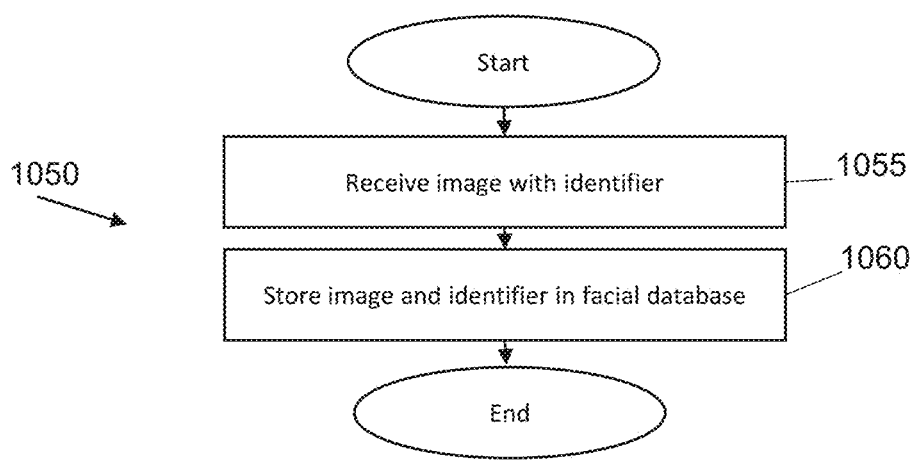
FIG. 10B is a flow diagram of a process performed by an exemplary facial recognition system to store data records of images of audience members in accordance with an aspect of the disclosure.

FIG. 10B illustrates a process 1050 performed by the image analysis device or module in response to receiving a group identifier and group visual identifier information of a group in accordance with some embodiments of this disclosure that use image analysis to determine audience information. In the process 1050, the image analysis device or module receives a group identifier and group visual identifier information of a group from a central control system or content control device or module (1055). A group record is generated and stored (1060). The generation of the group record may include, for example, analyzing an image of the group visual identifier to generate image parameters that may be used for image comparisons during the image analysis process, as discussed further below.

An exemplary process for obtaining group information in an image analysis system in accordance with embodiments of the disclosure is described above with respect to FIG. 10B. Other processes for obtaining group information that add, combine, rearrange, and/or omit one or more steps described above are possible in accordance with other embodiments.

Facial recognition of audience members in the captured image is performed to provide audience information and in some other aspects, image analysis is used to identify groups in the audience using image analysis. Processes and data structures to perform facial recognition by a facial recognition device or module in accordance with some aspects are discussed below with reference to FIGS. 11-13. Processes and data structures used to identify groups in the audience by an image analysis device or module in accordance with some aspects are discussed below with reference to FIGS. 14-17.

Figure 11:
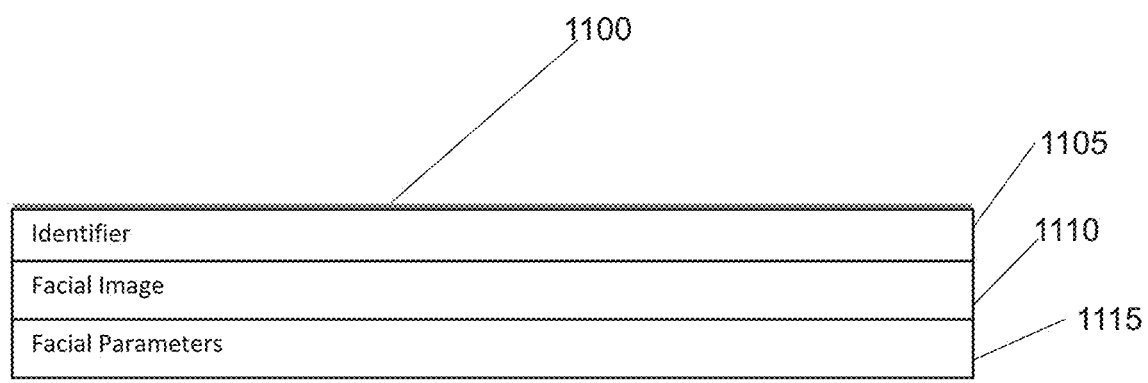
FIG. 11 is a conceptual drawing of an exemplary facial image record maintained by facial recognition system in accordance with an aspect of the disclosure.

FIG. 11 is a conceptual data structure for a facial recognition record in accordance with an aspect of the disclosure. A facial recognition record 1100 includes an identifier of the audience member 1105, the received facial image 1110, and the facial parameters for facial recognition comparisons 1115. The identifier may be, for example, a name and/or nickname of the audience member, or the identifier may be a number or alphanumeric string that associates the image to a specific audience member record stored by the content control device or module and/or the central control system.

Although an exemplary facial recognition record in accordance with embodiments of the disclosure is described above with reference to FIG. 11, other facial recognition records that add, combine, rearrange, and/or omit information are possible in accordance with other embodiments.

Figure 12:
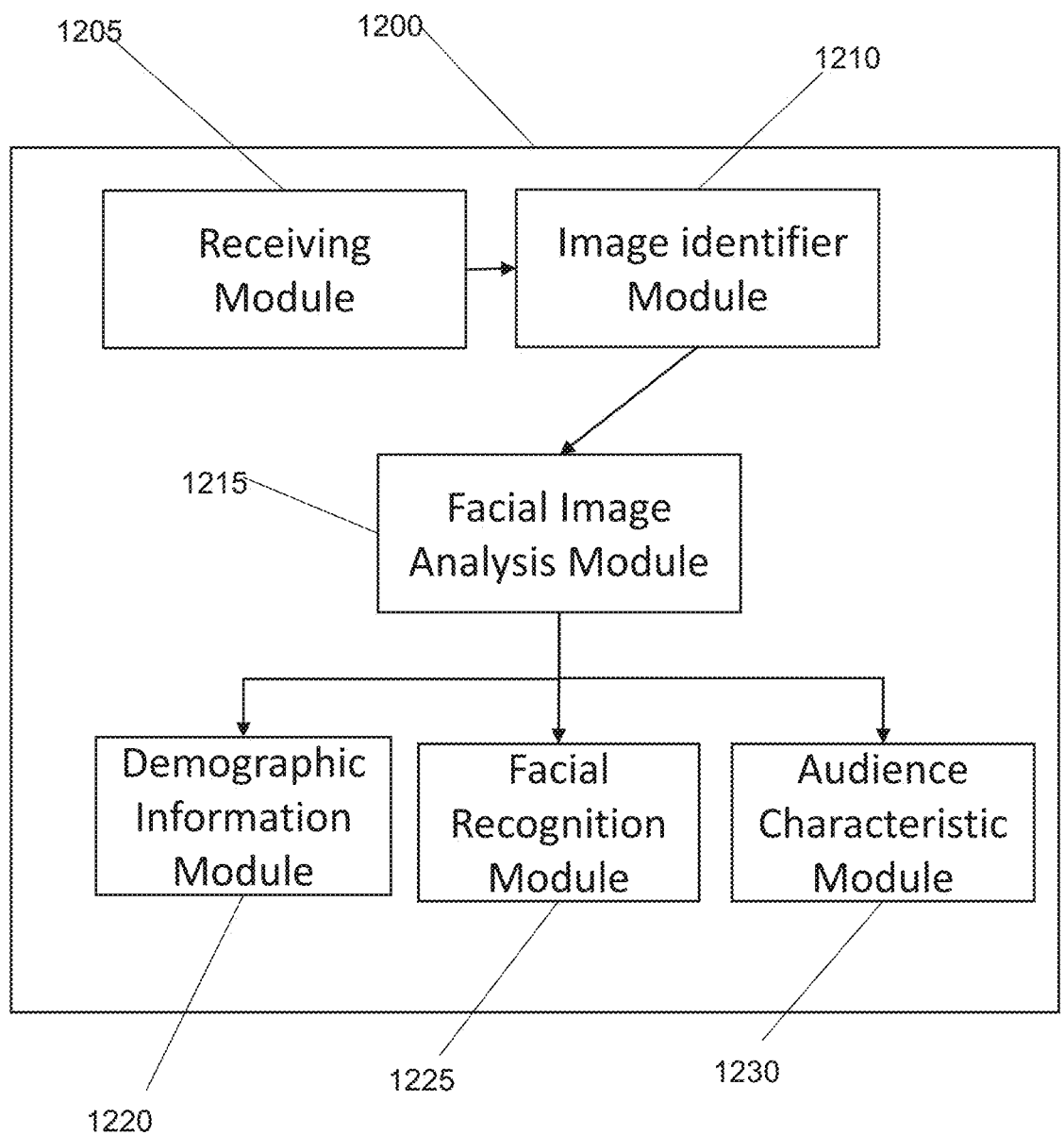
FIG. 12 is a conceptual diagram of exemplary modules of software for performing facial recognition analysis on a captured image of an audience area in accordance with an aspect of the disclosure.

The software and/or hardware modules that perform a facial recognition process in accordance with embodiments of the disclosure is shown in FIG. 12. The facial recognition system 1200 includes a receiving module 1205, a facial image identifier module 1210, a facial image analysis module 1215, a demographic information module 1220 that may generate other information (particularly demographic information), a facial recognition module 1225, and an audience characteristic module 1230.

The receiving module 1205 receives a captured image and processes the captured image to conform the image to the parameters needed to perform the various subsequent processes for facial recognition analysis. In accordance with some aspects, the image processing may include, for example, focus adjustments, color adjustments, edge defining, and other image adjustments needed to conform the image to the requirements of the subsequent modules. In accordance with some aspects, the receiving module also receives image information such as, for example, depth information, camera information, and lighting information. The receiving module 1205 uses the image information in the image processing to conform the image to the required standards.

The processed image is provided to the facial image identifier module 1210, which identifies the portions of the image that include a facial image. The identification may use edge detection and other various search processes to identify those portions of the image that include an image of a face to which facial recognition may be applied. In accordance with some aspects, the facial image identifier may also perform some image processing to conform the portions including a facial image to the requirements of an analysis module.

The facial image analysis module 1215 receives the portions of the image that include a facial image and performs analysis on each image to generate the data needed by the other modules to generate the information required. For example, the image analysis module may generate pixel color and vector data needed to perform edge detection, color detection, and the like needed to perform the various subsequent processes. In accordance with some aspects, the facial image analysis module 1215 also receives the image information and/or a complete image for use in performing the analysis. The information generated by the facial image analysis module 1215 is provided to the demographic information module 1220, the facial recognition module 1225, and the audience characteristic module 1230 to perform the facial recognition function and to generate the demographic and audience characteristic information.

The demographic information module 1220 uses the information for each facial image received from the facial image analysis module to generate demographic information for the entire audience, or at least a substantial portion of the audience (e.g., a representative sample). The demographic information may include, for example, the ages, nationalities, races, and the like of the audience members. The demographic information may also optionally include a statistical analysis of the categories to provide the mean, medium, and other information for each category.

The facial recognition module 1225 receives the information for each facial image and compares the information of each facial image to the information for the facial images in each facial recognition record to determine a match and returns the identifier of each record that matches one of the facial images from the captured image to a predefined degree of confidence. To facilitate the comparison, the records may include facial image data that is precomputed to provide quicker comparisons by eliminating the need to analyze each reference image.

The audience characteristic module 1230 receives the information for each facial image and compiles audience characteristic information. The characteristic information may include the size of the audience, the positions of the audience in the audience area, and other information pertaining the physical characteristics of the audience as a whole. To do so, the audience characteristic module 1230 may also optionally receive the image information to help define the spatial characteristics shown in the image.

Although the above description describes modules of a facial recognition system in accordance with an exemplary embodiment of the disclosure, other facial recognition modules that that add, combine, rearrange, and/or omit modules are possible in accordance with other embodiments.

Figure 13:
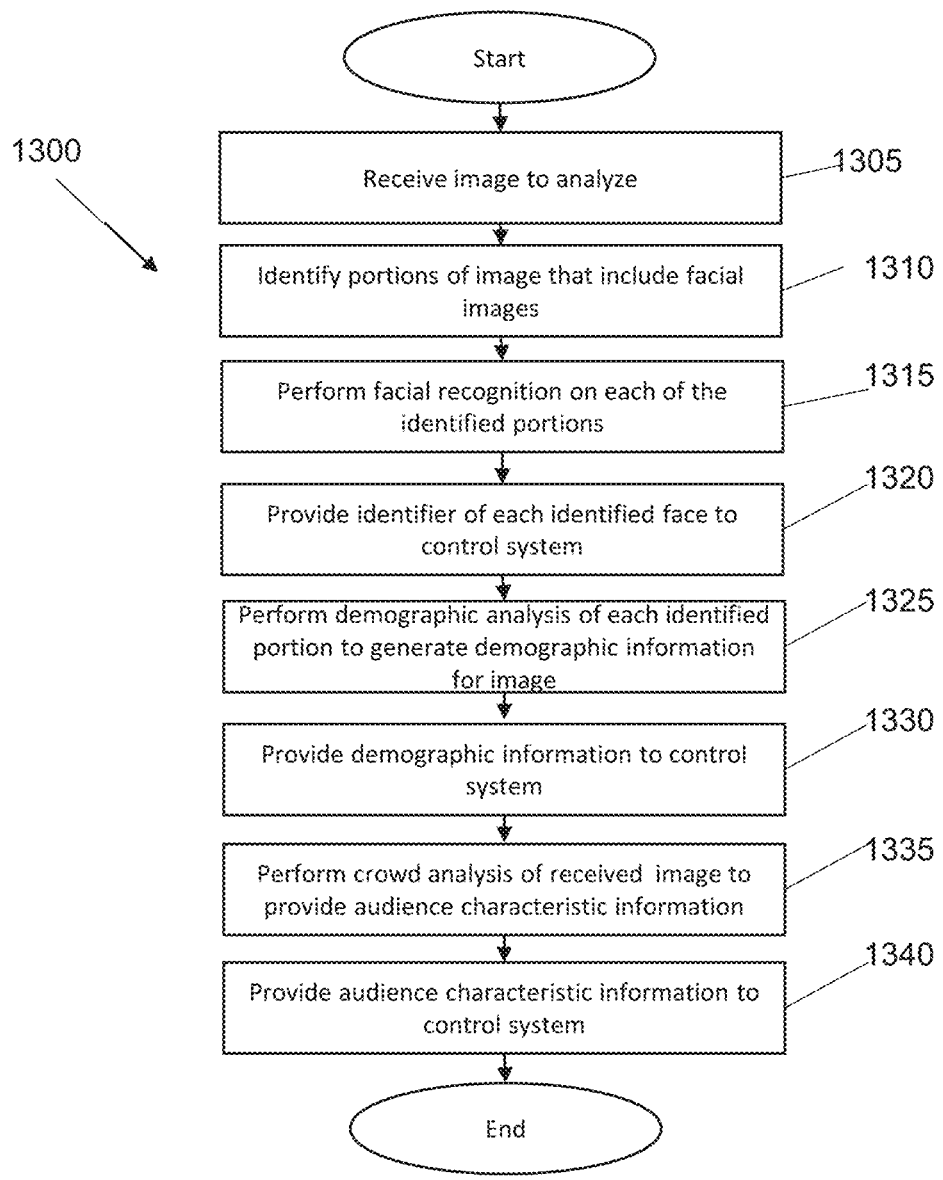
FIG. 13 is a flow diagram of an exemplary process performed by a facial recognition system to generate audience information from a captured image of an audience area in accordance with an aspect of the disclosure.

FIG. 13 illustrates a flow diagram of a process 1300 performed by a facial recognition system to perform facial recognition in a captured image of an audience area in accordance with an aspect of the disclosure. In the process 1300, an image of the audience area is received (1305). As discussed above, the received image may be processed to conform the image to the requirements of the process 1300.

Portions of the received (and optionally processed) image that include a facial image are identified (1310). As discussed above, each portion may be further processed to conform the facial image to the requirements of the facial recognition process. A facial recognition comparison to the facial images stored in the facial recognition record is performed to identify the records that match the facial images (1315). The identifiers of the matching records are provided to the content control module or device.

The information of the facial images from the captured image generated for the facial recognition comparisons is used to generate demographic information for the audience (1325). The demographic information provided is discussed above with respect to FIG. 12. The demographic information for the audience is provided to the content control nodule or device (1330).

The information of the facial images from the captured image generated for the facial recognition comparisons is also used to generate audience characteristic information (1335). The process for generating the audience characteristic information and the information generated are discussed above with reference to FIG. 12. The audience characteristic information is also provided to the content control module or device (1340), at which point the process 1300 may end.

An exemplary process for determining audience information using facial recognition in accordance with embodiments of the disclosure is described above with respect to FIG. 13. Other processes for obtaining group information that add, combine, rearrange, and/or omit one or more steps described above are possible in accordance with other embodiments.

Figure 14:
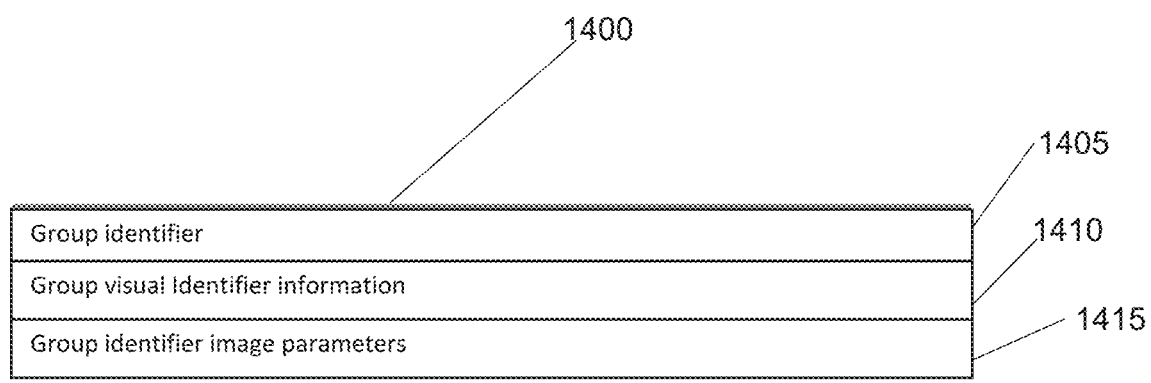
FIG. 14 is a conceptual drawing of an exemplary group image analysis record maintained by facial recognition system in accordance with an aspect of the disclosure.

FIG. 14 is a conceptual data structure for a group record 1400 in accordance with an aspect of the disclosure. The group record 1400 includes a group identifier of the group 1405, the received group visual identifier information 1410, and optionally, the group visual identifier parameters for image comparisons 1415. The identifier 1405 may be, for example, a name and/or nickname of the group, or the identifier may be a number or alphanumeric string that associates the group visual identifier information to a specific group record stored by the content control device or module and/or the central control system.

Although an exemplary group record in accordance with embodiments of the disclosure is described above with reference to FIG. 14, other group records that add, combine, rearrange, and/or omit information are possible in accordance with other embodiments.

Figure 15:
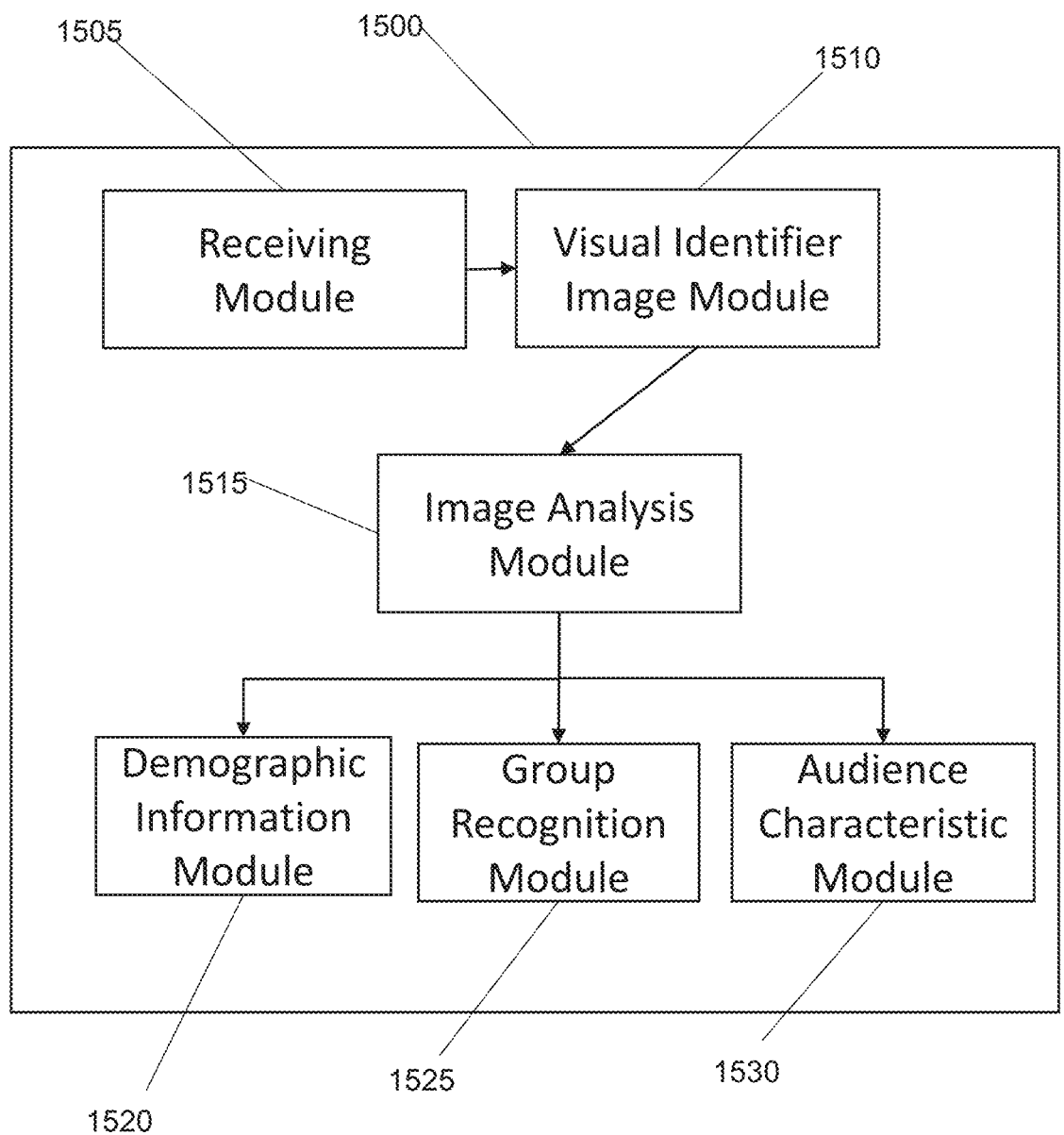
FIG. 15 is a conceptual diagram of an embodiment of functional modules for performing image analysis on a captured image of an audience area in accordance with an aspect of the disclosure.

An image analysis device or system 1500, comprising software and/or hardware modules that perform an image analysis process in accordance with some embodiments of the disclosure, is shown in FIG. 15. The image analysis system 1500 includes a receiving module 1505, a visual identifier image module 1510, an image analysis module 1515, a demographic information module 1520, a group recognition module 1525, and an audience characteristic module 1530.

The receiving module 1505 receives a captured image and processes the captured image to conform the image to the parameters needed to perform the various subsequent processes for image analysis. In accordance with some aspects, the image processing may include, for example, focus adjustments, color adjustments, edge defining, and other image adjustments needed to conform the image to the requirements of the subsequent modules. In accordance with some aspects, the receiving module also receives image information such as, for example, depth information, camera information, and lighting information. The receiving module 1505 uses the image information in the image processing to conform the image to the required standards.

The processed image is provided to the visual identifier image module 1510, which identifies the portions of the image that include a visual identifier associated with a group and/or audience member, e.g., a particular color, pattern, or symbol, as described above, that is worn or displayed by all members of the group. The identification may use edge detection and other various search processes to identify those portions of the image that include the requisite visual identifier. In accordance with some aspects, the visual identifier image module 1510 may also perform some image processing to conform the portions including visual identifier to the requirements of an analysis module.

The image analysis module 1515 receives the identified portions of the image and/or the entire captured image, and it performs analysis on the each identified portion of the image to generate the data from which the required information is derived. For example, the image analysis module 1515 may generate pixel color and vector data needed to perform edge detection, pixel color detection, and the like needed to perform the various subsequent processes. In accordance with some aspects, the image analysis module 1515 also receives the image information and/or a complete image for use in performing the analysis. The information generated by the image analysis module 1515 is provided to the demographic information module 1520, the group recognition module 1525, and the audience characteristic module 1530 for use in performing group recognition and to generate the demographic and audience characteristic information.

The demographic information module 1520 uses the information from each identified portion and/or the entire image received from the image analysis module 1515 to generate demographic information for the entire audience, or at least a substantial portion of the audience (e.g., a representative sample). The demographic information may include, for example, the ages, nationalities, races, and the like of the audience members. The demographic information may also optionally include a statistical analysis of the categories to provide the mean, medium, and other information for each category.

The group recognition module 1525 receives the information from the received image and compares the information of the group visual identifier information in each group record to determine a match and returns the group identifier of each group record that matches the data from the captured image to a predefined degree of confidence. To facilitate the comparison, the records may include visual identifier image data that is precomputed to provide quicker comparisons by eliminating the need to analyze each reference image.

The audience characteristic module 1530 receives the information for the captured image and compiles audience characteristic information. The characteristic information may include the size of the audience, the positions of the audience in the audience area, and other information pertaining the physical characteristics of the audience as a whole. To do so, the audience characteristic module 1530 may also optionally receive the image information to help define the spatial characteristics shown in the image.

Although the above description describes modules of an image analysis device or system in accordance with an exemplary embodiment of the disclosure, other image processing modules that that add, combine, rearrange, and/or omit modules are possible in accordance with other embodiments.

Figure 16:
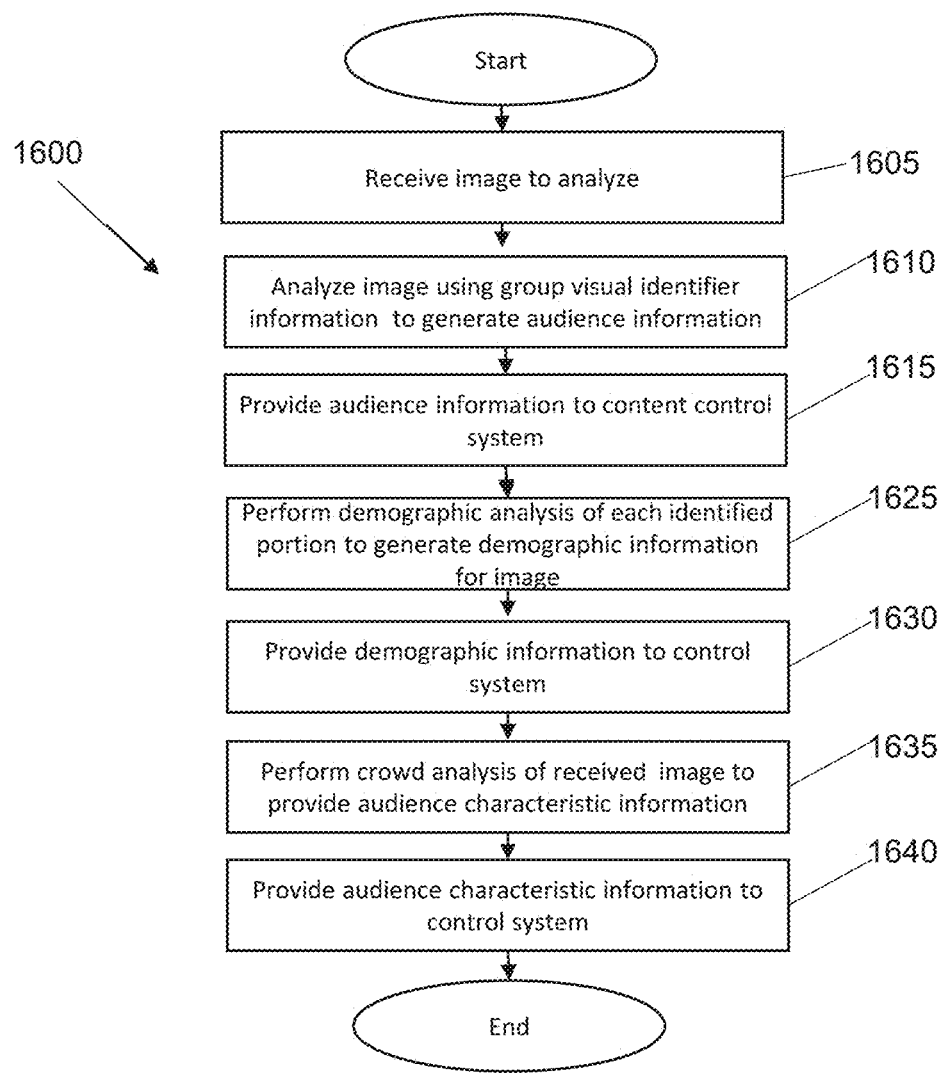
FIG. 16 is a flow diagram of an exemplary process performed by an image analysis module to generate audience information from a captured image of an audience area in accordance with an aspect of the disclosure.

FIG. 16 illustrates a flow diagram of a process 1600 performed by an image analysis device or module to detect groups of audience members in a captured image of an audience area in accordance with an aspect of the disclosure. In the process 1600, an image of the audience area is received (1605). As discussed above, the received image may be processed to conform the image to the requirements of the process 1600.

The captured image is analyzed to detect groups in the audience based on the group identifier information in the group records (1610). In accordance with some embodiments, the analysis may include determining the color of each pixels and a total amount of pixels for each color in the captured image. The pixel colors may be ranked based on the number of pixels of each color in the image. The pixel colors present are compared to the colors identified in the visual identifier information of each group record. Other processes for analyzing the image in accordance with some other embodiments are discussed below with reference to FIGS. 17 and 18. The groups present are then determined by whether a threshold amount of pixels of the identified color is present and/or by the rankings of the pixel colors. The group identifier from each group record that has a match for the group visual identifier information is provided to the content provider device or module as part of the audience information (1615), and the process 1600 may end.

An exemplary process for determining audience information using image analysis in accordance with embodiments of the disclosure is described above with respect to FIG. 16. Other processes for obtaining group information that add, combine, rearrange, and/or omit one or more steps described above are possible in accordance with other embodiments.

Figure 17:
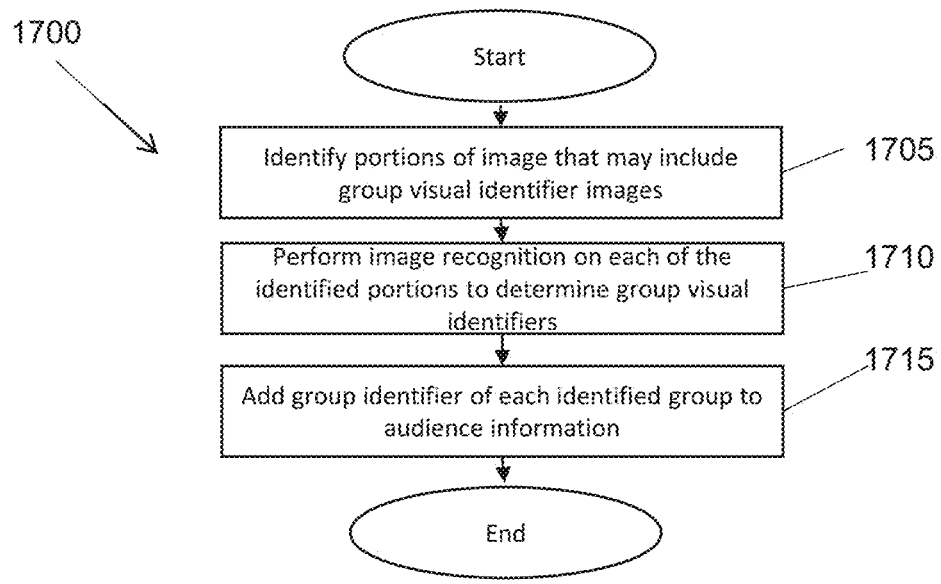
FIG. 17 is a flow diagram of an exemplary process performed by an image analysis module to analyze a captured image to identify visual identifiers of groups in an audience area in accordance with an aspect of the disclosure.

FIG. 17 illustrates a process 1700 for analyzing the captured image of the audience area for visual identifiers associated with each group in accordance with some aspects of the disclosure. Portions of the received (and optionally processed) image that include a visual identifier are identified (1705). As discussed above, each identified portion may be further processed to conform the requirements of the analysis process. An image comparison to the visual images stored in the group identifier information in each group record is performed to identify the group records that match the visual identifiers in the identified portions of the image (1710). The process 1700 may then end, and the above-described process 1600 (FIG. 16) may continue and provide the group identifiers of the matching group records to the content control module or device, as discussed above.

An exemplary process for performing image analysis in accordance with some embodiments of the disclosure is described above with respect to FIG. 17. Other processes for obtaining group information that add, combine, rearrange, and/or omit one or more steps described above are possible in accordance with other embodiments.

Figure 18:
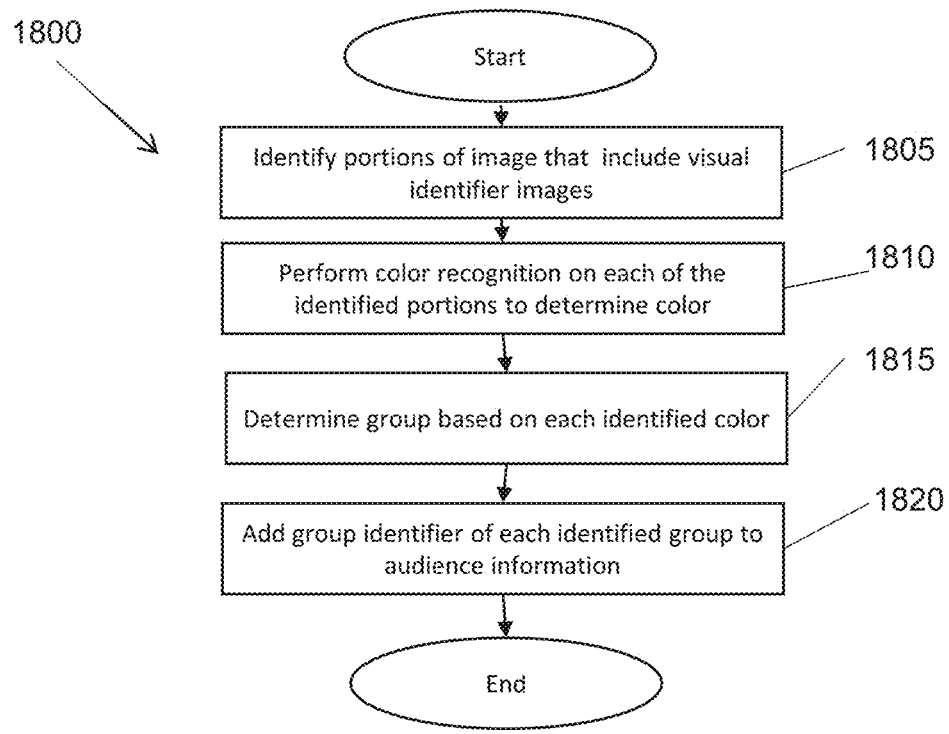
FIG. 18 is a flow diagram of an exemplary process performed by an image analysis module to analyze a captured image to identify members of groups based upon colors or patterns of visual identifiers in accordance with an aspect of the disclosure.

FIG. 18 illustrates a process 1800, in accordance with some embodiments, for analyzing the captured image of the audience area for visual identifiers (e.g., a particular color, pattern or symbol, as discussed above) associated with each group. Portions of the received (and optionally processed) image of audience area that may include a visual identifier are identified (1805). For example, the process may identify portions of the image including a badge, pin, lanyard, flag, article of clothing, or some other accessory that is worn or displayed by an audience member. As discussed above, each identified portion may be further processed to conform the requirements of the analysis process.

Color recognition may be performed on each identified portion to determine the color(s) of the visual identifier (1810). The color(s) are then used to determine a group associated with each portion based on the colors stored in the group visual identifier information of each group record (1815). The group identifier of each group identified is added to the audience information (1820). In accordance with some embodiments, a count of the number of portions identified to be associated with each identified group may be determined and added to the audience information for use in determining the media content provided based on the number of audience members in each group. The process 1800 may then end, and the above-described process 1600 (FIG. 16) may continue and provide the group identifiers of the matching group records to the content control module or device as discussed above.

An exemplary process for performing image analysis using color recognition of visual identifiers in accordance with some embodiments of the disclosure is described above with respect to FIG. 18. Other processes for obtaining group information that add, combine, rearrange, and/or omit one or more steps described above are possible in accordance with other embodiments.

Figure 19:
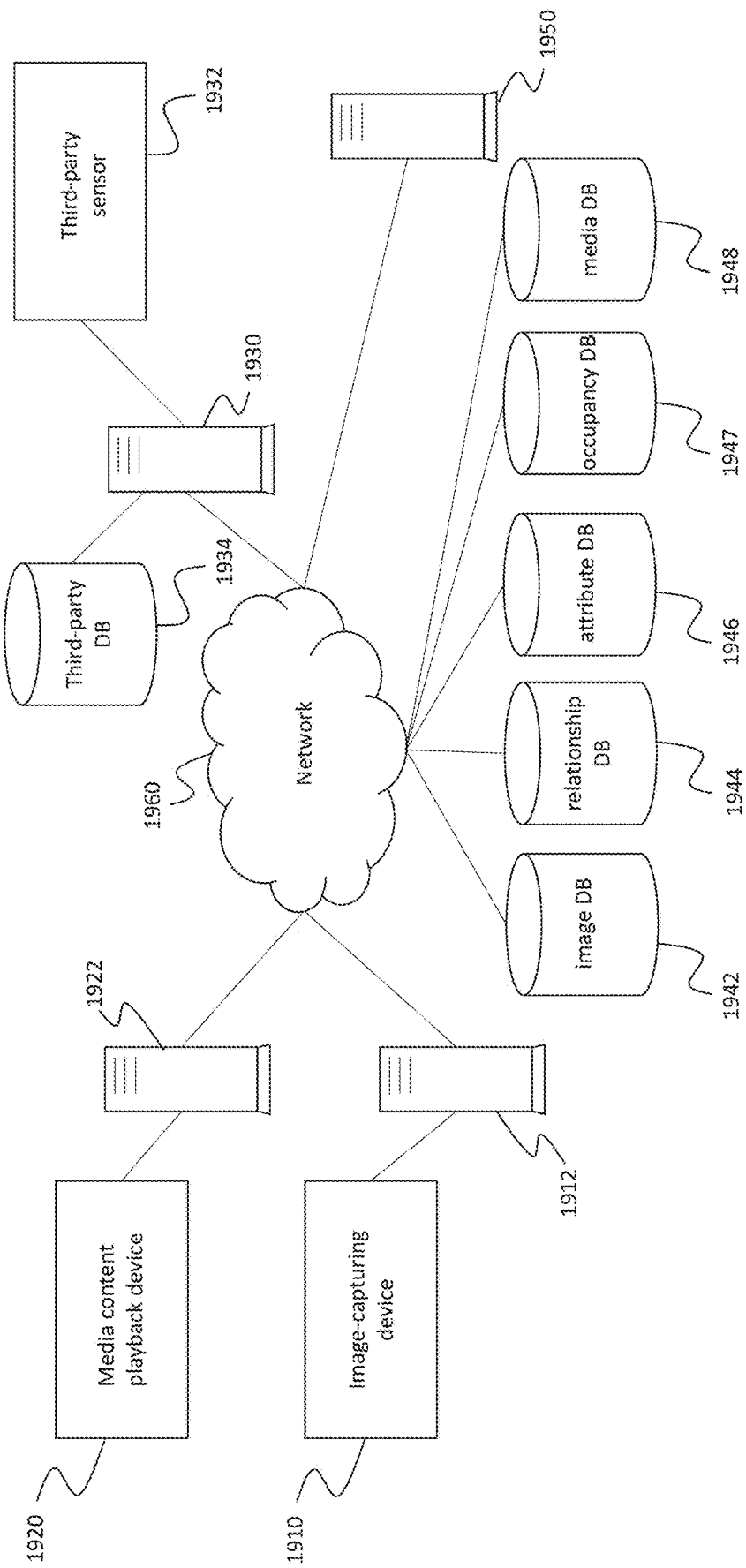
FIG. 19 shows a schematic of an embodiment of a media delivery system.

FIG. 19 shows a schematic of an alternative embodiment, having an image-capturing device 1910 that captures images, and a media content playback device 1920 that plays media content. While image-capturing device 1910 may be a camera that captures individual images, the image-capturing device 1910 may also be a camera that captures a stream of images and saves those images to a memory, for example a hard drive or RAM in a computer system 1912. An image stream may be saved on the memory as a loop, for example a ten-minute loop or an hour-long loop, which is constantly overwritten as the number of images stored in the memory reach a memory threshold. The image-capturing device 1910 may activate to capture a set of images in response to a trigger, for example a motion-sensor (not shown) electronically coupled to the camera or an inductive vehicle loop sensor, to capture a set of images. The image-capturing device may also transmit location data with a set of images, which may be used to update attribute information on an entity captured in a set of images. For example, the image-capturing device may be directed at an audience area having a designated location, and the image-capturing device may then transmit location data with the set of images, or the system may associate all images sent from the image-capturing device with the location. The image-capturing device may also be configured to be aimed at a plurality of locations, and so may send aiming data with the set of images, which the system may use to correlate an image with a location.

After a set of image fingerprints has been derived from a set of images, the set of images may be deleted or overwritten in memory. In some embodiments, the image-capturing device 1910 may capture just a single image, but preferably the image-capturing device 1910 captures a plurality of images over time. The image-capturing device 1910 may be controlled by an image computer system 1912 having software that, when executed by a processor, captures images, saves at least some of them in a transient or non-transient memory (not show), and forwards them to a server 1950 over a network 1960 for analysis. The network 1960 (FIG. 19) may comprise a cloud network that electronically connects devices with one another, such that data may be transmitted from one device to another via the network 1960. The server 1950 may be configured to analyze one or more images sent from the image computer system 1912 to determine what sort of media content is appropriate as a function of data gleaned from the image-capturing device 1910. While the image computer-system 1912 and the server 1950 are shown symbolically here as two discrete computer systems electronically coupled using the network 1960, but they may be integrated into a single computer system in some embodiments. Similarly, while the image-capturing device 1910 is shown as a single device, a plurality of image-capturing devices may be electronically coupled to the image-computer system 1912 or to the server 1950.

The image-capturing device 1910 may be configured to capture images in real-time, but it may be configured to continuously record sets of images, for example by using a looped memory to hold a video stream. Such embodiments may be preferred in situations where an image-capturing device is monitoring a road with constant traffic, or a parking lot with multiple customers. In embodiments in which images are analyzed in real-time, extracted image fingerprints may be generated, to prevent raw images from being saved on a transient memory. In other embodiments, the image-capturing device 1910 is configured to capture images in response to a trigger from a sensor electronically coupled to image-capturing device 1910. For example, a motion sensor may trigger capturing of an image, or a detection of a vehicle within an inductive vehicle loop sensor may trigger capturing of an image. In such embodiments, the image-capturing device 1910 preferably captures a set of images over time, for example a video stream that starts when a motion sensor detects movement, and ends when the motion sensor fails to detect a movement within a threshold period of time. Feedback mechanisms may also be introduced that trigger alterations in the way image-capturing device 1910 captures images. For example, the image-capturing device 1910 may be configured to derive facial image fingerprints using a real-time analysis algorithm that compares derived facial image fingerprints against facial image fingerprints in an image database 1942, and recognition of matching image fingerprints may trigger the image-capturing device 1910 to derive both facial image fingerprints and transactional identifiers, or both facial image fingerprints and interactions. While a single image-capturing device 1910 is shown, a media content system may have any number of image-capturing devices that work in conjunction with one another with any number of computer systems.

The server 1950 may be configured to perform its analysis of a set of images using one or more databases, such as the image database 1942, a relationship database 1944, an attribute database 1946, an occupancy database 1947, and/or a media database 1948. While each of these databases is shown symbolically as a separate network-attached-storage (NAS) database electronically coupled to network 1960, each of the databases may be integrated into a single memory, or it may be distributed among a plurality of memory systems depending upon need. The databases may be spread among a plurality of systems, and they may be integrated in any suitable manner.

The image database 1942 may be used to associate image fingerprints with identifiers. The image database 1942 may be pre-populated with identifiers that are entered into the database by an authenticated user or by importing such data from a third-party database, such as a third-party database 1934. Authenticated users may comprise administrators of the system, or guests with limited rights, for example a teacher who is provided rights to add identifiers for students in her classroom (e.g. a student ID). Such identifiers may be added using any suitable user interface, for example a website hosted by a server 1950, an email address that automatically processes filled form templates containing identifier information, a service kiosk (not shown), or a combination thereof. In other embodiments, the server 1950 may query the image database 1942 for identifiers that match a given image fingerprint, and if the query returns a null result, the server 1950 may then add a unique identifier into the image database 1942. For example, a facial fingerprint may be searched, and if the image database 1942 returns a null result, that facial fingerprint may be assigned a unique identifier for the future. In this manner, as the media content system is used over time, the image database 1942 may grow dynamically.

The relationship database 1944 may also be used to associate identifiers with other identifiers, for example an identifier of a group (e.g., the color red or the alphanumeric sequence BLUE32) and an identifier of an individual (e.g., a UID or an entry ticket unique identifier associated with the individual). Again, preferably, the relationship database 1944 is pre-populated with relationships that are entered into the database by an authenticated user or by importing such data from a third-party database, such as the third-party database 1934, but the media content system may dynamically add to the relationship database 1944 as well.

When the server 1950 identifies image fingerprints belonging to commonly associated classes, and the relationship database 1944 returns a null value, the server 1950 may be configured to create a new relationship in response to detecting both conditions. For example, if the server 1950 detects a group of facial fingerprints and a license plate within a set of images, and discovers that identifiers for the people with those facial fingerprints and the identifier for the vehicle with that license plate are not in the relationship database 1944, the server 1950 may be configured to then add a relationship to the relationship database 1944 to associate the identifiers of those people with that car. In some embodiments, identifiers captured within a set of images may alter relationships within relationship database 1944. For example, when a set of images contains both a person identifier and a vehicle identifier, a weight of a relationship of occupant between the person identifier and the vehicle identifier may be altered (e.g., an increment of a value). On the other hand, when a set of images contains a vehicle identifier with a different person identifier, a weight of a relationship of occupant between the vehicle identifier and other person identifiers may be decremented. In this way, as the system repeatedly detects the same occupants in a vehicle within sets of images, the weight of the relationship between the occupants and the vehicle may be incremented, and as system repeatedly detects occupants in a vehicle within sets of images that are of not of a person that has an existing relationship with the vehicle may have that relationship weight decremented. In another example, the server 1950 may be configured to create a relationship between a unique identifier of a person (e.g., a facial fingerprint or a UID) and a group when the server recognizes that the person is wearing a badge that is associated with a group.

Several relationships may be defined between the same identifiers, for example an association of a person with a vehicle, and an association of a car seat of that vehicle (e.g., driver's seat, front passenger seat, middle rear seat). In some embodiments, a detected proximity may be enough to trigger the system to create an association (e.g., a group of identifiers within the same set of images), while in other embodiments motion recognition may be necessary (e.g., a movement of a body associated with a facial fingerprint moving into the front passenger door of a vehicle) to trigger the system to create or add a new relationship to the relationship database 1944.

The attribute database 1946 may be used to associate an identifier with attributes of that identifier. Any suitable attribute may be used, for example a preference of a good/service or a demographic. Again, while the attribute database 1946 is preferably pre-populated with attributes that are entered into the database by an authenticated user or by importing such data from a third-party database, such as the third-party database 1934, the media content system may dynamically add to the attribute database 1946. In some embodiments, the media content system may analyze activities that are captured in one or more sets of images. Such embodiments preferably retrieve sets of image data from additional image-capturing devices controlled by the server 1950 or by their own image computer systems, such as the image computer system 1912, and may also glean data from third party sensors, such as a third-party sensor 1932, which feeds information into the third-party computer system 1930 to be stored on the third-party database 1934.

For example, a set of images may capture an image of a person wearing a branded piece of clothing. The server 1950 may then analyze that set of images to uniquely identify a facial fingerprint that is associated with an identifier of a person, and uniquely identify a logo fingerprint that is associated with a particular brand and a clothing type. The server 1950 may then create an attribute for that person's identifier in the attribute database 1946 to associate that person's unique identifier with the brand and/or the clothing type. Attributes may be weighted in any suitable manner, for example via third-party data (e.g. updated data retrieved from a server that contains updated information for a person's attributes), and/or via analysis of sets of images over time (e.g., a person who is found holding a tennis racket in 25 sets of images and who is found holding a basketball in 3 sets of images may have an associated weight distribution favoring a tennis racket, using an algorithm that uses the number of images matching an attribute as an input of the function).

Interactions that may be analyzed within a set of images may be used to alter or modify attributes in the attribute database 1946. For example, if the image-capturing device 1910 captures a set of images of an identified person watching media content that is associated with a tennis racket, and identifies an action of that person looking away from the media content or identifies that the person has not looked at the media content within a threshold period of time, the server 1950 may decrement the weight of the tennis racket attribute associated with that person's identifier in the attribute database 1946. Interactions may also include body movements of an analyzed entity. For example, a smile or an extended thumbs-up may indicate an increased favorability towards another object in the image, while a frown or an extended thumbs-down may indicate a decreased favorability towards another object in the image. In response to detecting such interactions in a set of images along with an identified object or transaction identifier in the set of images, the server 1950 may be configured to alter an attribute of the attribute database 1946, for example by incrementing or decrementing a weight of a numerical attribute value associated with an identifier of the identified object (e.g. a detected smile when holding a type of identified food increments a weight of a value associated with that type of identified food).

Attributes may also be analyzed to alter or modify other attributes in the attribute database 1946. For example, a group may have a time restriction attribute that indicates a limit on how long a group may be able to enjoy a venue. The system may use the time restriction attribute to generate an optimal path for the group that may be saved to the attribute database 1946 for retrieval as also associated directly with an individual instead of only with the group. Such optimal paths may be then used by the system to generate or select media content having routing guidance data for an individual requesting such routing guidance data.

The occupancy database 1947 may be used to store an occupancy of one or more areas monitored by the server 1950, such as exhibits in a venue, fuel stations along a road or highway, or vending machines in a location, such as a theme park. A system 1912 functionally coupled to one or more image capturing devices 1910 may be configured to analyze images captured in a venue to determine how many entities are currently in an area. Such a calculation could be made, for example, by analyzing an image or a set of images taken within a threshold time period, such as 1 minute or 5 minutes, and aggregating unique facial fingerprints that have been detected in that area, by aggregating a number of bodies detected in an image, or by detecting group identifiers in an image and by aggregating group members known to be associated with a group identifier. A system could transmit an occupancy with an identifier associated with the location, such as a location tag or a name of an exhibit, which could then be stored in the occupancy database. Additional information beyond occupancy numbers may be saved with a location, such as a noise level detected by a camera having a microphone. Once the server 1950 receives such information from one or more computer systems that are monitoring areas, such as the computer system 1912, the server 1950 may be configured to save the occupancy information to the occupancy database 1947. Alternatively, computer systems functionally coupled to image capturing devices, such as the computer system 1912, may be configured to save occupancy information directly to the occupancy database 1947.

In another example, the computer system 1912 may transmit sets of images to the server 1950 to perform the identification and aggregation of entities within an area, and may save occupancy information to the occupancy database 1947. In any configuration, the occupancy database 1947 may be configured to dynamically save and update occupancy information for a plurality of areas to assist in making decisions as a function of an occupancy metric.

The system may then use data from the occupancy database to trigger any suitable behavioral effects and responses. For example, the server 1950 may be configured to monitor an area and trigger an alert if the occupancy exceeds a threshold number. The alert could be sent to an employee to notify audience members in the area to visit other areas, or the alert may be used to trigger routing algorithms that influence audience members in the area having exceeded the occupancy threshold to visit other areas. For example, a server 1950 that detects that the occupancy of an area exceeds a threshold may select media content in that area to play that directs some audience members in that area to visit another exhibit, or it may trigger a flag that prevents media content in other areas from suggesting visiting the exhibit with an occupancy that exceeds the threshold. The server 1950 may also use occupancy information to assist in optimizing routes for audience members. For example, the server 1950 may be configured to choose media content that will direct audience members to another exhibit, and it may use attribute information of the audience members to determine what exhibits the audience members may wish to see. The server 1950 may then prioritize the exhibits based upon occupancy metrics to select media content that directs audience members first towards a preferred exhibit having a lower occupancy metric than another preferred exhibit that has a higher occupancy metric.

Media content containing routing guidance may be selected and delivered to audience members in any suitable manner. For example, the server 1950 may be configured to select preferred exhibits for the largest number of audience members, or the largest group of audience members in an audience, and then may prioritize routing guidance for a preferred exhibit having the lowest occupancy. The server 1950 may also identify a number of groups in an audience, such as, for example, the three largest groups in an audience, and may select routing guidance for the three largest groups, and play media content simultaneously or serially directed to the identified three largest groups to provide routing guidance to the preferred exhibits having the lowest occupancy for those groups. (e.g., the system may trigger a video may play directing group A to visit exhibit 5, group B to visit exhibit 7, and group C to visit exhibit 3) An audience member with a mobile device may also connect to the server 1950 to request an optimized route for that audience member, or that audience member's group, based upon the audience member's attributes and preferences to provide optimized routing assistance for the audience member.

The media content database 1948 may be used to associate one or more attributes with a set of media content to provide targeted media content to the media content playback device 1920. While the media content database 1948 may be pre-populated with media content that is saved onto the database by an authenticated user or by importing such data from a third-party database, such as the third-party database 1934, the media content system may be configured to dynamically add new media content to the media content database 1946, or it may add new associations to the media content database 1946 (e.g., a location of an audience member that may be used to route the audience member through a venue). New associations may be added as a function of identified triggering interactions within a set of images. For example, if the image-capturing device 1910 captures a set of images of an identified person watching media content that is associated with an ice cream cone for a threshold period of time, the server 1950 may identify that action and may then associate one or more attributes of that identified person to the media content. Such additions may be configured to be only triggered with rare identified triggers and/or interactions, for example a movement towards the media content playback device 1920, or a large number of persons having a common attribute (e.g. a smile while consuming media content, a threshold period of time looking in a particular direction).

The media content database 1948 may have media that are associated with a quantified aggregate of attributes. For example, the media content database 1948 may associate a set of media content with an attribute condition of at least a minimum number of members of a group being present, or the media content database 1948 may associate a set of media content with an attribute condition of at least a minimum amount of money spent in a category of goods. The media content database 1948 may also assign a weight to the media content itself, allowing a database user to prioritize the media content itself as opposed, or in addition to, to using attributes retrieved from the attribute database 1946 to weight and prioritize one set of media content verses another set.

The server 1950 may then transmit one or more sets of media content from the media content database 1948 to a playback computer system 1922 for playing on the media content playback device 1920. The set of media content may be weighted in accordance with weighted attributes of the identifiers, such that media content with greater weight is afforded priority. Alternatively, media content from the set of media content may be randomly chosen for playback. In another example, both the media content and attributes may be sent to the playback computer system 1922, where the attributes alter the manner in which selected media content is played. For example, an attribute may be a volume of a video that is played, or it may be a language that an audio portion of a video is played in, or it may be a language that in which a video's subtitles are shown. Attributes may trigger different media content to be derived, for example an age attribute may trigger a decision between a cartoon or a live-action media file.

The server 1950 or the playback computer system 1922 may use several different metrics from one or more of the image database 1942, the relationship database 1944, the attribute database 1946, the occupancy database 1947, and the media database 1948 to determine media to play to the media content playback device 1920. For example, system may be configured to use attributes of an audience member, attributes of a group of audience members, numbers of audience members having a same attribute or a same type of attribute, numbers in a group of audience members having a same attribute or a same type of attribute, and/or occupancy numbers for areas monitored by the system, to select media content. The system may be configured to weight some considerations more heavily than others. For example a system that weights time restrictions more heavily may eliminate media content from consideration that has a running time that is longer than an audience member, or a group of audience member's time restriction, or a system that weights occupancy data more heavily may completely eliminate media content having routing guidance from consideration that routes audience members towards an area or an exhibit exceeding a threshold occupancy number. Further processes used for consideration are described in more detail below.

While FIG. 19 illustrates a plurality of computer systems configured to work cooperatively with one another—the image computer system 1912, the playback computer system 1922, the server 1950, and the third-party computer system 1930—any number or combination of computer systems may be used. For example, the image-capturing device 1910 and the media content playback device 1920 may be controlled by a common computer system, and that common computer system may be configured to function in the role of the server 1950 with one or more of the databases 1942, 1944, 1946, and 1948 stored on its local memory. In other embodiments, the roles and responsibilities of each of the computer systems may be distributed among a plurality of computer systems. Where a system is implemented to monitor a venue, the databases 1942, 1944, 1946, 1947, and 1948 may be located local to the venue (e.g., within the building or on the same physical LAN) to minimize data transfer between the database and systems that are retrieving relationships, attributes, and/or occupancy data to select media content.

Figure 20:
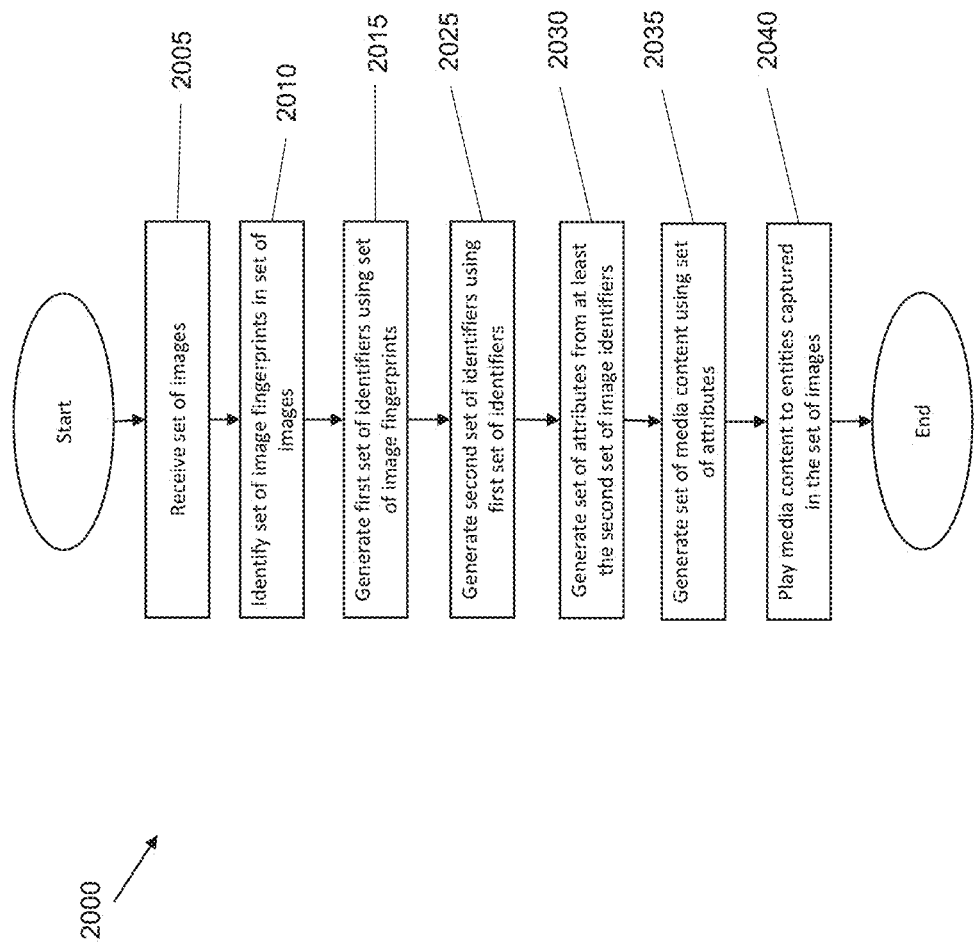
FIG. 20 shows an exemplary method of using the media delivery system of FIG. 19.

FIG. 20 shows an exemplary process 2000 that may be used by one or more media content computer systems to provide media content to a media content playback device. In step 2005, the media content computer system may receive a set of images, for example from an image capture device. In step 2010, the computer system may analyze the set of images to derive a set of image fingerprints, such as facial fingerprints, license plates, or shirt tags. In step 2015, the computer system may generate a first set of image identifiers, for example by cross-referencing the set of image fingerprints against in image database comprising correlations between image fingerprints and identifiers. In step 2025, the computer system may generate a second set of identifiers using at least some, if not all, of the first set of identifiers, for example by querying a relationship database using the first set of identifiers. In step 2030, the computer system may generate a set of attributes using at least some of the second set of identifiers, and in some embodiments using at least some of both the second set of identifiers and the first set of identifiers. Derivation of the set of attributes may be performed, for example, by querying an attribute database comprising correlations between identifiers and attributes. In step 2035, the computer system may generate a set of media content using the set of attributes, for example by querying a media content database comprising correlations between attributes and media content. Preferably the attributes are weighted, where some attributes have heavier weights than others. In some embodiments, the set of media content may comprise just identifiers that are used by a playback system to retrieve media content, while in other embodiments the set of media content may comprise media files themselves. Preferably, the set of media content is weighted or organized into a weighted list, where media content with a higher weight has a higher correlation with higher weighted attributes. In step 2040, the computer system may then play at least some of the set of media content on a media content playback device.

The embodiments herein may be utilized to provide targeted media content to a media content playback device using any suitable identified relationship within a set of images. For example, the image-capturing device 1910 may capture an image of a face, and the image computer system 1912 may transmit that image or a facial fingerprint via the network 1960 to the server 1950 for analysis. The server 1950 may then compare that facial fingerprint via the network 1960 with the image database 1942 to determine an identifier. That identifier is then used to query the attribute database 1946, to find out that the identified person has a preferred language. The server 1950 may be configured to query the media database 1948 for the preferred language attribute to find media content preferably watched by person who has been identified as having the preferred language. This information would then be forwarded to the playback computer system 1922. The playback computer system 1922 then pulls one of the media content files and plays it on the media content playback device 1920 of an A/V display at a venue or location, e.g., a vehicle fuel station, checking subsequent images captured by the image-capturing device 1910 to see if the person is watching. If the person is not identified as watching within a certain threshold time period, the playback computer system 1922 may then cycle to another media file.

In another embodiment, the image-capturing device 1910 captures a group of people and transmits a set of images to the server 1950 for analysis. For example, the server 1950 may identify a first set or number (e.g., 20) of the group of people as wearing an aqua-colored, square-shaped tag, and a second set or number (e.g., 5) as wearing a teal-colored, square-shaped tag. In this embodiment, the server 1950 is configured to only analyze square-shaped tags. The server 1950 may be configured to query the image database 1942 for the term "aqua" to determine that "aqua" is associated with a first identified group, and it may query the image database 1942 for the term "teal" to determine that "teal" is associated with a second identified group. These identifiers may then be used to query the attribute database 1946 to determine that the attribute "English" is associated with the first identified group, and that the attribute "Spanish" is associated with the second identified group. "English" may be given a weight of 20 where the system determines that there exist 20 instances of aqua badges found in the set of images, while "Spanish" may be given a weight of 5 where the system determines that there exist 5 instances of red badges found in the set of images, accordingly. Those attributes may then be used to query the media database 1948 to retrieve media having English audio and Spanish subtitles. The playback computer system 1922 then plays that media on the media content playback device 1920 of an exhibit after receiving that media content from the server 1950.

In another embodiment, the image-capturing device 1910 may be configured to capture a group of people entering a vehicle, and to transmit a set of images to the server 1950 for analysis. The server 1950 would then query the image database 1942 to determine identifiers for the people and the vehicle, and then query the relationship database 1944 to determine if those people are associated with the vehicle. If the latter query results in a null value, the server 1950 may be configured to add relationships between the identifiers of the people and the identifiers of the vehicle to the relationship database 1944. This relationship may be set by the computer system to have no expiration date, or it may be set to expire at the end of a given time period, for example, at the end of a spring break holiday week or on Sunday when the weekend is over. At a later time, the image-capturing device 1910 may be configured to capture an image of just that vehicle, and transmit that set of images to the server 1950 for analysis. The server 1950 would then query the image database 1942 to determine an identifier for the vehicle using the captured license plate number, and it may be configured then to query the relationship database 1944 to determine a relationship between the identifier of the vehicle and various identifiers for the people. The server 1950 may be configured to query the attribute database 1946 using the identifiers of the people to determine attributes of the people, and it may be configured to weight the attributes appropriately in an aggregated list of attributes, for example by adding the attributes together (e.g., person 1 has a 0.2 attribute for a hamburger and person 2 has a 0.3 attribute for a hamburger, resulting in an aggregated 0.5 attribute for a hamburger). The server 1950 may be configured to query the media content database 1948 to determine a set of media content appropriate for the attributes in that vehicle, and may be configured to transmit that set of media content to the playback computer system 1922, which may be coupled to a media content playback device 1920 of a billboard that will display to that vehicle, or directly to the vehicle itself to play media content to occupants of the vehicle. The system may be configured to determine a set of media content for audience members in a vehicle using any attributes of the vehicle, including preferential attributes of the passengers (e.g. media content selected based upon common interest of the passengers or purchasing habits of any of the passengers of the vehicle) or common attributes of the vehicle (e.g., location of the vehicle, lowest, highest, and average velocities of the vehicle, time the vehicle is estimated to take to reach a destination associated with media content).

In some embodiments, that media may be configured to be played immediately by an authorized media player, while in other embodiments, the system may be programmed to play the media at a given distance (e.g., one mile or 1.5 km) up the road, triggered as a function of a calculated time/distance threshold (e.g., average speed of the vehicle), or when a separate image-capturing device placed just before a system controlling the billboard identifies the same license plate (e.g., upon recognition, a trigger is sent to queue the selected media content).

Groups of vehicles may be analyzed to derive attribute data for the group. For example, a set of images of various vehicles may be captured by image-capturing device 1910 over a period of time (e.g., a single instant or a period of five seconds). Image computer system 1912 may be configured to analyze the set of images to generate image fingerprints. In some embodiments the analysis may generate identifiers of the cars, such as a license plate of a vehicle or a make/model of the vehicle, while in other embodiments the image fingerprints are transmitted to server 1950 to query image database 1942 to determine identifiers of each vehicle. The generated identifiers may be configured to be used by server 1950 to query relationship database 1944 and glean a plurality of related identifiers (e.g., occupants of those vehicles or types of vehicles), which may, in turn, be used to query attribute database 1946 and glean attributes for each related identifier. In this manner, attributes for a large population of derived vehicle occupants may be gleaned. Preferably, the attributes are aggregated, for example by summing the weighted values of the attributes. While the totality of the attributes may then be used by the server 1950 to derive sets of media content for media database 1948, in preferred embodiment only a subset of the attributes is selected, preferably as a function of the weight of the attributes (e.g., the top attribute or the top 5 attributes), to be used to derive sets of appropriate media content from media database 1948. The server 1950 may be configured to transmit the set of media content to the playback computer system 1922 to play to the media content playback device 1920. In some embodiments, where the vehicles are not moving, for example a traffic jam or at a drive-in movie theater, the playback computer system 1922 may be configured to avoid repeating media content (e.g., by deleting media content from a list of the set of media saved on memory after playback), or non-repeating media content within a threshold of time (e.g., within a half an hour).

A third-party computer system 1930 may be provided access to the relationship database 1944 to verify relationship data that has been saved to relationship database 1944. For example, the server 1950 may derive both a driver identifier (e.g., by recognizing an interaction of entering a driver's door of a vehicle and capturing a one or more images of the entity entering that vehicle) and a vehicle identifier from a set of images (e.g., by querying the image database 1942 with a facial fingerprint and a license plate number) and may then save both identifiers as a relationship along with a time-stamp in the relationship database 1944. A third-party computer system 1930 may be configured to transmit a query to the server 1950 using an identifier of a vehicle (e.g., a license plate of the vehicle) and a time period and the server 1950 may be configured to respond to the third-party query by providing identifiers of the parties that have been captured as drivers of that vehicle within the time period. In other embodiments, the third-party computer system 1930 may provide a facial fingerprint or an identifier of an authorized driver, and server 1950 may be programmed to only provide information that an entity that is not the authorized driver or is not a person who matches the received facial fingerprint is the driver of the car.

The third-party computer system 1930 may be configured to have authorized access to set a triggering alarm on the server 1950 related to a vehicle identifier. For example, the third-party computer system 1930 may be configured to provide a vehicle identifier to the server 1950 along with a set of facial fingerprints, and the server 1950, in response, may be configured to create identifiers for each of the set of facial fingerprints in the image database 1942, and it may associate the vehicle identifier with the newly created identifiers in the relationship database 1944 with an "authorized driver" tag. The server 1950 may be configured to analyze sets of images for facial fingerprints of entities having a recognized interaction of driving a vehicle, or exiting a driver's door of a vehicle, and for vehicle identification indicia (e.g., a license plate number). The server 1950 may be configured to derive identifiers for entities having the driver interaction with the vehicle and the identifier of the vehicle, and to search the relationship database 1944 for a relationship of "authorized driver" between the input search query terms. If the server 1950 fails to find an authorized driver relationship, then the server 1950 may be configured to transmit to the third-party computer system 1930 (or any other computer system defined by a user of the third-party computer system 1930) an alert that an unauthorized driver is driving the vehicle.

The server 1950 may be configured to save one or more sets of images from the image-capturing device 1910 to a memory in response to a trigger, for example local memory on the server 1950, the media database 1948, or the third-party database 1934. In some embodiments, the third-party computer system 1930 may be configured to transmit a request for the server 1950 to save images having or lacking a relationship, or having or lacking an attribute. For example, the server 1950 may be configured to save one or more sets of images where the server 1950 fails to find an authorized driver relationship between a captured driver and an identified vehicle. In another embodiment, the server 1950 may be configured to save one or more sets of images where the server 1950 identifies an attribute of "save image" with an identifier. Such images may be saved with metadata information, such as a time-stamp, a location of the image-capturing device, and/or an identifier of a location of the image-capturing device, and may be pushed to a third-party computer system that requested the information in real-time, or they may be stored on a memory for retrieval at a later time. In some embodiments, the request from the third-party computer system 1930 may have an expiration-date timer to delete sets of images after a provided time period threshold.

The server 1950 may be configured to transmit one or more attributes to a third-party computer system 1930 instead of, or in addition to, playing a set of media content. For example, where the image-capturing device 1910 captures images about a fuel station pump, and the media content playback device 1920 is a screen at a fuel station, the third-party computer system 1930 may be configured to control an auto-select feature of a fuel pump. In such embodiments, the set of captured images from the image-capturing device 1910 may comprise a vehicle fingerprint, such as a photo of a license plate, which may be processed by a computer system, such as the image computer system 1912 or the server 1950, to derive a license plate identifier or a make/model vehicle identifier. The server 1950 or the image computer system 1912 may be configured to use that derived identifier to query the attribute database 1946 and determine a preferred fuel type for the vehicle, and it may be configured to transmit a retrieved preferred fuel type to the third-party computer system 1930, which then auto-selects the preferred fuel type.

Figure 21:
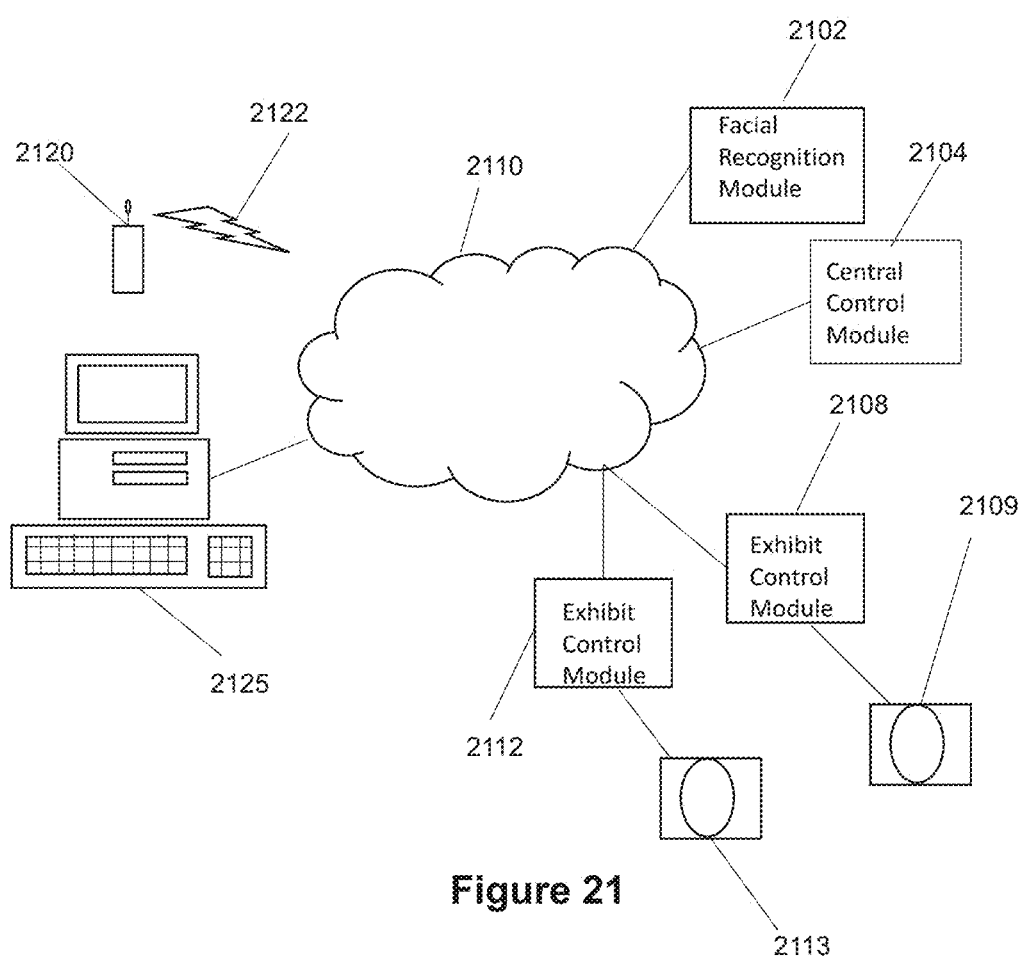
FIG. 21 shows a diagrammatic representation of an embodiment of systems and devices that perform processes for providing location information for groups of users in a venue in accordance with one aspect of the disclosure.

FIG. 21 illustrates an alternative system 2100 for providing media content to supplement an exhibit in accordance with an aspect of the disclosure. The system 2100 includes a facial recognition module 2102; a central control device or module 2104; and exhibit control modules 2108 and 2112 that are communicatively connected by a network 2110. A portable personal communication device 2120 and a computer 2125 may also be connected to the network 2110. Although shown as four separate devices or functionalities in FIG. 21, the facial recognition module 2102; the central control module 2104; and the exhibit control module 2108 and 2112 may be provided by a single computing system. Alternatively, the processes that provide one or more of the facial recognition module 2102, the central control module 2104, and the exhibit control module 2108 may be distributed across multiple systems that are communicatively connected via the network 2110.

The facial recognition module, functionality, or system 2102 may be implemented or functionalized by a computer system that includes a memory and a processing unit to perform the processes for providing facial recognition and/or other image analysis. The computer system that implements the facial recognition module, functionality, or system may include one or more servers, routers, computer systems, and/or memory systems that are communicatively connected via a network to provide facial recognition and/or other image analysis.

The central control device or module 2104 may be implemented or functionalized by a computer system that includes a memory and a processing unit to perform processes for storing and providing media content for one or more exhibits in a venue. The central control device or module 2104 may also advantageously store and update location information of a user. The central control functionality may be provided by a central control system for the venue. Specifically, the central control device or module 2104 may be implemented or functionalized by a system that includes one or more servers, routers, computer systems, and/or memory systems that are communicatively connected via a network to store and provide media content for one or more exhibits in the venue, as well as to store and update location information for registered users.

Each of the exhibit control modules 2108 and 2112 may be implemented or functionalized by a computer system that controls devices in the exhibit area that include an image capture device, such as devices 2113 and 2109, respectively. Advantageously, one computer system may include one or more control devices for one or more exhibits. In specific embodiments, the exhibit control modules 2108 and 2112 may be implemented or functionalized by a system that includes one or more servers, routers, computer systems, memory systems, an image capture device and/or media playback devices that are communicatively connected via a local network to obtain and present media content for the exhibit.

The network 2110 may advantageously be the Internet. Alternatively, the network 2110 may be a Wide Area Network (WAN), a Local Area Network (LAN), or any combination of Internet, WAN, and LAN that may be used communicatively to connect the various devices and/or modules shown in FIG. 21.

The portable personal communication device 2120 may a smart phone, tablet, Personal Digital Assistant (PDA), a laptop computer, or any other device that is connectable to the network 2110 via wireless connection 2122. The computer 2125 may advantageously connect to the network 2110 via either a conventional wired or a wireless connection. The computer 2125 may be, for example, a desktop computer, a laptop, a smart television, and/or any other device that connects to the network 110. The portable personal communication device 2120 and/or the computer 2125 allow a user to interact with one or more of the above-described modules to provide information such as, for example, personal information to be added to registered user information of the user.

Although a particular system of devices and/or functional modules is described above with respect to FIG. 21, other system architectures that, add, remove, and/or combine various devices and/or modules may be used to perform various processes in accordance with various other aspects of the disclosure.

Figure 22:
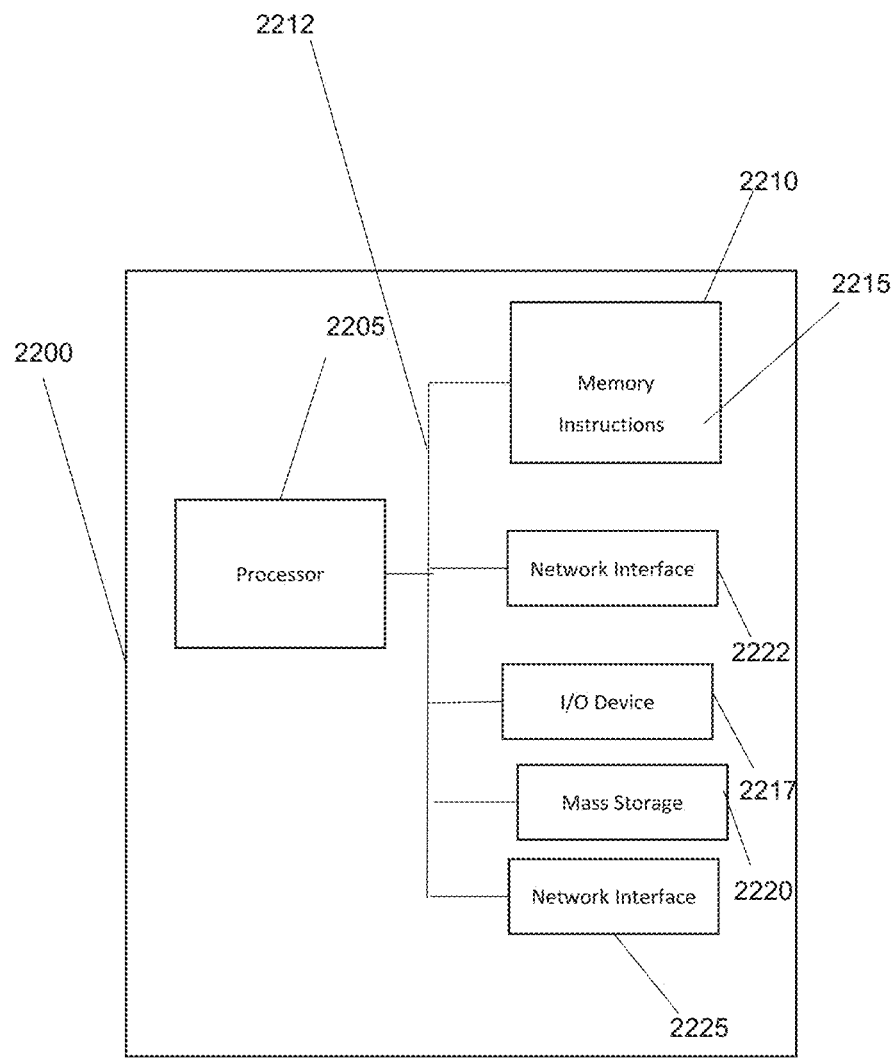
FIG. 22 is a block diagram of an embodiment of a computer processing system in a component in accordance with an aspect of the disclosure.

FIG. 22 is a high-level block diagram showing architecture of an exemplary processing system 2200 that may be used according to some aspects of the disclosure. The processing system 2200 may represent a computer system that provides a facial recognition functionality, a central control functionality, an exhibit control functionality, and/or other components or functionalities. Certain standard and well-known components of a processing system which are not germane to the subject matter of this disclosure are not shown in FIG. 22.

The processing system 2200 may include one or more processors 2205 in operative communication with memory 2210 and coupled to a bus system 2212. The bus system 2212, as shown in FIG. 22, is a schematic representation of any one or more separate physical buses and/or point-to-point connections, connected by appropriate bridges, adapters and/or controllers. The bus system 2212, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as Firewire).

The one or more processors 2205 are the central processing units (CPUs) of the processing system 2200 and, thus, control its overall operation. In certain aspects, the one or more processors 2205 accomplish this by executing software stored in memory 2210. The processor(s) 2205 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 2210 represents any form of random-access memory (RAM), read-only memory (ROM), flash memory, or the like, or a combination of such devices. Memory 2210 includes the main memory of the processing system 2200. Instructions 215 implementing the process steps of described below may reside in memory 2210 and are executed by the processor(s) 2205 from memory 2210.

Also advantageously connected operatively to the processor(s) 2205 through the bus system 2212 are one or more internal or external mass storage devices 2220, and a network interface 2222. The mass storage device(s) 2220 may be, or may include, any conventional medium for storing large volumes of data in a non-volatile manner, such as one or more solid state, magnetic, or optical based disks. The network interface 2222 provides the processing system 2200 with the ability to communicate with remote devices (e.g., storage servers) over a network, and may be, for example, an Ethernet adapter, a Fiber Channel adapter, or the like.

The processing system 2200 also advantageously includes one or more input/output (I/O) devices 2217 operatively coupled to the bus system 2212. The I/O devices 2217 may include, for example, a display device, a keyboard, a mouse, etc.

Figure 23:
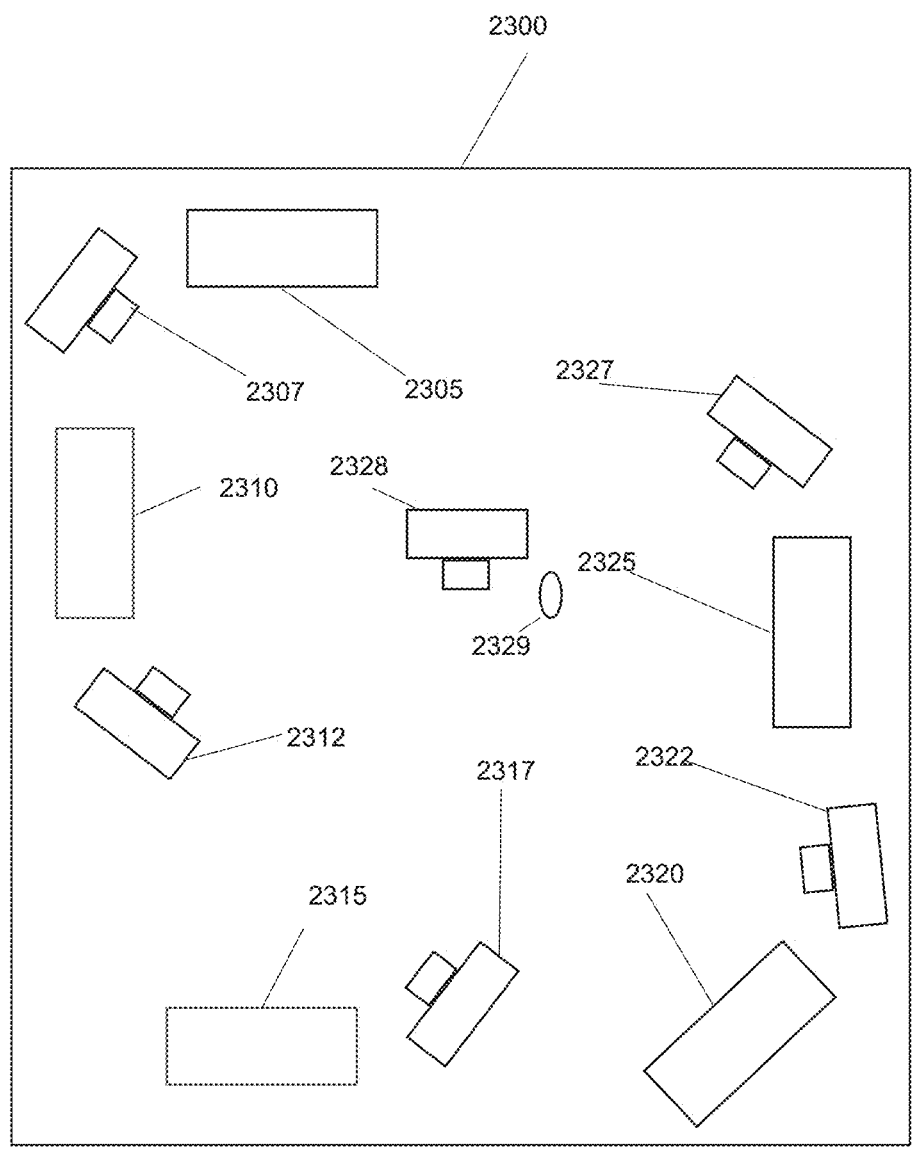
FIG. 23 is conceptual perspective view of an exemplary venue having placement of image capture devices at various exhibits in the venue in accordance with an aspect of the disclosure.

FIG. 23 illustrates a venue with multiple exhibits or attractions in accordance with an aspect of the disclosure. The venue 2300 may include multiple exhibits or attractions, including (for example) exhibits 2305, 2310, 2315, 2320, and 2325. Each exhibit may preferably have an associated image capture device 2307, 2312, 2317, 2322, and 2327 respectively.

For example, the exhibit 2305 is shown as having an associated image capture device 2307 that is focused on an area in front of exhibit 2305 to capture an image with facial images of patrons entering the exhibit 2305. Preferably, the area is defined by an admin user who focuses on sections of an image, or controls a camera to point at pre-defined areas in front of exhibit 2305. Preferably, the image capture device is focused on an area near an entrance and/or exit of the exhibit to ensure capturing images with the greatest number of facial images of patrons. Furthermore, although one associated image capture device is shown with each exhibit, an exhibit may have more than one associated image capture devices in accordance with various aspects of this disclosure. Furthermore, image capture devices, such as the image capture device 2328, may be placed in various locations around the venue 300, such as, but not limited to, high traffic areas to capture location information of patron in the location and/or as many patrons as possible.

In accordance with some aspects, a proximity sensor 2329 may be associated with an image capture device 2328 to detect when one or more patrons are in a location. The proximity sensor may send a signal to the image capture device 2328 when one or more patrons are detected. The image capture device then captures an image of the location for use in location determination of registered users as will be discussed in more detail below.

Although an exemplary venue is described above with reference to FIG. 23, other configurations that add, remove, combine, and/or move components relative to one another are possible.

Figure 24:
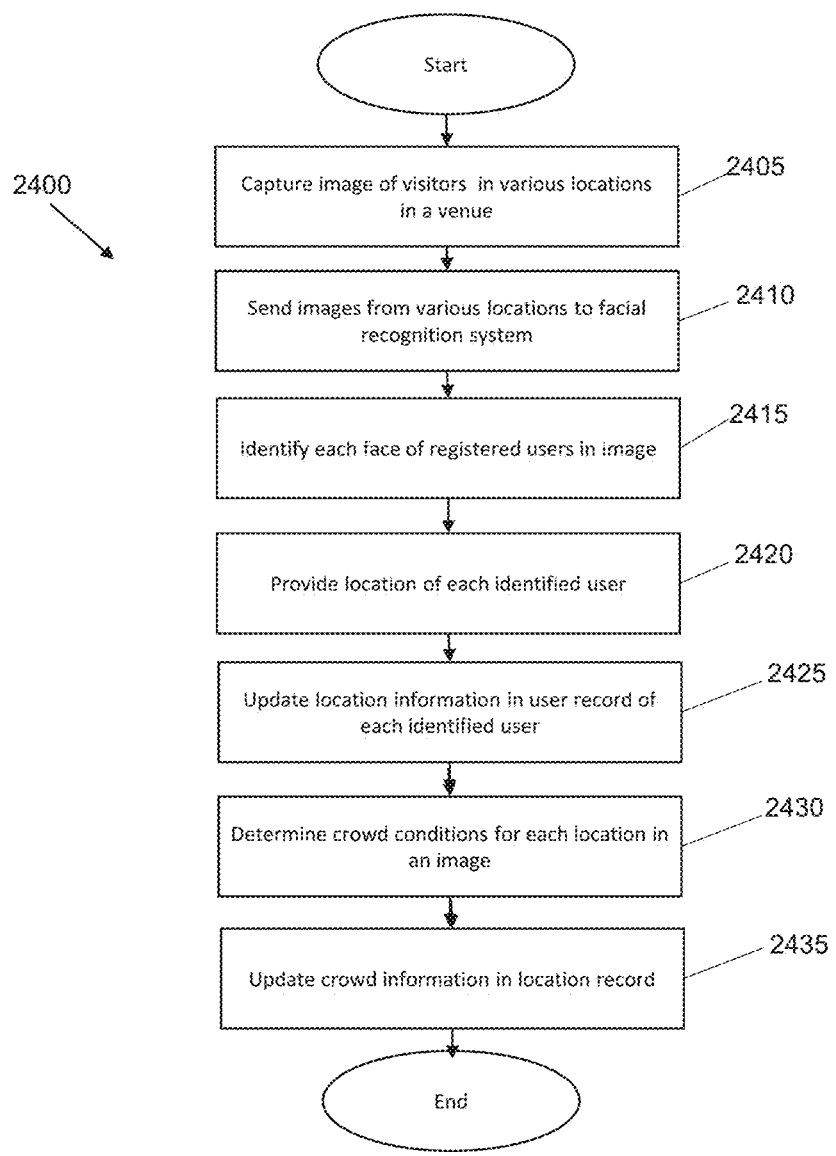
FIG. 24 is a flow diagram of an exemplary process for providing location information about users at various locations in a venue in accordance with an aspect of the disclosure.

FIG. 24 illustrates a flow diagram of a process for providing location information about users at various locations in a venue in accordance with an aspect of the disclosure. One example of a registration process for users is described below in detail with respect to FIG. 36. The process 2400 captures images of patrons in various known locations throughout the venue 2405 using a plurality of image capture devices, for example devices 2307, 2312, 2317, 2322, 2327, and 2328 in FIG. 23. For example, a location may be, but is not limited to, an entrance or an exit of an exhibit; an entrance or exit of the venue; and/or other high traffic locations in the venue. The captured images are advantageously provided to a facial recognition device or module (e.g., indicated by the number 2102 in FIG. 1) in step 2410. The facial recognition device or module identifies the desired portions of each captured image that include the facial image of one or more patrons in step 2415.

A facial recognition process is then performed on the identified portion of each captured image to identify (e.g., with appropriate user information) each registered user in each image and associate each identified user with the location where the image was captured in step 2420. The location of each identified user is then updated in a location record, such as those shown in FIG. 33, for the user in step 2425. Crowd conditions in a location including, but not limited to, crowd size for an exhibit, may also be determined from the image of each location in step 2430. For example, software may be configured to count entities with unique facial fingerprints in a set of images taken over time. The crowd information for each location is then updated in a location record, for example in database 3400 shown in FIG. 34, in step 2435 after which the process 2400 ends.

As discussed above, an exhibit control device, or module (e.g., 2108, 2112 in FIG. 21) may be configured to capture the images of the patrons in near an exhibit/high traffic area. In some embodiments, the exhibit control device, or module may be a separate system that is not associated with a specific exhibit. Instead, the image capture device (e.g., as indicated by the number 2328 in FIG. 23) is a high traffic location and associated with a location control system and/or associated exhibit control system, to send information to the central control device or module (e.g., 2104 in FIG. 21).

The above describes an overall process for obtaining location information registered users and/or crowd information for a location in a venue in accordance with one aspect of the disclosure. However, other processes that add, combine, remove, and/or reorder the steps of the process are possible.

Figure 25:
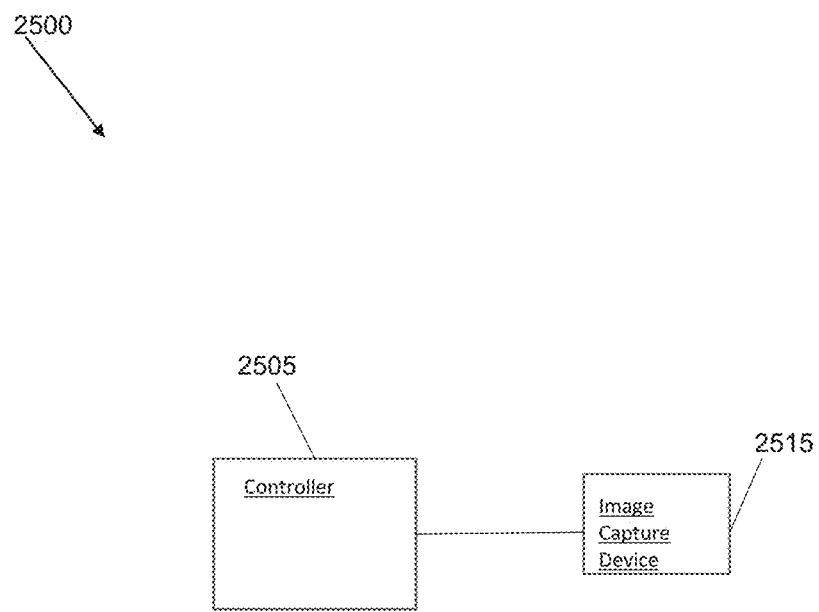
FIG. 25 is a block diagram of exemplary components of an exhibit control system in accordance with an aspect of the disclosure.

FIG. 25 is a block diagram of components of an exemplary exhibit control system, device or module 2500 and/or location control system (similar to those indicated by the numbers 2108, 2112 in FIG. 21) which, in accordance with an aspect of the disclosure, includes a controller 2505 and an image capture device 2515 (similar to the image capture device 2328 in FIG. 23).

The controller 2505 may be implemented as a processing system that controls the image capture device 2515 in capturing images of an area and/or location to obtain the location information for registered users using image analysis of the captured image. In accordance with some aspects, the controller 2505 may also control one or more components of the exhibit. These components may include, for example, valves, hydraulic lifts, animatronics that provide motion in the exhibit, and any other components that receive instructions to perform a task to facilitate the presentation of the exhibit. In some other aspects, the control system for more than one exhibit may be provided by a processing system. These control devices may be controlled via a triggering mechanism that is triggered by recognition of pre-defined image characteristics or movements within a set of images. For example, a table may define that an animatronic activates when a predefined teacher or a predefined student or an entity having the attribute of a teacher is recognized within a set of images.

The image capture device 2515 may be a camera that captures still images and/or a video camera that captures video images (i.e., a set of images). In the exemplary embodiment shown in FIG. 25, the image capture device 2515 is a separate device including a processing system that is communicatively connected to the controller 2505 via a wireless or wired connection. In some other aspects, the image capture device 2515 is an I/O device of the processing system or module including the controller 2505. As discussed above, the image capture device 2515 is positioned such that the device is focused on a particular area near the exhibit in a manner to capture images that include facial images of patrons in the area. The image capture device 2515 may also capture, record, or otherwise provide other information, such as depth information for the imaged image objects.

Although an exemplary embodiment of an exhibit control device or module is described above with respect to FIG. 25, other embodiments that add, combine, rearrange, and/or remove components are possible.

Figure 26:
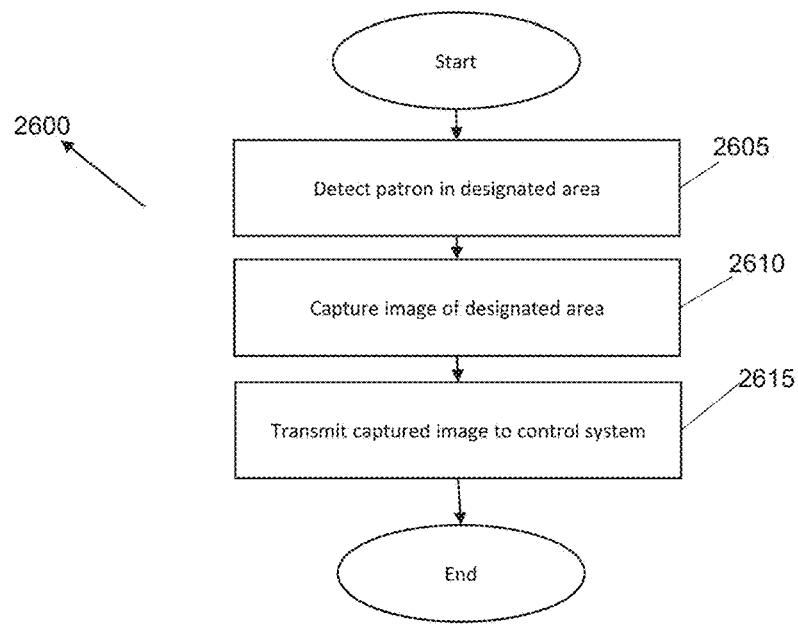
FIG. 26 is a flow diagram of an exemplary process performed by the exhibit control system to capture an image of registered users in an exhibit area in accordance with an aspect of this disclosure.

FIG. 26 illustrates a flow diagram of an exemplary process 2600 performed by the exhibit control device or module (2500 or 2108/2112) to capture images to provide location information for registered users in accordance with an aspect of this disclosure. In the process 2600, a patron is detected in an area (2605) by, for example, the facial recognition system, motion sensors, heat sensors, and/or any other type of sensor that may detect the presence of one or more patrons in the audience area.

An image is captured of the area (2610), for example, in response to the detection of one or more patrons in the designated area by image capture device 2515. Alternatively, the image capture device may periodically capture an image at pre-defined intervals of time, or a video feed of the designated area may be continuously captured, and one or more images may then be extracted from the video feed when one or more patrons are detected in the designated area.

The captured image is transmitted (2615) to a central control device or module (e.g., 2104, FIG. 21), optionally with other information about the image. Such other image information may include, for example, camera settings, depth information, a time stamp, lighting information, a location, and/or other like information related to the image. The image information may be transmitted separately, or it may be transmitted in or with the captured image. Optionally, a video feed may be provided to the central control device or module. The exhibit control device or module may optionally monitor a video feed and only send an image that includes patrons taken from a feed when a patron is detected in the area. The exhibit control device or module may optionally perform image processing to improve image quality prior to transmitting the image, and/or it may optionally isolate facial images from the captured image and send only portions of the image that include facial images to the central control device or module. Process 2600 may then end.

Although an exemplary process performed by the exhibit control device or module to obtain location information for registered users in accordance with aspects of this disclosure is discussed above with respect to FIG. 26, other processes performed by the exhibit control device or module to provide the media content that add to, combine, rearrange, or remove any of the described steps are possible and are considered within the scope of this disclosure.

In accordance with some aspects of this disclosure, the system may also store records of consumable products that a registered user purchases and/or is awarded. Such records may be entered into a database via one of the disclosed computer systems that recognizes a transaction and records attributes of that transaction in a database. For purposes of this discussion, consumable products are any item that may be awarded to or purchased by a registered user in the venue. Examples include, but are not limited to, toys, gift certificates, souvenirs, or any other item that a user may obtain in the venue. The user may then go to a redemption center at a later time and obtain the consumable products that the user had purchased/received earlier. Preferably, the redemption center would be near the exit of the venue to allow the user to collect the obtained consumable products just prior to leaving the venue.

Figure 27:
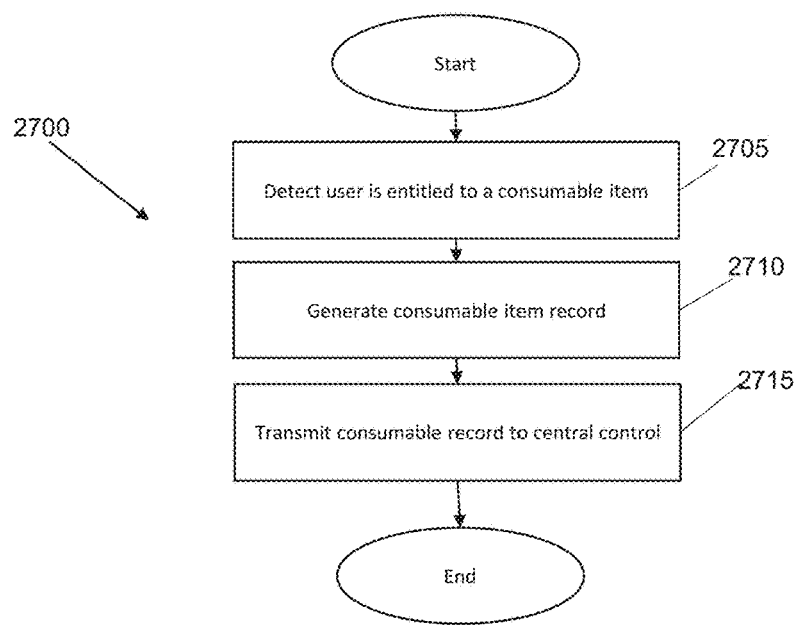
FIG. 27 is a flow diagram of an exemplary process performed by the exhibit control system to capture provide consumable information about registered users in accordance with an aspect of this disclosure.

FIG. 27 illustrates a flow diagram of a process performed by an exhibit control module or device (e.g., as indicated by the number 2108 in FIG. 21) to send information about a consumable product obtained by a registered user at the exhibit. The process 2700 begins by detecting the user is entitled to a consumable product (2705). This detection may be a purchase of a consumable product or an awarding of the consumable product as a prize in a game and/or contest. For example, an image may be taken of the user, and a facial fingerprint may be entered into an image database to retrieve an identifier of the user, which is then cross-referenced against a database that contains relationships between entity identifiers and product entitlements. When such an entitlement is returned by the database, the receipt of such may trigger recognition that the user in the image is entitled to a consumable product identified in the database.

The process then generates a record for the consumable product that indicates the consumable product contained and the registered user that obtained the item (2710). The record of the consumable product is then transmitted to the central control system (2715) and the process 2700 ends.

Although an exemplary process performed by the exhibit control device or module to provide records of consumable products obtained by users in accordance with aspects of this disclosure is discussed above with respect to FIG. 27, other processes performed by the exhibit control device or module to provide the media content that add to, combine, rearrange, or remove any of the described steps are possible and are considered within the scope of this disclosure.

Similar to the consumable products discussed above, some exhibits and/or areas may have areas available for photo opportunities and have venue employees and/or professional photographers at the photo opportunity area to capture an image of a registered users and/or a group of users. In accordance with some aspects of the disclosure, the system provides a system for storing the images captured at various photo opportunity areas and making the images available to the registered user or a user authorized to act for the register user for retrieval and/or purchase.

Figure 28:
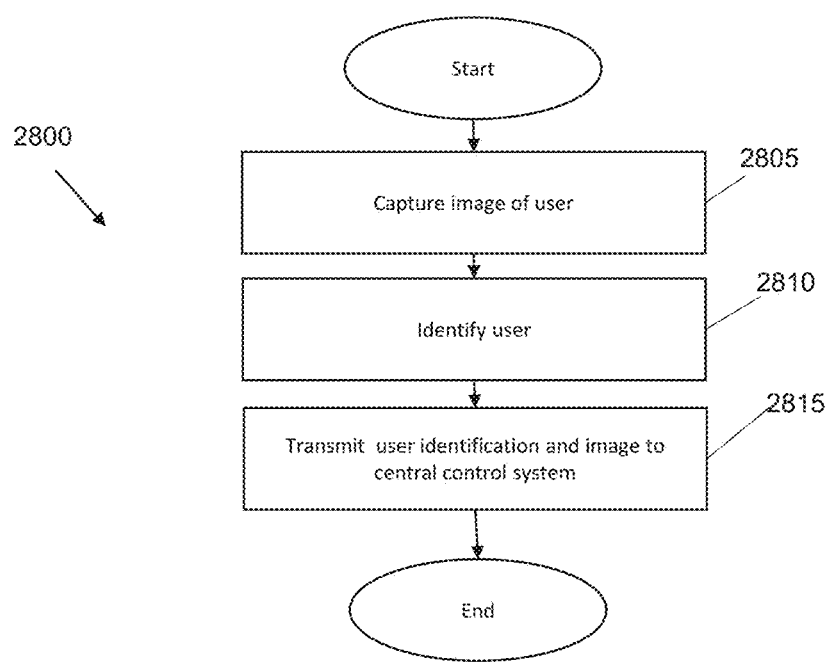
FIG. 28 is a flow diagram of a process performed by an exhibit control system to associate an image captured at a photo opportunity are with a registered user in accordance with an aspect of the disclosure.

FIG. 28 illustrates a flow diagram of another exemplary process performed by an exhibit control system, device, or module (e.g., as indicated by the number 2108 in FIG. 21); and/or location control system, device, or module to provide images of a captured user to the central control system, device, or module (as indicated, for example, by the number 2104 in FIG. 21) for retrieval by the user.

The process 2800 begins by capturing an image of a registered user at a photo opportunity area associated with the exhibit/area (2805). This image may be captured with an image capture device that is separate and/or different from the image capture device(s) used for location determination.

The process then identifies each registered user associated with the captured image (2810). The identification may be performed by reading a bar and/or bar code on a card carried by the user in accordance with some aspects. In accordance with some other aspects, the identification may be performed using the facial recognition system, device, or module (e.g., as indicated by the number 2102 in FIG. 21). The image and identifiers (FIG. 33) associated with each identified registered user in the image are transmitted to the central control system (2815). In accordance with some embodiments, the identifiers of the identified registered users may be embedded in the metadata of the image, or they may be added to the metadata of the image by the system. In accordance with some other embodiments, an image record that includes the image and the identifiers may be generated and transmitted. This metadata may be saved onto a database to allow for easy-searching of the image. The process 2800 may then end.

A process performed by an exhibit control system, device or module to provide images of registered users captured in an photo opportunity area in accordance with an aspect of the disclosure is described above with reference to FIG. 28. Other processes performed by the exhibit control system, device, or module to provide the media content that add to, combine, rearrange, or remove any of the described steps are possible and are considered within the scope of this disclosure.

Figure 29:
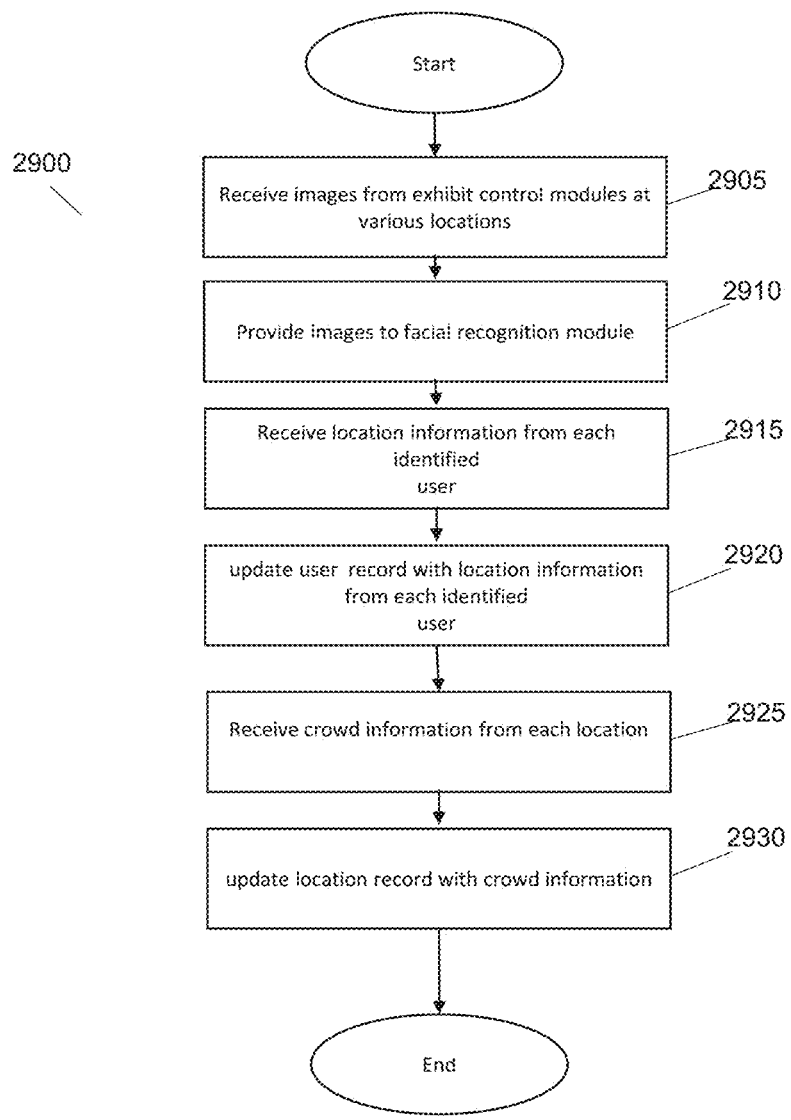
FIG. 29 is a flow diagram of a process performed a central control system to maintain and provide location information for registered users and crowd information for locations including exhibits in accordance with an aspect of the disclosure.

FIG. 29 illustrates a flow diagram of an exemplary process performed by the central control device or module (e.g., as indicated by the number 2104 in FIG. 21) to obtain and store location information for registered users; and/or obtain and store crowd information for exhibits and/or locations, based upon captured images from various locations throughout a venue. A process 2900 may be performed for some or all of the images received. Thus, the process 2900 may be performed once to determine the current locations of registered users, or, alternatively, the process 2900 may be periodically performed on images from all of the locations to constantly update the location information for the registered users.

In the process 2900, captured images of various locations in the venue are received (2905) from an exhibit control device or module (e.g., as indicated by the number 2108 in FIG. 21). As discussed above, additional image information may optionally be received with the image. The images are then provided to a facial recognition device or module (e.g., as indicated by the number 2102 in FIG. 21) for image analysis. The central control device or module may perform some image processing prior to providing the images to the facial recognition device or module. The analysis may include, for example, isolating facial images in each of the images, modifying the images to improve image quality, and/or analyzing the images to determine or obtain additional or other image information. In some embodiments, such other image information may be provided by the captured image to the facial recognition system. The received images from the various locations are provided to the facial recognition module or system. As will explained in more detail below, the facial recognition system identifies users in each image and associates a location of the image with each identified user to provide location information for each of the identified registered users. Furthermore, the location information may include a time stamp indicated the time at which the image of a registered user is detected at a location.

The process 2900 receives location information and identifiers for the registered users identified in the captured images (2915). The central control device or module (e.g., as indicated by the number 2104 in FIG. 21) updates the location information in the record of each identified registered user based on the received location information (2920).

The process 2900 may also receive crowd information (see FIG. 34) for each location/exhibit from the facial recognition system (2925) and update the crowd information in the location record maintained for each location (2930). Locations may be defined as places within an image, but a table or database may be used to cross-reference locations (e.g. x and y location) within an image against identifiers of a location (e.g. an entity in position 4, 5 is in seat 4B but an entity in position 2, 3 is in seat 3A) Process 2900 may then end.

Although an exemplary process performed by the central control device or module to obtain and maintain location information for registered users and/or crowd information for locations in accordance with aspects of this disclosure is discussed above with respect to FIG. 29, other processes performed by the central control device or module to provide the media content that add to, combine, rearrange, or remove any of the described steps are possible and are considered within the scope of this disclosure.

Figure 30:
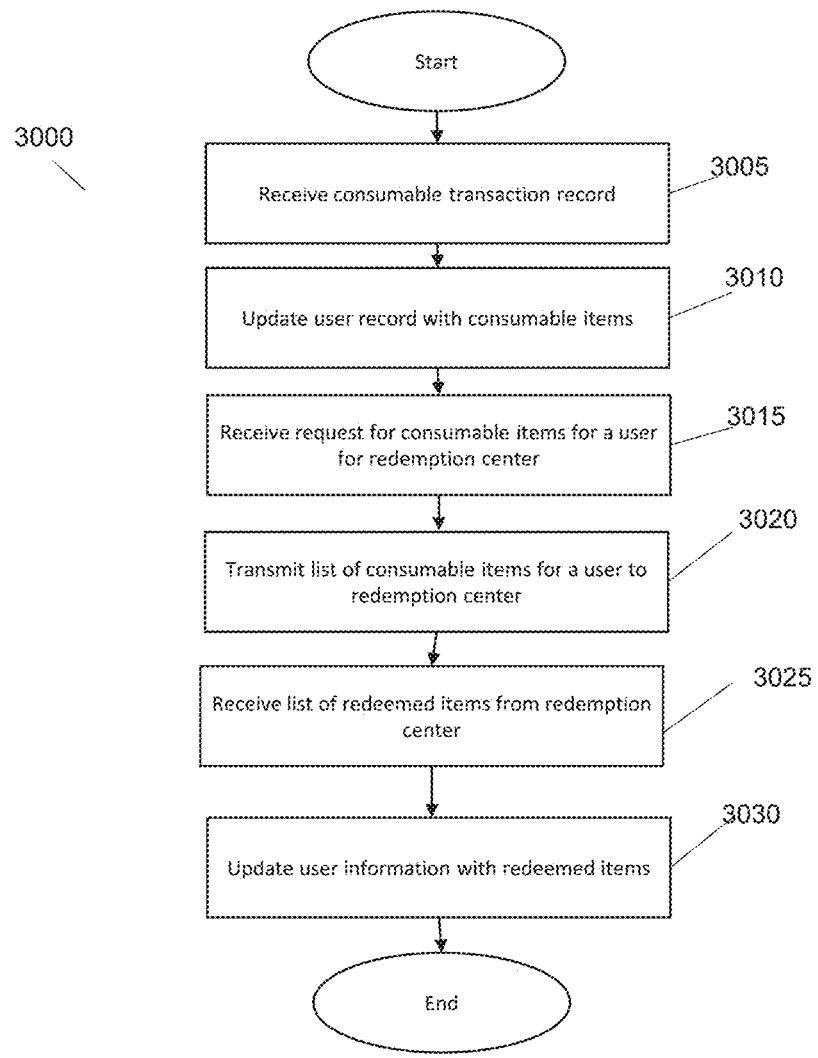
FIG. 30 is a flow diagram of a process performed a central control system to maintain and provide identifications of consumable products available to registered users in accordance with an aspect of the disclosure.

FIG. 30 illustrates a flow diagram of an exemplary process performed by a central control device or module (e.g., as indicated by the number 2104 in FIG. 21) to maintain a list of consumable products obtained by a registered user. The process 3000 begins with the central control module or device receiving a consumable transaction record (3005) from an exhibit control device or module (as indicated, for example, by the numbers 2108, 2112 in FIG. 21). The transaction record includes an identifier of the consumable product and an identifier of the registered user entitled to the product. In some instances, the transaction record may include other information such a transaction information may show a purchase prices and/or payment, an expiration date/time, or other information related to the product. Any suitable user interface may be used to save the transaction record, such as a transaction device that saves metadata related to a transaction to a database accessible by the system when the transaction occurs.

The consumable products information in the record of the identified registered user is updated to include the consumable product (3010). At a later time, the central control system may receive a request for the list of consumable products that have been obtained by the registered user from a redemption center system (not shown) (3015). The redemption center system may include one or more computing devices for enabling the process blocks described herein with respect FIG. 30 or otherwise. In some embodiments, a user having the authorization to obtain products for one or more other users (such as the children of the user or other group members) may obtain the list of consumable products available to each user for which the registered user has authorization to obtain their products. The central control system transmits the list of consumable products from the user record of the registered user to the redemption center system in response to the request (3020). The redemption center system then provides the listed consumable products to the user. The redemption center system then adds each consumable product received by the registered user to a redeemed items list and transmits the list to the central control system (3025). The central control system then updates the consumable products list in the user record of the registered user to reflect the products redeemed (3030) and the process 3000 may end.

Although an exemplary process performed by the central control device or module to maintain consumable product information for registered users in accordance with aspects of this disclosure is discussed above with respect to FIG. 30, other processes performed by the central control device or module to provide the media content that add to, combine, rearrange, or remove any of the described steps are possible and are considered within the scope of this disclosure.

In accordance with some aspects, the central control device or module stores images from photo opportunity areas and associates the images with registered users. The central control device or module then may provide the images to a redemption device for selection, deletion, and/or purchase of the images by the registered user, for example by configuring a database to return an image as a function of an identifier of a person (e.g., a bar code or a person's name).

Figure 31:
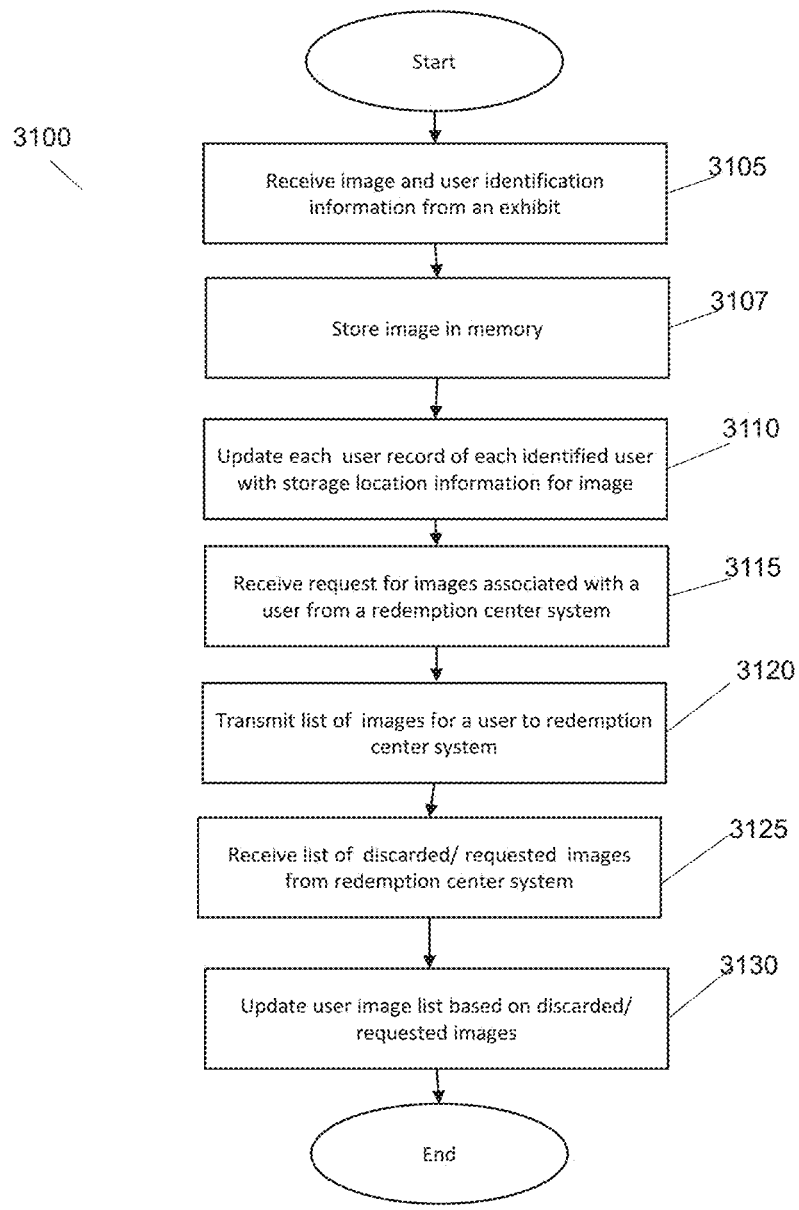
FIG. 31 is a flow diagram of a process performed by a central control system to obtain and maintain captured images for photo opportunity areas associated with registered users in accordance with an embodiment of this disclosure.

FIG. 31 illustrates another exemplary process performed by an inventive central control device or module (e.g., 2104, FIG. 21) for storing the images, associating with registered users, and providing the images to a redemption device in accordance with an aspect of this disclosure. In the process 3100, an image and identifiers associated with registered users in the image are received from an exhibit/location system, module, or device (3105). The image is then stored at a memory location accessible to a processor (3107). In accordance with some embodiments, the image is stored in an image database, data structure using structured or unstructured objects or library maintained by central control system, device, or module as described below with respect to FIG. 33. The user record of each registered user identified in the image is then updated to indicate storage information for the image to associate the image with the registered user (3110).

At a later time, the central control device or module may receive a request for the list of images that have been associated with a registered user from a redemption device (3115). In some embodiments, a user having the authorization to obtain/view images associated with one or more other users (such as the children of the user or other group members) may obtain the list of images associated each user for which the registered user has authorization to view/obtain their images. The central control or module transmits the list of images from the user record(s) of the registered user(s) to the redemption device in response to the request (3120). The redemption device then provides the listed images to the requesting user. This may include the redemption device downloading the images from the image database and/or requesting the images from the central control device or module. The redemption device then adds each image received, purchased, or uploaded by the registered user to a saved image list and transmits the saved list to the central control device or module; and/or adds each deleted/discarded image to a discarded image list. The saved image list and/or discarded image list are received by the central control device or module (3125). The central control device or module may then update the associated images in the user record of the registered user and/or images stored in memory to reflect each of the received lists (3130), and the process 3100 may end.

Although an exemplary process performed by the central control device or module to store and provide images from photo opportunity areas for registered users in accordance with aspects of this disclosure is discussed above with respect to FIG. 31, other processes performed by the central control device or module to provide the media content that add to, combine, rearrange, or remove any of the described steps are possible and are considered within the scope of this disclosure.

Figure 32:
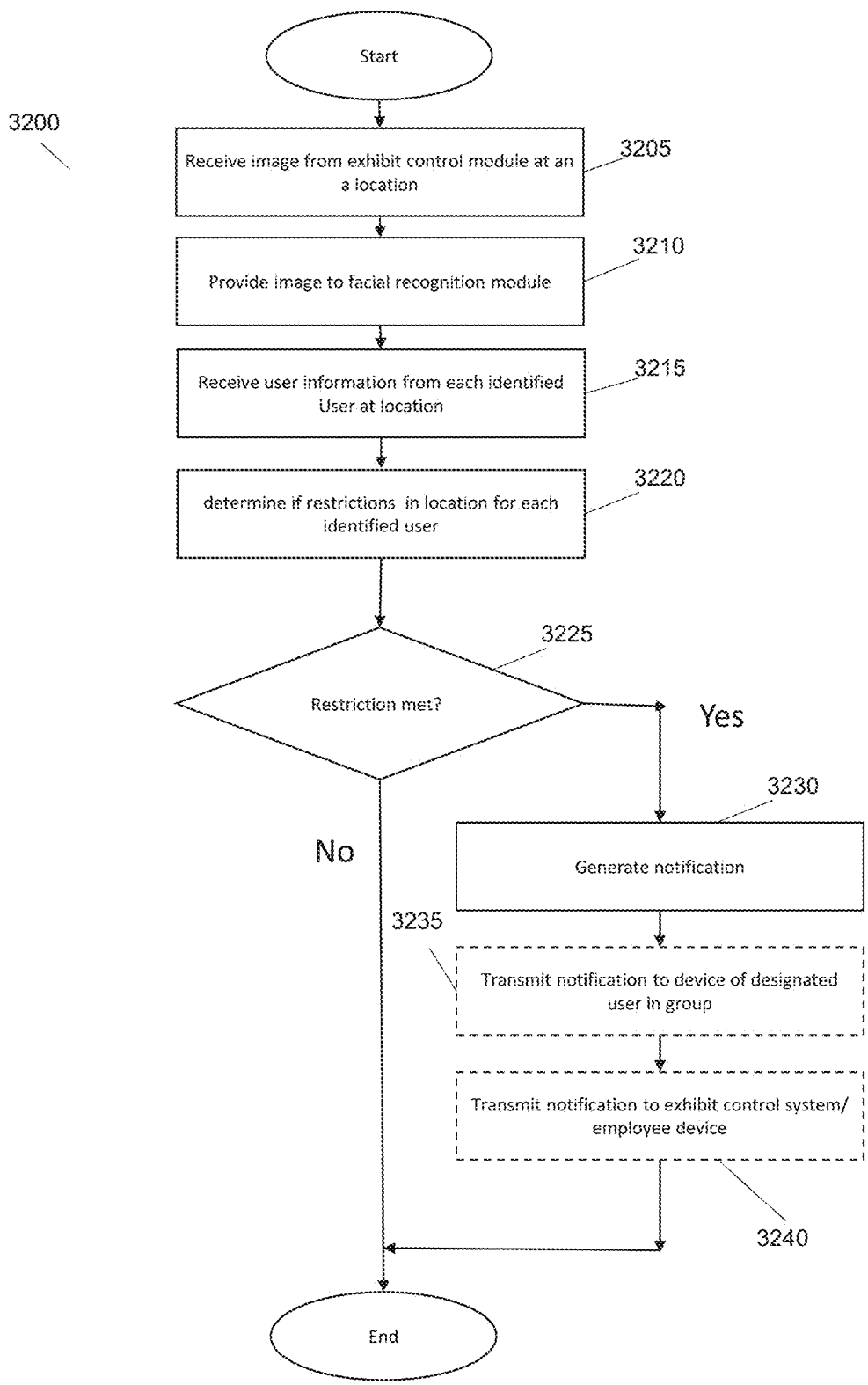
FIG. 32 is a flow diagram of a process performed by the central control system to determine whether registered users meet required criteria for an area in the venue in accordance with an aspect of the disclosure.

A registered user may have certain restrictions regarding the exhibits or locations that the user may visit. For example, some parents may not want their children to view and/or ride certain exhibits as the material in the exhibit or ride may not be age appropriate for their children. Also, the venue may want to assure children exit the venue with the appropriate guardian such as a teacher or parent or that the parent or other adult does not leave a minor unattended in all or a portion of the venue. Thus, systems and processes in accordance with some of these aspects of the disclosure may want to monitor the location of a registered users and determine whether any restrictions and/or access privileges are met when a registered user is determined to be at a certain exhibit and/or other location. FIG. 32 shows a process that may be performed by the central control device or module to monitor an area in accordance with an aspect of this disclosure to determine whether a register user is permitted in the area based on restrictions and/or access privileges. The process 3200, shown in FIG. 32, receives an image captured from an exhibit control device or module (e.g., 2108, 2112, FIG. 21) associated with a particular exhibit or location (3205). The image is provided by the central control device or module (e.g. 2104, FIG. 21) to a facial recognition system, device, or module (e.g. 2102, FIG. 21) (3210). The central control device or module receives location information for each user identified in the image (3215). The central control device or module may then determine whether the each of the identified users has any restrictions and/or access privileges for the particular exhibit and/or location (3220).

For example, a parent may be restricted from leaving without a minor and/or a minor may be restricted from leaving without an authorized adult. In another example, the system may track a distance between a parent and a child based upon an analysis of a set of images to notify the parent that the child has exceeded a threshold distance. The system may be configured to calculate the distance in any suitable manner, for example by using location data associated with an image (e.g. a parent may be recognized in one image associated with a first location and a child may be recognized in an image associated with a second location) or using location data retrieved by analyzing the contents of an image (e.g. a parent and child may be located in two different locations in at least two images, and the system may estimate the location of the parent and child by triangulating their location.

In a yet another example, an exhibit may be so popular that users are restricted to access the exhibit only at a certain time. In some cases, the user may have an access privilege, such as a right to enter a premium exhibit and/or ride. If there are restrictions and/or access privileges for an identified registered user for the particular exhibit location, a check is made to determine whether the restrictions/access privileges are applicable (3225). As a second example, the central control device or module may determine if an authorized adult is with an identified minor and/or if a parent is with their minor at an exit or at an exhibit with material that may not be age appropriate for the minor. If the restrictions/access privileges are applicable, the process 3200 may end. If the restrictions/access privileges are not applicable, a notification identifying the restriction or privilege is generated (3030). In some aspects, this may cause a warning such as an alarm, buzzer, or some other device to be activated to notify venue personnel of an access restriction. The system may be configured to send a notification to a device of the user and/or a designated party in the group and/or subgroup of the registered user (3235). A notification may be transmitted to one or more devices of venue personnel at the exhibit/location to allow the personnel to handle the situation. Process 3200 may then end.

Although an exemplary process performed by the central control device or module to monitor restrictions and/or privileges at an exhibit/location in accordance with aspects of this disclosure is discussed above with respect to FIG. 32, other processes performed by the central control device or module to provide the media content that add to, combine, rearrange, or remove any of the described steps are possible and are considered within the scope of this disclosure.

In accordance with some aspects of this disclosure, the central control device or module may provide information about the locations of registered users in a group to other registered users in the group. Furthermore, users in groups may be further divided into subgroups with only certain group member having access privileges for location information for the groups and/or particular subgroups. The location information for members in a group/subgroup may be conveyed to an application being executed on a personal device of a registered user or a device at a kiosk in the venue that has a computer system for providing the location information.

Figure 33:
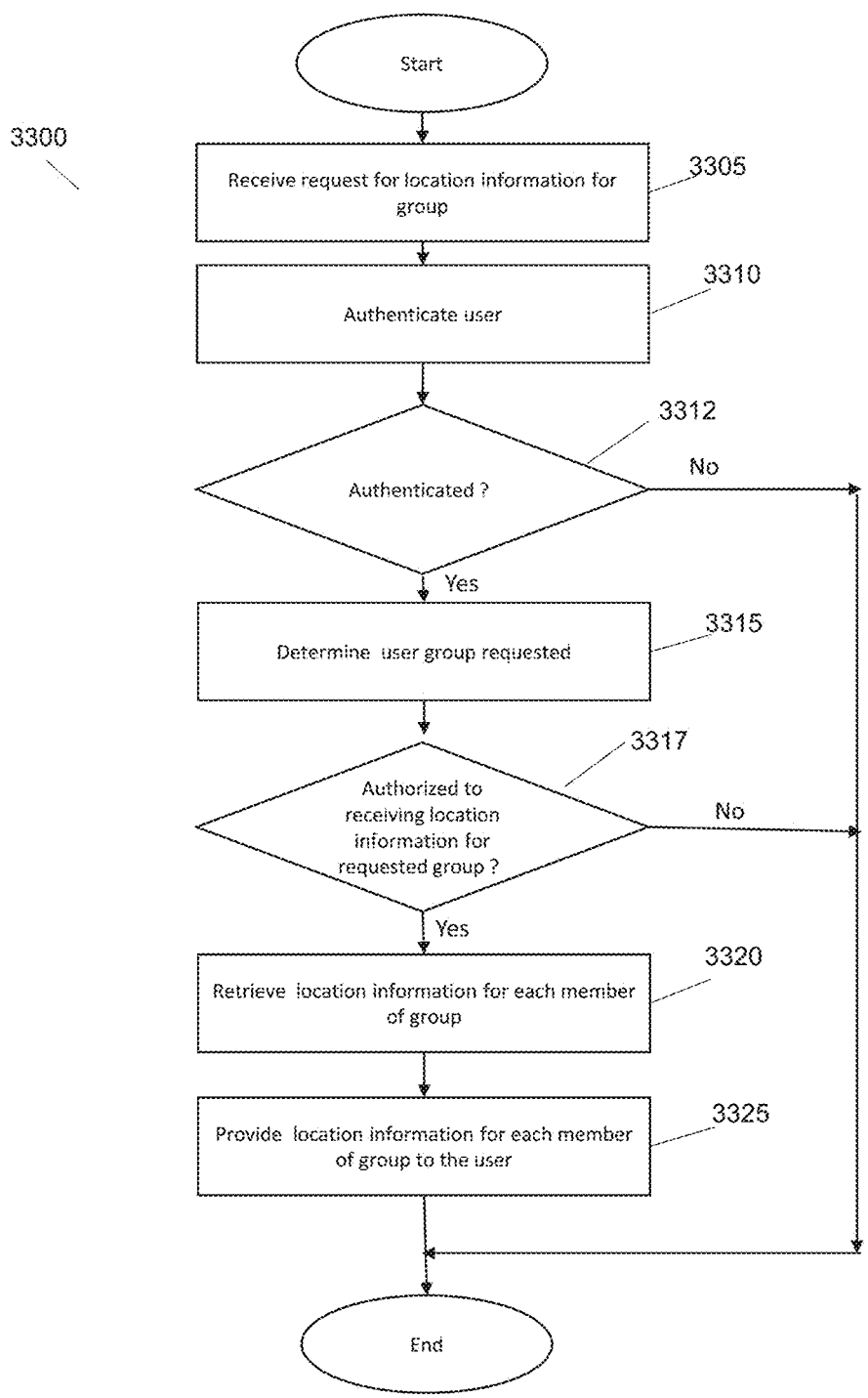
FIG. 33 is a flow diagram of a process performed by the central control system to provide location information of registered users in a group to a group member in accordance with an aspect of the disclosure.

FIG. 33 shows a flow diagram of a process 3300 performed by the central control device or module (e.g. 2104, FIG. 21) to provide location information of a group of registered users, in accordance with an aspect of the disclosure. In the process 3300, a request for location information for registered users associated with a specific group is received (3305). The user requesting the information is authenticated (3310). Authentication may be performed using a password, biometric readings, or in some other manner. If the authentication fails (3312), the process 3300 ends, and location information is not provided. If the requesting user is authenticated, the registered users in the requested group/subgroup are then determined (3315). The determination may be a list of members maintained for each registered group and may be performed by reading the group and/or subgroup field in the registered user record of each user in the group maintained by the central control device or module. A determination is made whether the requesting user is authorized to obtain the location information (3317). This may be performed by reading the access permissions stored in the registered user record of the requesting user. In other embodiments, the permission may be stored in a group data record maintained by the central control system, device, or module for the requested group and/or subgroup. If the requesting user does not have authorization to receive the information, the process 3300 ends. If the requesting user is authorized, the central control system, device or module retrieves the location information for each registered user in the group and/or subgroup from the user records maintained by the central control device or module (3320). In some embodiments, the location information for each registered user only includes information about the last determined location of the user. In accordance with some other embodiments, the location information may include information about two or more previous locations where the registered user was last detected. In still other embodiments, the entire history of locations of each registered user in the group is provided. In some further aspects, directions to get to the current location of a particular user or group of users may be provided. The location information for each of the registered users in the group is provided to the requesting device (3325), and process 3300 may end.

Although an exemplary process performed by the central control device or module to provide location information for a user or group of users in accordance with aspects of this disclosure is discussed above with respect to FIG. 33, other processes performed by the central control device or module to provide the media content that add to, combine, rearrange, or remove any of the described steps are possible and are considered within the scope of this disclosure.

Figure 34:
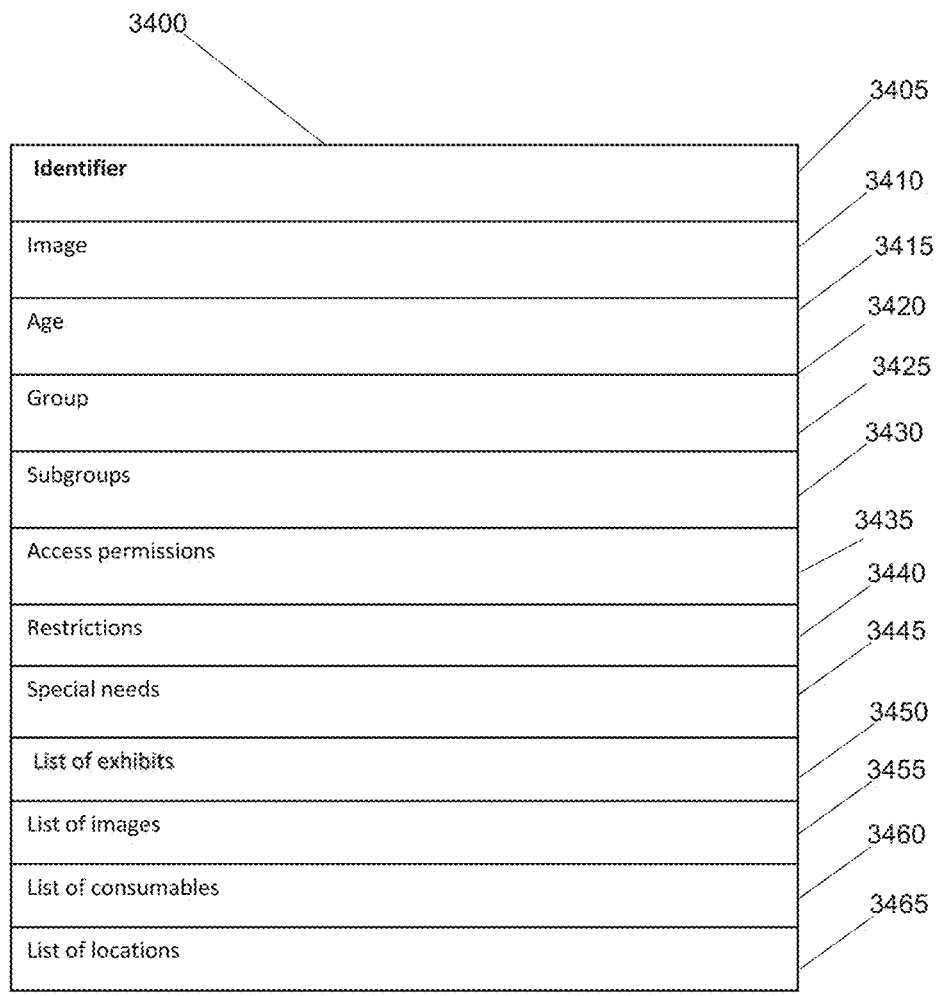
FIG. 34 is a conceptual diagram of a data record for a registered user stored by the central control system in accordance with an aspect of the disclosure.

FIG. 34 illustrates an example of a registered user record maintained by the central control device or module in accordance with an aspect of this disclosure. The register record 3400 advantageously includes an identifier 3405, such as a name or member number for the registered user. The record 3400 also includes a facial image 3410 of the registered user, either provided to the central control device or module, or captured from the registered user during a registration process. The record 3400 also includes a group field 3425 that identifies a group that is associated with the registered user. In addition, one or more subgroup fields 3430 may be provided. Alternatively, the subgroup field may be a pointer to or a linked list that includes all of the subgroups to which the user belongs.

Record 3400 may also include access permission field 3435 and restrictions field 3440. An access permission field or data structure 3435 stores codes indicating all of the access privileges of the user. The access privileges may indicate the exhibits to which the user has access, the rights to access location information of other users or groups, and/or quality of service indicators such as Very Important Person (VIP) privileges that the user may have in the venue. Restrictions field or data structure 3440 is a list, pointer to a list, or other data structures that includes all of the restrictions that apply to a user. The restrictions may include, but are not limited to, restrictions on exiting the venue, restrictions on access or access time to an exhibit, prohibited areas of the venue and the like.

Other fields for particular information about the registered user may be saved in a database. For example, the fields in the record 3400 may advantageously include a field for the user's age 3415, a link to a list of user locations 3465, a link to a list of consumable products 3460, list of images associated with the user 3455, list of desired exhibits to visit 3450 and any special needs of the registered user 3445. The list of special needs may include a list of requirements such as language, subtitles, special access and the like that user may require during a visit to exhibits in the venue. In some embodiments, the fields may be inputted by an admin user, while in other embodiments the user may input one or more fields in a user interface kiosk at the venue.

Although an example of a registered user data record is described above with reference to FIG. 34, other suitable data records that add, remove, and/or combine fields may be utilized.

Figure 35:
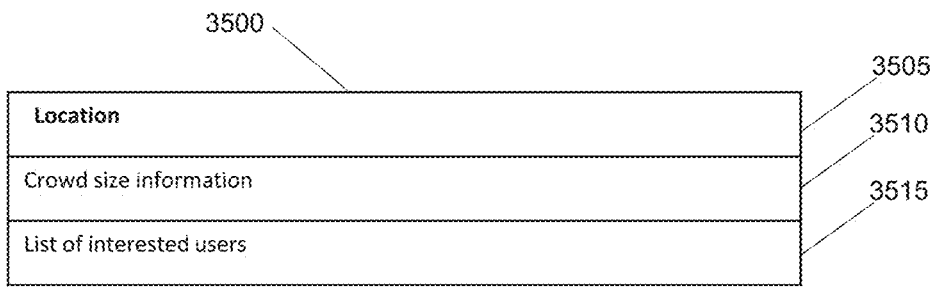
FIG. 35 is a conceptual diagram of a data record for a location in the venue stored by the central control system in accordance with an aspect of the disclosure.

In accordance with some aspects of the disclosure the central control device or module may also or alternatively provide crowd information for particular exhibits and/or other areas of a venue. For example, the system may indicate to a registered user when a desired exhibit is designated as either crowded with long wait time or not crowded with short wait times. In some embodiments, the system may even suggest an ordering of the exhibits and/or areas to visit to ensure that a registered user may visit all of the exhibits and/or areas desired by the user in an amount of time allocated by the user. To do so, the central control device or module (2104, FIG. 21) may maintain a location database that stores crowd information for each location and/or exhibit in the venue. A location record in accordance with an aspect of the disclosure is shown in FIG. 35.

Location record 3500 includes a location identifier field 3505, crowd information field 3510, and interested user field 3515. The location identifier field 3505 may be a field that stores a name or some other alpha numeric identifier of the location/exhibit. The crowd information field 3510 may be a lost or pointer to a list that stores, among other pieces of information, the size of the crowd at certain times as determined from the captured images of the location/exhibit. The interested user field 3515 is a list, pointer to list or some other data structures that stores identifiers of registered users interested in visiting the particular location/exhibit.

Although a location record maintained for a location/exhibit by the central control system in accordance with an aspect of the disclosure is discussed above with reference to FIG. 35, location records that add, remove, or combine fields are considered part of this disclosure.

Figure 36:
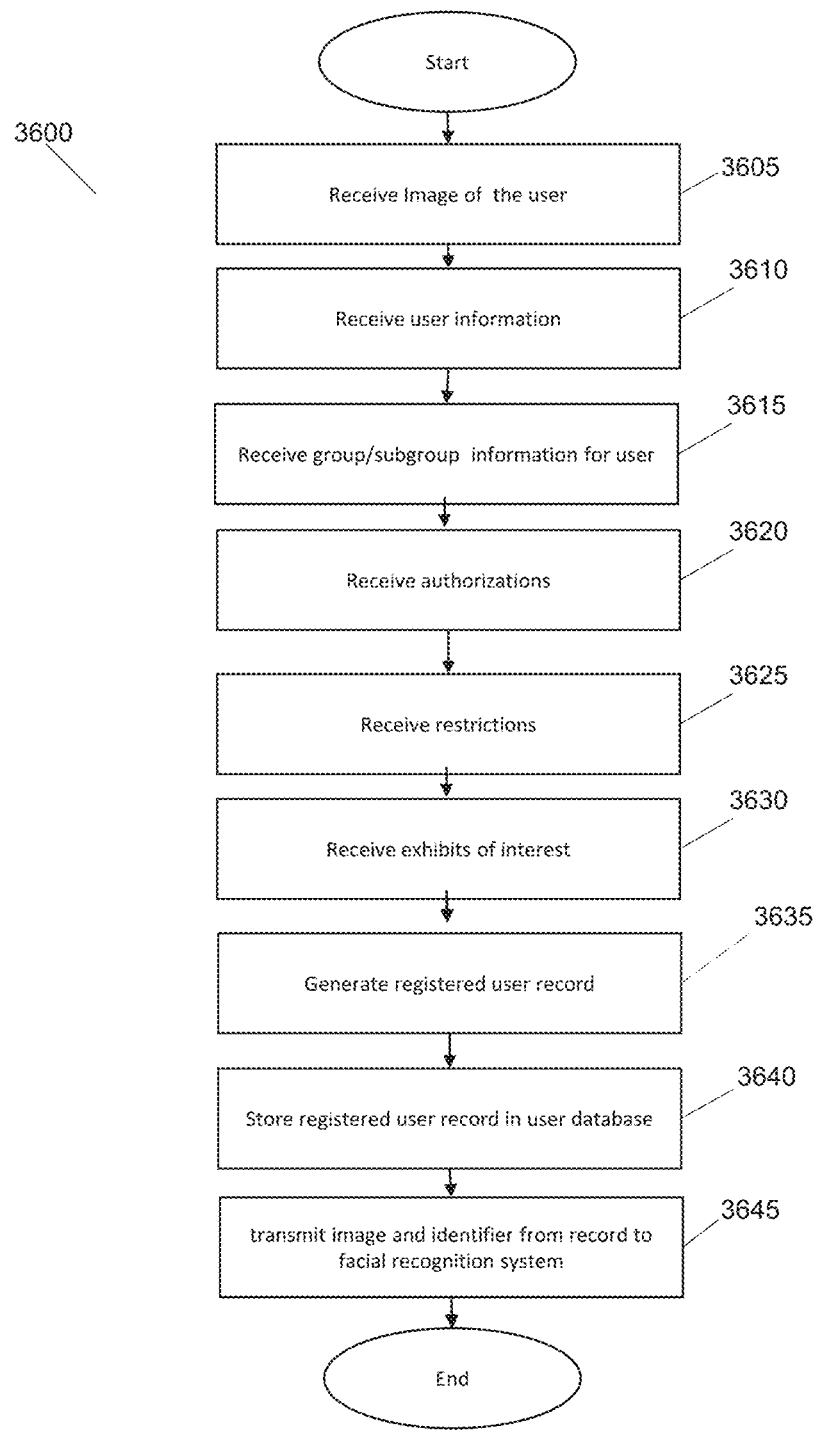
FIG. 36 is a flow diagram of a process performed by a central control system to obtain user information and generate a registered user record in accordance with an aspect of this disclosure.

FIG. 36 illustrates a flow diagram of an exemplary registration process performed by a central control system or the central control device or module (e.g. 2104, FIG. 21) in accordance with an aspect of this disclosure. In the registration process 3600, a facial image of the user that is registering with the system is received (3605). For example, the user may provide a facial image stored on the user device that the user is using to register. In that situation, the process 3600 may issue a command (for example, by a wireless communication) that directs the user device to capture the facial image using an image capture device associated with the user device, and to provide the image to process 3600. The process 3600 may also receive user information for the user (3610). The personal information may include, but is not limited to, age, address, e-mail address, home telephone number, cellular telephone number, language, disabilities, and another special needs. In accordance with some aspects, the registering user may input the information to a personal device that provides the information to the process 3600. The process 3600 may also receive group information and subgroup information (3615) where the subgroup is a set of one or more users from the group.

The process 3600 may also receive any authorizations for the user (3620). Authorizations may include access to location information for users in a particular group and/or subgroup as well as authorization to collect and/or receive consumable items for one or more other users and access to images of one or more other users (3625). The process 3600 may also receive restrictions for the users. As discussed above, restrictions may include restrictions prohibiting attending particular exhibits and/or areas of the venue as well as restrictions for exiting the venue. The process 3600 may also receive a list of one or more exhibits of interest of the user (3630) for use in providing guidance to the user in attending the exhibits of interest. Further any other information that may include at least a portion of the information discussed above with reference to FIG. 14 may also be received by process 3600. However, the information may also include any information that may be desired.

A registered user record that includes the received user member information discussed above and the captured facial image is generated (3635) and stored in a user database (3640). The captured facial image and an identifier of the registered user is provided to the facial recognition device or model (3645), and the process 3600 may then end.

An exemplary process for registering a user in accordance with embodiments of the disclosure is described above with respect to FIG. 36. Other registration processes that add, combine, rearrange, and/or remove one or more steps described above are possible in accordance with other embodiments.

In accordance with some aspects of the disclosure, the systems and process may provide information relating to exhibits to registered users to guide the user through the venue to maximize the user's enjoyment by ensure that all of the exhibits desired by the user may be visited. This may include providing a schedule or map to the user to guide the user to the venue and/or updating the schedule and/or map based on observed crowd conditions throughout the venue. In accordance with some embodiments, the system may only provide information regarding crowd information regarding particular exhibits to aid the user in determining which exhibits to visit next.

Figure 37:
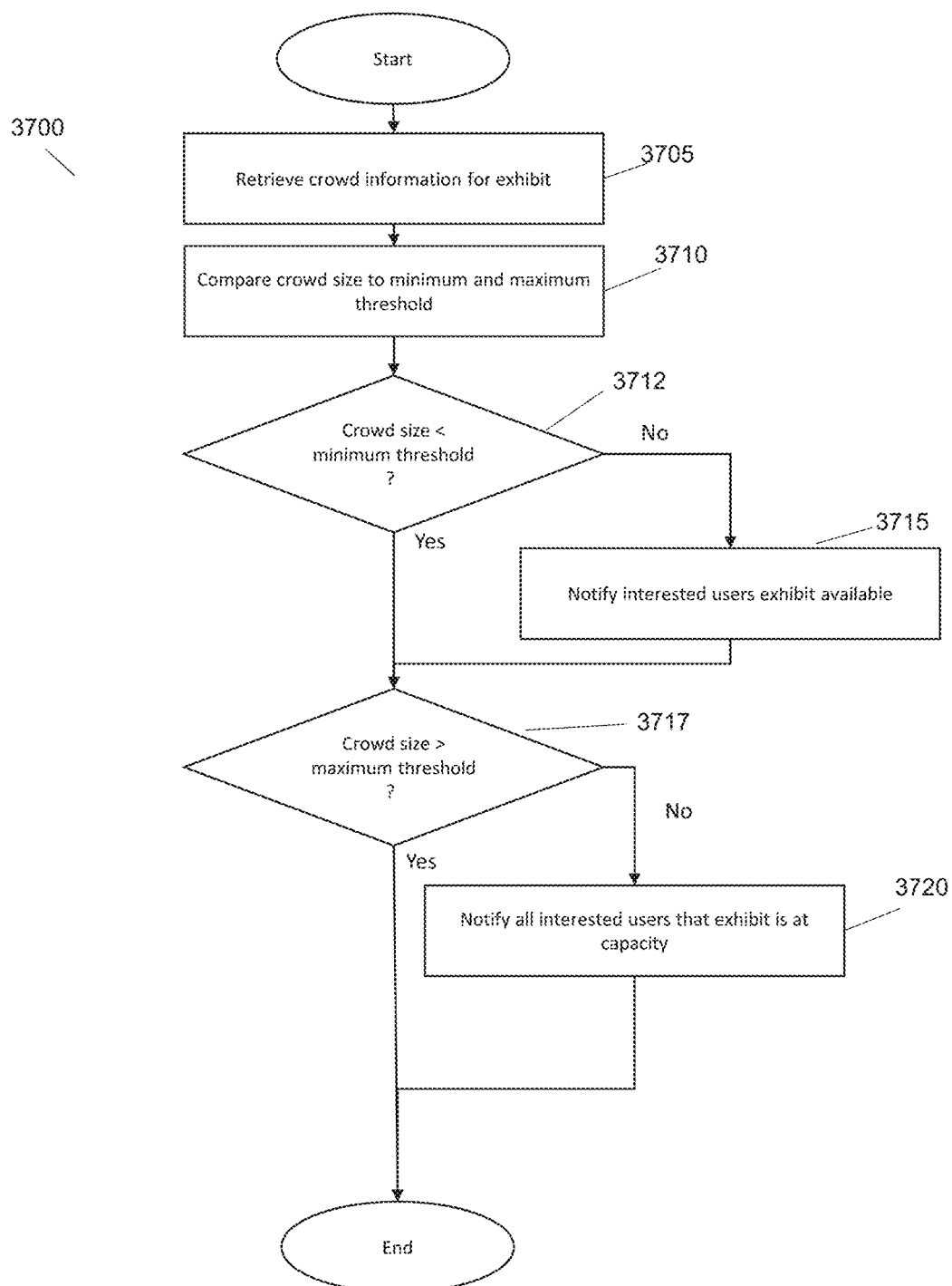
FIG. 37 is a flow diagram of a process performed by a central control system to provide crowd information to registered users in accordance with an aspect of the disclosure.

FIG. 37 shows an exemplary process performed by a central control device or module (e.g., 2104, FIG. 21) for informing registered users about crowd conditions at an exhibit and/or location in a venue. A process 3700 retrieves crowd information for a particular exhibit and/or location from a location record for the particular exhibit and/or location (3705). The crowd information may be a crowd size determined from a captured image of an area near and/or in the exhibit and/or the location that was stored in the location record, as described above with respect to FIG. 34. The crowd information is compared to pre-determined minimum and maximum crowd thresholds (3710). The threshold values indicate a crowd size.

If the crowd size is less than a minimum threshold (3712), the process 1300 determines a set of the registered users interested in the exhibit and/or location and notifies the each of the registered users in the set (3715). In accordance in some embodiments, a list of interested users is maintained by the system and a predetermined number from the top of the list are notified. The registered users on the list may be removed after it is determined that the user has visited the location, for example, by using the processes described above. In some other embodiments, all of the users on list may be notified and a user is removed from list after it is determined that the user has visited the location, for example, by using the processes described above. If the crowd size is greater than or equal to a maximum threshold (3737), the interested users are notified that the exhibit and/or location is at or beyond capacity. In accordance with various aspects of this disclosure, the notifications may be sent to a hand-held device via a message such as, for example, an SMS message or an e-mail message. The process 3700 then ends.

An exemplary process for notifying registered users of crowd conditions at an exhibit and/or location in accordance with embodiments of the disclosure is described above with respect to FIG. 37. Other notification processes that add, combine, rearrange, and/or remove one or more steps described above are possible in accordance with other embodiments.

Figure 38:
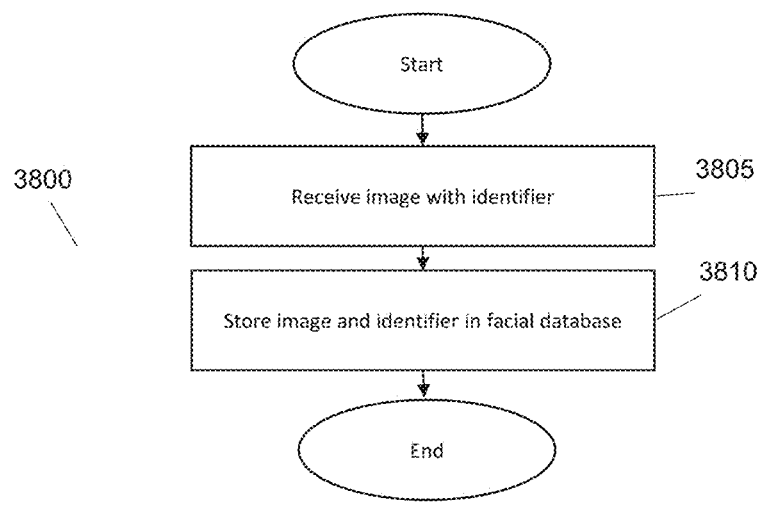
FIG. 38 is a flow diagram of a process performed by a facial recognition system to store data records of images of registered users in accordance with an aspect of the disclosure.

FIG. 38 illustrates an exemplary process 3800 performed by a facial recognition device or module (e.g., 2102, FIG. 21) in response to receiving a facial image and identifier of a registered user in accordance with embodiments of this disclosure. In the process 3800, the facial recognition device or module receives a facial image and identifier of a registered user from a central control system or central control device or module (3805). A facial recognition record is generated and stored (3810). The generation of the facial recognition record may include, for example, performing analysis of the image to generate facial parameters that may be used for image comparisons during the facial recognition process, as discussed further below.

An exemplary process for obtaining facial images of registered users in a facial recognition system accordance with embodiments of the disclosure is described above with respect to FIG. 38. Other processes for obtaining facial images that add, combine, rearrange, and/or omit one or more steps described above are possible in accordance with other embodiments.

Figure 39:
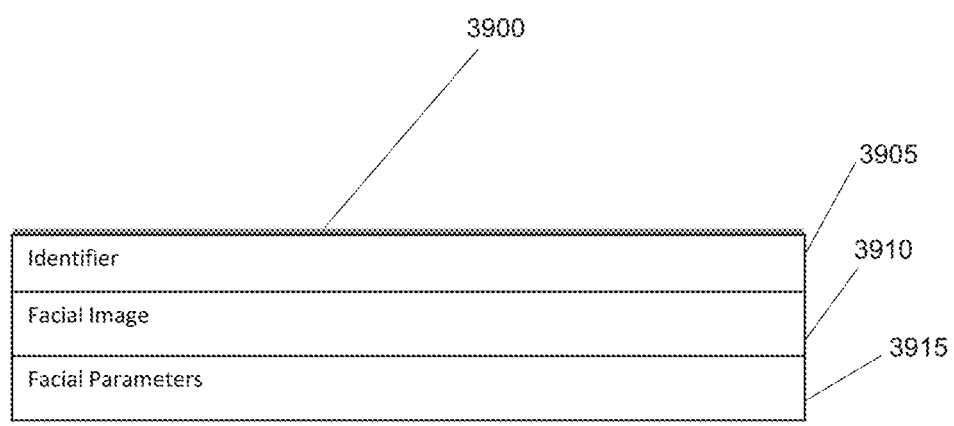
FIG. 39 is a conceptual drawing of a facial image record maintained by facial recognition system in accordance with an aspect of the disclosure.

FIG. 39 is a conceptual data structure for a facial recognition record in accordance with an aspect of the disclosure. A facial recognition record 3900 includes an identifier of the registered user 3905, the received facial image 3910, and the facial parameters for facial recognition comparisons 3915. The identifier may be, for example, a name and/or nickname of the registered user, or the identifier may be a number or alphanumeric string that associates the image to a specific registered user record stored by the central control device or module.

Although an exemplary facial recognition record in accordance with embodiments of the disclosure is described above with reference to FIG. 39, other facial recognition records that add, combine, rearrange, and/or omit information are possible in accordance with other embodiments.

Figure 40:
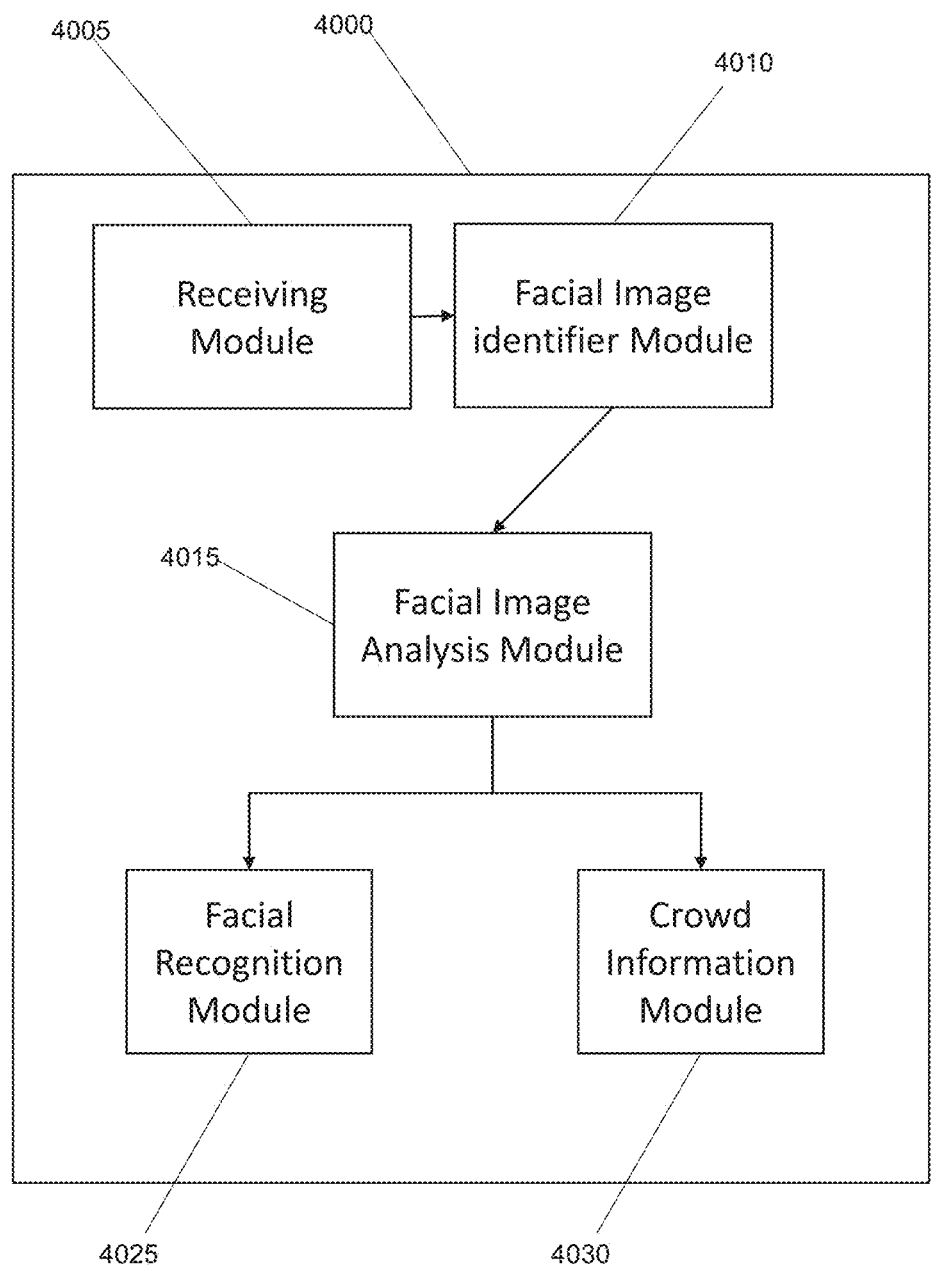
FIG. 40 is a diagram of the modules of software for performing facial recognition analysis on a captured image of a location in accordance with an aspect of the disclosure.

The software and/or hardware modules that perform a facial recognition process in accordance with embodiments of the disclosure are shown in FIG. 40. The facial recognition system 4000 includes a receiving module 4005, a facial image identifier module 4010, a facial image analysis module 4015, a facial recognition module 4025, and a crowd information module 4030.

The receiving module 4005 receives a captured image and processes the captured image to conform the image to the parameters needed to perform the various subsequent processes for facial recognition analysis. In accordance with some aspects, the image processing may include, for example, focus adjustments, color adjustments, edge defining, and other image adjustments needed to conform the image to the requirements of the subsequent modules. In accordance with some aspects, the receiving module also receives image information such as, for example, depth information, camera information, and lighting information. The receiving module 3605 uses the image information in the image processing to conform the image to the required standards.

The processed image is provided to the facial image identifier module 4010, which identifies the portions of the image that include a facial image. The identification may use edge detection and other various search processes to identify those portions of the image that include an image of a face to which facial recognition may be applied. In accordance with some aspects, the facial image identifier may also perform some image processing to conform the portions including a facial image to the requirements of an analysis module.

The facial image analysis module 4015 receives the portions of the image that include a facial image and performs analysis on each portion of the image to generate the data needed by the other modules to generate the information required. For example, the image analysis module may generate pixel color and vector data needed to perform edge detection, color detection, and the like needed to perform the various subsequent processes. In accordance with some aspects, the facial image analysis module 4015 also receives the image information and/or a complete image for use in performing the analysis. The information generated by the facial image analysis module 4015 is provided to the facial recognition module 4025 and crowd information module 4030.

The facial recognition module 4025 receives the information for each facial image and compares the information of each facial image to the information for the facial images in each facial recognition record to determine a match and returns the identifier of each record that matches one of the facial images from the captured image to a predefined degree of confidence. To facilitate the comparison, the records may include facial image data that is precomputed to provide quicker comparisons by eliminating the need to analyze each reference image.

In accordance with some aspects, a crowd information module 4030, receives the image information and determines the number of visitors (whether identified as a registered user or not) that are detected in the image. The crowd information module then uses the determined number of visitors to determine an estimate of the crowd size at the exhibit and/or location.

Although the above description describes modules of a facial recognition system in accordance with an exemplary embodiment of the disclosure, other facial recognition modules that that add, combine, rearrange, and/or omit modules are possible in accordance with other embodiments.

Figure 41:
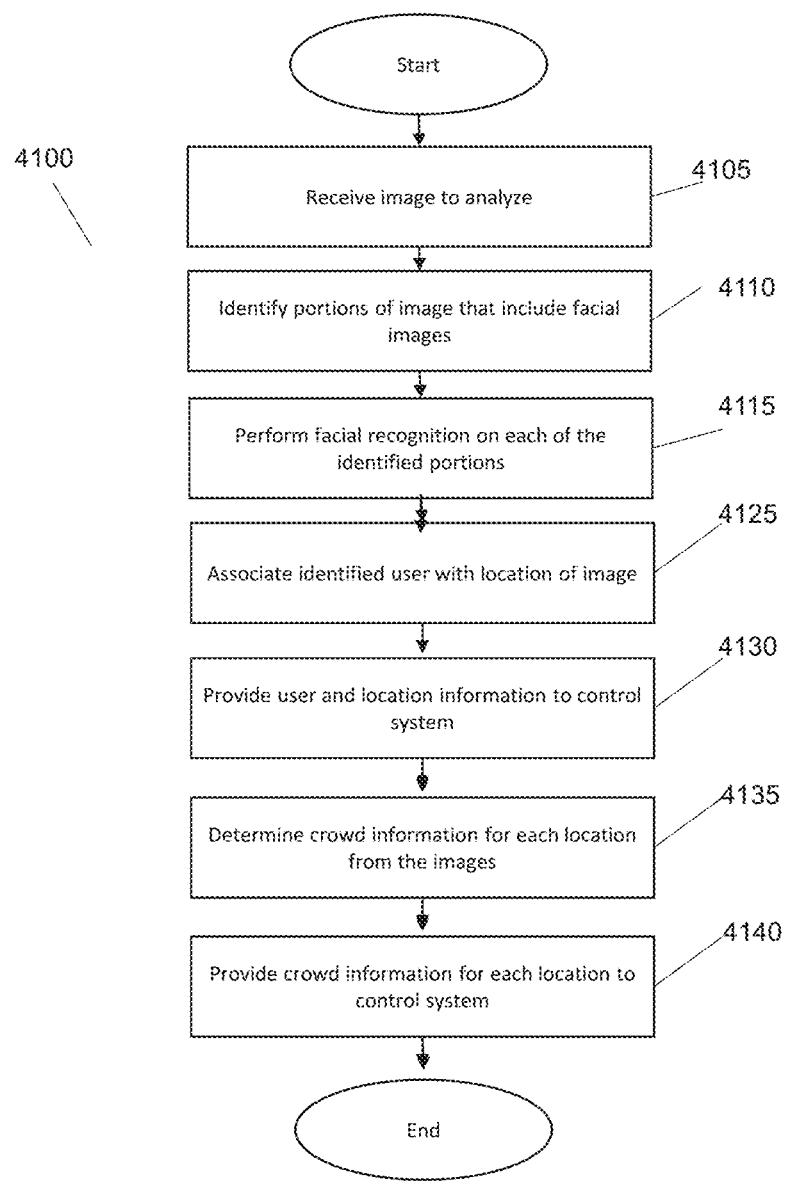
FIG. 41 is a flow diagram of a process performed by a facial recognition system to generate location information from a captured image of an area location in accordance with an aspect of the disclosure.

FIG. 41 illustrates a flow diagram of a process performed by the facial recognition system 4000 to perform facial recognition in a captured image of an area in accordance with an aspect of the disclosure. In the process 4100, an image of a known location is received (4105). As discussed above, the received image may be processed to conform the image to the requirements of the process 4100.

Portions of the received (and optionally processed) image that include a facial image are identified (4110). As discussed above, each portion may be further processed to conform the facial image to the requirements of the facial recognition process. A facial recognition comparison to the facial images stored in the facial recognition record is performed to identify the records that match the facial images (4115).

The location shown in the image is associated with each identified registered user (4125). The user and location information is then provided to the central control system (4130). Crowd information for each exhibit and/or location associated with each image is determined (4135) and the crowd information for each location is provided to the central control system, device, or module. Process 4100 may then end.

Figure 42:
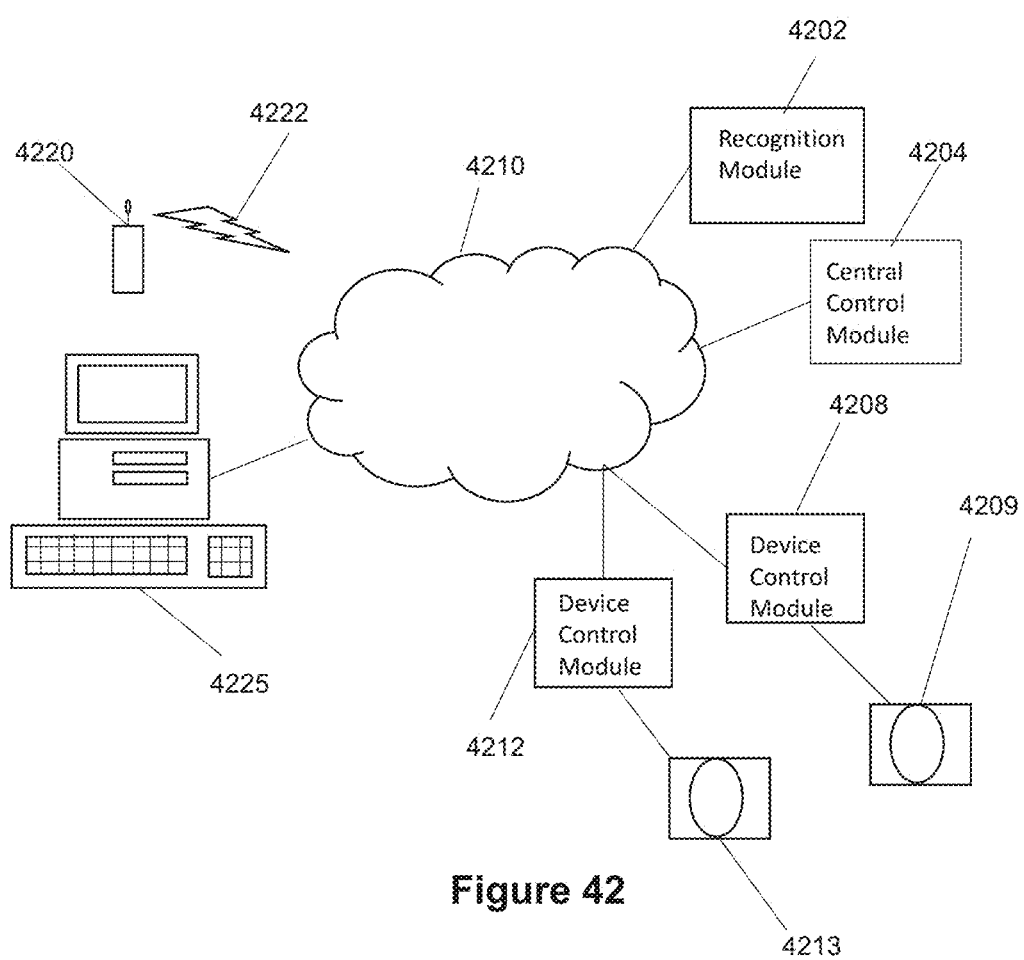
FIG. 42 shows a diagrammatic representation of an embodiment of systems and devices that perform processes for providing device control in accordance with one aspect of this disclosure.

FIG. 42 illustrates an alternative system 4200 for providing media content to supplement an exhibit in accordance with an aspect of the disclosure. The system 4200 includes a recognition module 4202; a central control module 4204; and device control modules 4208 and 4212 that are communicatively connected by a network 4210. A portable personal communication device 4220 and a computer 4225 may also be connected to the network 4210. Although shown as separate devices or functionalities in FIG. 42, the recognition module 4202; the central control module 4204; and the device control modules 4208 and 4212 may be provided by a single computing system. Alternatively, the processes that provide one or more of the facial recognition module 4202, the central control module 4204, and the exhibit control module 4208 may be distributed across multiple systems that are communicatively connected via the network 4210.

The recognition module, functionality, or system 4202 may be implemented or functionalized by a computer system that includes a memory and a processing unit to perform the processes for providing recognition and/or other image analysis. The computer system that implements the recognition module, functionality, or system may include one or more servers, routers, computer systems, and/or memory systems that are communicatively connected via a network to provide facial recognition and/or other image analysis. The recognition module may be configured to recognize one or more visual identifiers in a set of images, such as faces, colors, symbols (e.g. logos, alphanumeric strings), patterns (e.g. barcodes), goods, or patterns, which may be used to identify an audience member, group of audience members, and/or attributes of an audience member.

The central control module 4204 may be implemented or functionalized by a computer system that includes a memory and a processing unit to perform processes for storing and providing media content for one or more exhibits in a venue. The central control module 4204 may also advantageously store and update location information of a user. The central control functionality may be provided by a central control system for the venue. Specifically, the central control module 4204 may be implemented or functionalized by a system that includes one or more servers, routers, computer systems, and/or memory systems that are communicatively connected via a network to store and provide media content for one or more exhibits in the venue, as well as to store and update location information for registered users.

The device control modules 4208 and 4212 may be implemented or functionalized by a computer system that controls devices 4213 and 4209, respectively, in an area that includes an image capture device, such as an exhibit in a venue or a vending machine in a park. Advantageously, a module may be configured to control one or more devices for more than one areas, such as a module configured to control an image capture device, a media content playback device, and a transactional device. In specific embodiments, the device control modules 4208 and 4212 may be implemented or functionalized by a system that includes one or more servers, routers, computer systems, memory systems, an image capture device and/or media playback devices that are communicatively connected via a local network to obtain and present media content for the exhibit.

The device control modules may be configured to play media content to an audience in an area, and may be used to control one or more devices, such as a transactional machine like a vending machine, a menu, or a gas station pump. Such transactional machines may be configured to use a recognized identity to perform a transaction, for example by scanning a facial image or a license plate that is correlated via databases (e.g., the image database 1942, the relationship database 1944) with a transactional account in an attribute database (e.g., the attribute database 1946 of FIG. 19) to perform a transaction. For example, the device control module may capture a facial image with an image capture device and allow patrons to pay for a transaction using a bank account associated with the facial fingerprint of the facial image, or it may capture a license plate and allow patrons to pay for a transaction using a credit account associated with the alphanumeric ID of the license plate. The media played by a device control module may include any suitable media that may be experienced by an audience member, such as audio media, visual media, tactile media, or olfactory media. For example, attributes of an audience member may indicate that the audience member prefers Spanish subtitles and a smoke machine being used while watching a video, while attributes of another audience member may indicate that the audience member prefers English subtitles and wants an effect of smoke being overlayed in an audio track instead of a smoke machine being used.

The network 4210 may advantageously be the Internet. Alternatively, the network 4210 may be a Wide Area Network (WAN), a Local Area Network (LAN), or any combination of Internet, WAN, and LAN that may be used communicatively to connect the various devices and/or modules shown in FIG. 42.

The portable personal communication device 4220 may a smart phone, tablet, Personal Digital Assistant (PDA), a laptop computer, or any other device that is connectable to the network 4210 via wireless connection 4222. The computer 4225 may advantageously connect to the network 4210 via either a conventional wired or a wireless connection. The computer 4225 may be, for example, a desktop computer, a laptop, a smart television, and/or any other device that connects to the network 110. The portable personal communication device 4220 and/or the computer 4225 allow a user to interact with one or more of the above-described modules to provide information such as, for example, personal information to be added to registered user information of the user.

Although a particular system of devices and/or functional modules is described above with respect to FIG. 42, other system architectures that, add, remove, and/or combine various devices and/or modules may be used to perform various processes in accordance with various other aspects of the disclosure.

Figure 43:
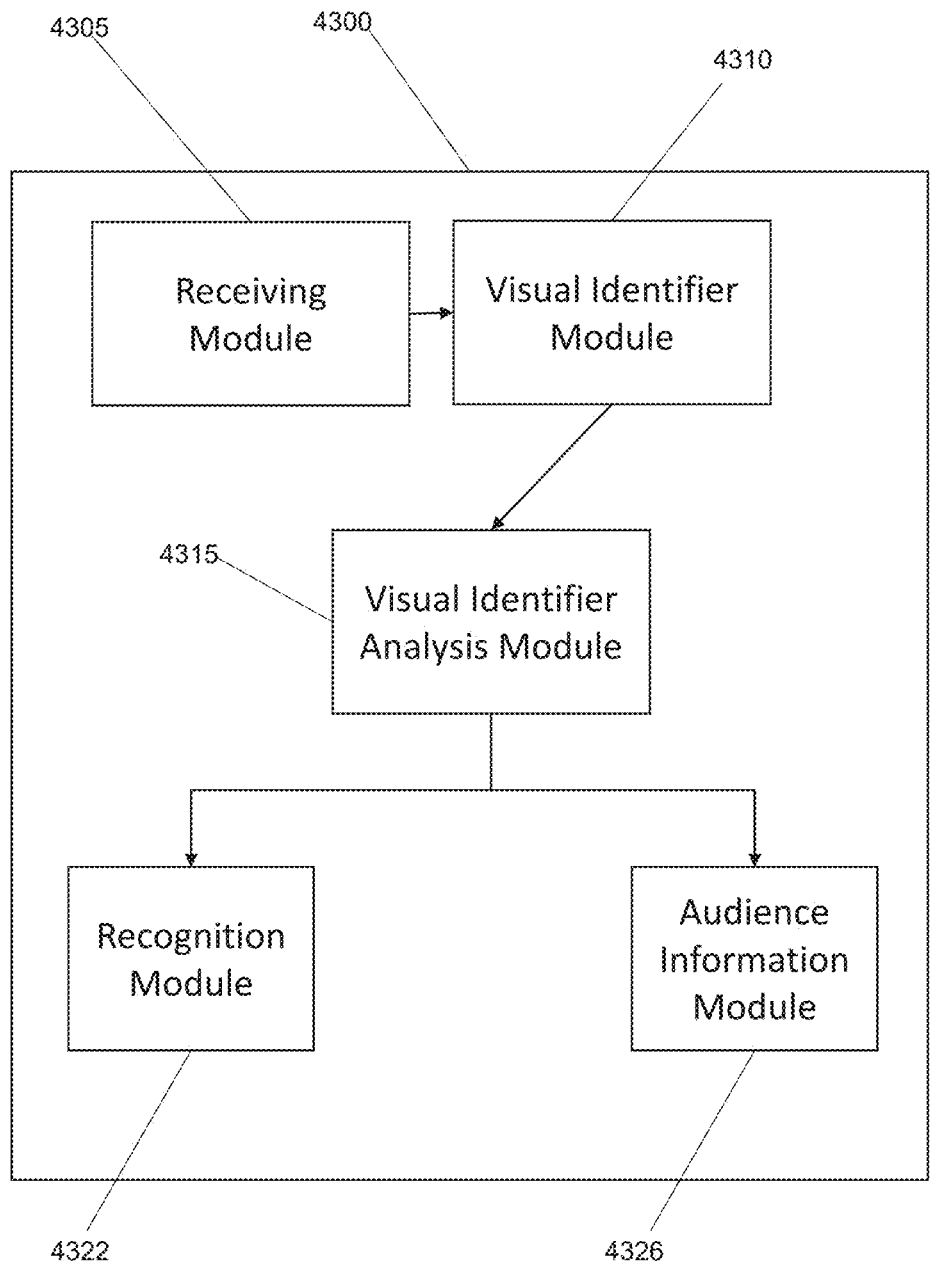
FIG. 43 is a logical diagram of modules of software that may be used to perform processes for providing device control in accordance with an aspect of the disclosure.

The software and/or hardware modules that may be used to perform a recognition process are shown in FIG. 43. The recognition system 4300 includes a receiving module 4305, visual identifier module 4310, a visual identifier analysis module 4315, a recognition module 4322, and an audience information module 4326.

The receiving module 4305 may be configured to receive a set of captured images and processes the set of images to conform the image to the parameters needed to perform the various subsequent processes for visual identifier recognition analysis. The image processing may include, for example, focus adjustments, color adjustments, edge defining, and other image adjustments needed to conform the image to the requirements of the subsequent modules. The receiving module 4305 may also be configured to receive image information such as, for example, depth information, camera information, and lighting information. The receiving module 4305 may be configured to use the image information in the image processing to conform the image to the required standards.

The processed image may be provided to the visual identifier module 4310, which is configured to identify the portions of the image that include a visual identifier. The identification may use edge detection and other various search processes to identify those portions of the image that include an image of to which visual identifier recognition may be applied. The visual identifier module may also perform some image processing to conform the portions of the set of images to the requirements of an analysis module. For example, the visual identifier module may search for badges of a certain shape, such as a rectangle or a hexagon, to identify, process, and forward images of badges that audience members are wearing, may search for faces to identify, process, and forward images of faces of audience members captured in a set of images, or may search for a gesture in a set of images or a video file to identify, process, and forward images of a gesture being made by an audience member.

The visual identifier module 4315 may be configured to receive the portions of the image that include a visual identifier and perform analysis on each portion of the image to generate the data needed by the other modules to generate the information required. For example, the visual identifier analysis module may generate pixel color and vector data needed to perform edge detection, color detection, and the like needed to perform the various subsequent processes, such as a process to generate a facial fingerprint from a facial image or a barcode number from an image of a barcode. The visual identifier analysis module may analyze a gesture by an audience member to determine the action that an audience member is performing, such as eating food, drinking a beverage, or paying for a purchased good. A visual identifier may even be configured to identify the item, or type of item, that the audience member is making a gesture with, such identifying that the audience member is eating a hamburger or paying for gas. The visual identifier analysis module 4315 may also be configured to receive a set of image information and/or a complete image for use in performing the analysis. The information generated by the visual identifier analysis module 4315 may be provided to the recognition module 4322 and crowd information module 4330.

The recognition module 4322 may be configured to receive the information for a visual identifier and compare the information to one or more databases and cross-reference the visual identifier against related information. For example, where the visual identifier is a facial fingerprint, the recognition module 4322 may be configured to compare the facial fingerprint against a database of known facial fingerprints, such as the image database 1942 in FIG. 19, to retrieve a unique identifier of the person who has that face. Where the visual identifier is a color of a badge, the recognition module 4322 may be configured to compare the visual identifier against a database of known badge colors, such as the relationship database 1944 of FIG. 19, to retrieve an identifier of the group. To facilitate the comparison, the records may include image data that is precomputed to provide quicker comparisons by eliminating the need to analyze each reference image.

The audience information module 4330 may be configured to receive a set of image information from the visual identifier analysis module 4315 and retrieve information about an audience. For example, the audience information module 4330 may be configured to determine a number of audience members (whether identified as a registered user or not) in a set of images. The visual identifier analysis module 4315 may send visual identifiers of recognized people, such as facial fingerprints or portions of an that are identified as a person, to the audience information module, which may be aggregated to determine how many people are in an audience. Alternatively, the visual identifier analysis module 4315 may send group identifiers to the audience information module, which may look up the group in a storage database, such as the attribute database 1946 of FIG. 19, to determine how many people are in each group identified in a set of images, and aggregate such numbers to determine how many people are in an audience. The audience information module 4330 may then be configured to send the occupancy information of that area to the occupancy database 1947 of FIG. 19. The audience information module 4326 may use the determined number of visitors to determine an estimate of the crowd size at the exhibit and/or location. Such information could be saved to any suitable storage device, such as the occupancy database 1947 of FIG. 19.

The visual identifier analysis module 4315 may be configured to send any suitable visual identifiers that may be used to update information about an audience to the audience information module 4330 to update information about the audience in a database. For example, the visual identifier analysis module 4315 may be able to determine a height of an audience member and update the height information of the audience member in storage, such as in the attribute database 1946 of FIG. 19. The system may use the recognition module 4322 to query the image database 1942 of FIG. 19 with a facial fingerprint of the audience member to determine a unique identifier of the audience member that may be used to correlate the height information with the entry in the attribute database 1946. In another example, the visual identifier analysis module 4315 may send a gesture image to the audience information module 4330 to determine a behavior of an audience member, such as eating a food item or purchasing a good. The audience information module 4330 may then recognize the gesture and update attribute information of the audience member in the attribute database 1946, such as by indicating a preference of the audience member for the food or for the good, or a preference of the audience member to eat food at the location where the set of images were captured, or to purchase a good at the location where the set of images were captured.

Although the above description describes modules of a recognition system in accordance with an exemplary embodiment of the disclosure, other recognition modules that that add, combine, rearrange, and/or omit modules are possible in accordance with other embodiments.

Figure 44:
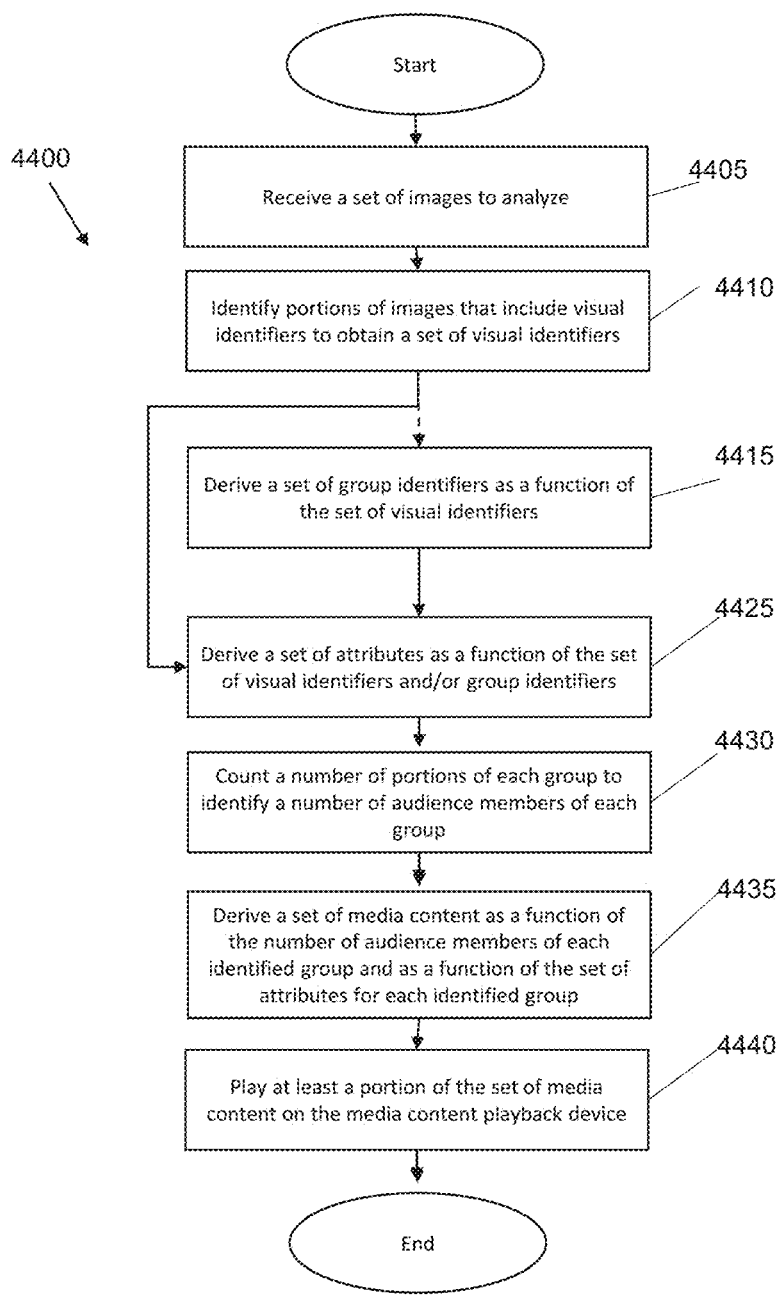
FIG. 44 is a flow diagram of a process performed by a media content system to select and play media content in accordance with an aspect of the disclosure.

FIG. 44 shows a process that may be performed by a system to monitor one or more areas to determine media content to play at a media content playback device. Process 4400, shown in FIG. 44, receives a set of images captured from an image-capturing device associated with an audience area in step 4405. The audience area may be disposed in an area where the audience may be able to interact with an object of interest, such as an exhibit, a billboard, or a transaction machine (e.g., a vending machine, a fuel station pump). In step 4410, the set of images may then be sent to a computer system configured to identify portions of the set of images that include visual identifiers to obtain a set of visual identifiers, such as recognition module 4202 of FIG. 42 or recognition system 4300 of FIG. 43. The visual identifiers may comprise, for example, a facial image, a gesture, a lanyard, a badge, a tag, an article of clothing, or a license plate. Such visual identifiers may be processed for analysis, for example, by isolating facial features of an entity in a set of images to generate a facial fingerprint, isolating a gesture made by an entity over a series of images to generate a recognized gesture, isolating a shape of a badge to generate a badge color, isolating a barcode to generate a barcode number, or isolating a shape of a license plate on a vehicle to generate a license plate number.

In step 4415, the set of visual identifiers may be used to generate a set of group identifiers. The set of group identifiers may be generated, for example, by cross-referencing a visual identifier against a relationship database (e.g. relationship database 1944 of FIG. 19) to determine if a visual identifier is representative of a group (e.g. a group of audience members wearing the same color badge, a group of passengers within the same car) or is associated with a group (e.g. a facial fingerprint that is associated with membership to a group, or an entry ticket unique identifier that is associated with membership to a group. Any of the retrieved group identifiers or the visual identifiers may be used to derive a set of attributes for any of the entities in an audience, and/or any groups of entities in the audience in step 4425.

In step 4430, the system may identify the number of audience members of each group using the retrieved information. Groups may be defined in any suitable manner. The groups may be defined by relationships that are saved in a relationship database (e.g., the relationship database 1944 of FIG. 19), or may be defined by common attributes that were gleaned from a database (e.g., the audience members that have a less than a 30 minute time restriction, audience members that are sharing the same vehicle). The system may aggregate groups to determine how many of each group exist within the audience. The aggregate groups may be defined by discrete groups (e.g., a percentage of each group as compared to the total number of audience members aggregates to add up to 100%) or by overlapping groups (e.g., groups where an entity may belong to more than one group such that the percentage of each group as compared to the total number of audience members aggregates to add up to more than 100%).

In step 4435, a set of media content to be played may be determined as a function of the number of audience members of each identified group and as a function of the set of attributes for each identified group. Media content may be selected in a variety of manners. The system may select a set of media content settings based upon aggregate common attributes. For example, the system may aggregate groups based upon language proficiency, and may play media content having settings where the audio language is chosen as the language of the greatest number of audience members proficient in a common language, and the closed caption language is chosen as the second greatest number of audience members proficient in a common language. The system may select a set of media content based upon largest group size. For example, the system may aggregate discrete groups to determine the group comprising the largest percentage as compared to the total number of audience members, and may determine the preferred media for that group as defined by an attribute database, and may select media content to play based upon preferred media defined for the largest group in the audience.

The system may select a set of media content settings based upon a time restriction requirement. For example, the system may determine that the lowest time restriction requirement for any audience member is 10 minutes and may filter out from a selection any media content that is shorter than 10 minutes. In another example, the system may determine that a time restriction requirement for a group of audience members is 90 minutes, and it may then define an optimal exhibit path for the group of audience members and select media content that routes the group of audience members to the next exhibit on the optimal path generated for the group. The system may select a set of media content settings based upon an occupancy restriction requirement. For example, the system may determine the occupancy levels of the exhibits of common interest to all, or most, of the audience members (e.g., from the occupancy database 1947 of FIG. 19), and may select media content that routes the audience members to the next exhibit of common interest to audience members that has the lowest occupancy level.

Once a set of media content has been derived by the system, the system may then play at least a portion of the set of media content on a media content playback device in step 4440, for example by transmitting a stream of media content to a playback device, or an identifier of media content to a playback device such that the playback device may retrieve media content using an identifier. The playback device may be a device that played directly to the audience member, such as a billboard located in front of the audience member or a mobile device held by the audience member, or may be played to an entity that may interact with the audience member, such as an employee in a restaurant having a system monitoring the audience member, or a ticketing agent in a venue having a system monitoring the audience member. In the former situation, the media content could provide routing information, such as an optimized route to enjoy exhibits in a venue, or a reminder to visit an exhibit that the audience member is walking past. In the latter situation, the media content could prompt the entity to deliver information to the audience member, such as an optimized route through the venue, or a preferred good that the audience member may wish to purchase from the entity, or be given by the entity.

Many other variations of the above-described embodiments and aspects may be derived using the disclosed computer infrastructure and functionality to dynamically deliver media content. Note that references throughout this specification to "one aspect" or "an aspect" mean that a particular feature, structure or characteristic described in connection with the aspect is included in at least one aspect of the present disclosure. Therefore, it should be appreciated that two or more references to "an aspect" or "one aspect" or "an alternative aspect" in various portions of this specification are not necessarily all referring to the same aspect. Furthermore, the particular features, structures, or characteristics being referred to may be combined as suitable in one or more aspects of the present disclosure, as will be recognized by those of ordinary skill in the art.

Below are additional points that may be embodied in, or encompassed by, the above description and the drawings:

Point 1: A system for providing media content, comprising: a first image capture device that captures a first set of captured images, wherein the first set of captured images comprise a first set of image fingerprints; a media content playback device; an image database that correlates image fingerprints with identifiers; a relationship database that correlates identifiers with one another; an attribute database that correlates identifiers with attributes; a media database that correlates attributes with media content; and a media content computer system programmed to: generate a first set of identifiers as a function of the first set of image fingerprints using the image database, generate a second set of identifiers as a function of the first set of identifiers using the relationship database, generate a derived set of attributes as a function of the second set of identifiers using the attribute database, generate a set of media content as a function of the derived set of attributes using the media database; and play at least a portion of the set of media content on the media content playback device.

Point 2: The system of point 1, wherein the derived set of attributes are generated as a function of both the first set of identifiers and the second set of identifiers.

Point 3: The system of point 1, wherein the first set of identifiers comprise a license plate number and wherein the second set of identifiers comprise a facial fingerprint.

Point 4: The system of point 3, wherein the second set of identifiers comprises both a person and a position within a car associated with the license plate number.

Point 5: The system of point 1, further comprising a second image capture device that captures a second set of captured images, wherein the second set of captured images comprise a second set of image fingerprints, and wherein the media content computer system is further programmed to: generate a correlation set of identifiers as a function of the second set of image fingerprints using the image database, generate a set of relationships using the correlation set of identifiers, and saving the set of relationships in the relationship database.

Point 6: The system of point 5, wherein the second set of image fingerprints comprise both a license plate number and a facial fingerprint.

Point 7: The system of point 1, further comprising: a transactional capture device that captures a set of transaction attributes and a captured transaction identifier, wherein the media content computer system is further programmed to: recognize a transaction in the first set of captured images; generate a generated transaction identifier as a function of the recognized transaction; transmit the generated transaction identifier to the transactional capture device; receive the set of transaction attributes from the transactional capture device; and save the set of transaction attributes to the attribute database.

Point 8: The system of point 7, wherein the generated transaction identifier and the captured transaction identifier both comprise a timestamp value, and wherein the transactional capture device matches the generated transaction identifier with the captured transaction identifier before transmitting the set of transaction attributes to the media content computer system.

Point 9: The system of point 7, wherein the media content computer system recognizes a transaction in the first set of captured images by identifying a movement among a plurality of the first set of captured images.

Point 10: The system of point 7, wherein the derived set of attributes comprises at least a portion of the set of transaction attributes.

Point 11: The system of point 1, wherein the media content computer system is further programmed to transmit at least a portion of the derived set of attributes to a service computer system.

Point 12: A method for generating targeted media content, comprising: capturing a first set of images using a first image capture device; identifying a first set of captured image fingerprints within the first set of images; deriving a first set of identifiers as a function of the identified first set of captured image fingerprints using an image database; deriving a second set of identifiers as a function of the first set of identifiers using a relationship database; deriving a first set of attributes as a function of the second set of identifiers using an attribute database; deriving a set of media content as a function of the first set of attributes using a media database; and playing a portion of the set of media content on a media content playback device.

Point 13: The method of point 12, wherein identifying the first set of captured image fingerprints comprises identifying a license plate number within the first set of images, wherein deriving the first set of identifiers comprises deriving an identifier of a car as a function of the license plate number using the image database, and wherein deriving the second set of identifiers comprises deriving a set of occupants of the car from the identifier of the car using the relationship database.

Point 14: The method of point 13, further comprising: capturing a second set of images using a second image capture device; identifying a second set of captured image fingerprints within the second set of images, wherein identifying the second set of captured image fingerprints comprises identifying the license plate number within the second set of images and identifying a set of facial fingerprints within the second set of images; deriving a set of occupant identifiers as a function of the identified set of facial fingerprints using the image database; deriving the identifier of the car as a function of the license plate number using the image database; and adding a relationship between the identifier of the car and the identified set of facial fingerprints to the relationship database.

Point 15: The method of point 13, further comprising: identifying a transaction in the first set of images; retrieving a set of transaction attributes from a transactional capture device as a function of the identified transaction; adding the set of transaction attributes to the attribute database as a function of the second set of identifiers.

Point 16: The method of point 13, further comprising: deriving an average speed of the car from at least two of the first set of images, wherein the media content playback device comprises a roadside billboard; and deriving a time as a function of the average speed and a distance to the roadside billboard, wherein playing the portion of the set of media content comprises delaying a time to play the portion of the set of media content as a function of the derived time.

Point 17: The method of point 12, wherein deriving a first set of attributes comprises deriving the first set of attributes as a function of both a portion of the first set of identifiers and the second set of identifiers using the attribute database.

Point 18: The method of point 12, further comprising: identifying an interaction with the media content playback device within the first set of images; and playing a different portion of the set of media content on the media content playback device as a function of the interaction.

Point 19: The method of point 18, wherein the interaction comprises an action of looking away from the media content playback device.

Point 20: The method of point 19, further comprising updating a set of attributes associated with at least one of the first set of identifiers and the second set of identifiers as a function of the interaction.

Point 21: A system for providing media content, comprising a first image capture device configured to capture a first set of images, wherein the first set of images comprises a first set of visual identifiers; a media content playback device; a group database that correlates the visual identifiers with group identifiers; a media database that correlates the group identifiers with media content; an attribute database that correlates the group identifiers with attributes; a media content computer system programmed to: identify a group identifier for each visual identifier in the first set of visual identifiers; generate a first set of group identifiers as a function of the first set of visual identifiers using the group database; generate a derived set of attributes as a function of the first set of group identifiers; count a number of portions for each group in the first set of group identifiers to identify a number of audience members in each group; generate a set of media content as a function of the identified number of audience members in each group and a function of the derived set of attributes using the media database; and play at least a portion of the set of media content on the media content playback device.

Point 22: The system of point 21, wherein the derived set of attributes comprises a time restriction attribute, and wherein the set of media content is selected as a function of the time restriction attribute.

Point 23: The system of point 22, wherein the set of media content comprises routing guidance media, and wherein the media content computer system is programmed to generate the set of media content to have routing guidance media that directs a group to a destination to satisfy the time restriction attribute.

Point 24: The system of point 21, wherein the derived set of attributes comprises a time restriction attribute, and wherein the media content computer system is further programmed to modify the derived set of attributes as a function of the time restriction attribute.

Point 25: The system of point 24, wherein the derived set of attributes comprises a time restriction attribute, and wherein the media content computer system is further programmed to generate the set of media content as a function of the modified derived set of attributes for a group identifier.

Point 26: The system of point 21, wherein the first image capture device comprises a location attribute, and wherein the media content computer system is further programmed to generate the set of media content as a function of the location attribute.

Point 27: The system of point 26, wherein the derived set of attributes comprises a time restriction attribute, wherein the set of media content comprises routing guidance media, and wherein the media content computer system is programmed to generate the set of media content to have routing guidance media that directs a group to a destination as a function of both the time restriction attribute and the location attribute.

Point 28: The system of point 21, further comprising an occupancy database that correlates exhibits with an occupancy, wherein the media content computer system is further configured to update an occupancy of an exhibit in the occupancy database as a function of the first set of visual identifiers.

Point 29: The system of point 28, wherein the derived set of attributes comprises a time restriction attribute, wherein the set of media content comprises routing guidance media, and wherein the media content computer system is programmed to generate the set of media content to have routing guidance media that directs a group to an exhibit as a function of the time restriction attribute and an occupancy of the exhibit.

Point 30: A method for generating targeted media content, comprising: capturing a first set of images using a first image capture device; identifying a first set of visual identifiers within the first set of images; deriving a first set of group identifiers as a function of the first set of visual identifiers using a group database; deriving a first set of attributes as a function of the first set of group identifiers; counting a number of portions in the first set of group identifiers to identify a number of audience members in each group; deriving a set of media content as a function of the identified number of audience members in each group and a function of the derived set of attributes using a media database; and playing at least a portion of the set of media content on the media content playback device.

Point 31: The method of point 30, wherein deriving the first set of attributes comprises deriving a time restriction attribute, and wherein deriving the set of media content comprises deriving a set of media content having routing guidance media that directs a group to a destination to satisfy the time restriction attribute.

Point 32: The method of point 31, further comprising retrieving a location attribute from the first image capture device, wherein deriving the set of media content comprises deriving a set of media content having routing guidance media that directs a group to a destination as a function of both the time restriction attribute and the location attribute.

Point 33: The method of point 30, further comprising deriving a set of occupancy metrics of a plurality of exhibits from an occupancy database, wherein deriving the set of media content comprises deriving a set of media content having routing guidance media that directs a group to an exhibit to as a function of the set of occupancy metrics.

Point 34: The method of point 33, wherein deriving the first set of attributes comprises deriving a time restriction attribute, and wherein deriving the set of media content comprises deriving a set of media content having routing guidance media that directs a group to an exhibit as a function of the set of occupancy metrics and the time restriction attribute.

Point 35: An apparatus for providing media content for an exhibit to a media content playback device associated with the exhibit, the apparatus comprising: a processor; and a memory readable by the processor that stores instructions that, when read by the processor, directs the processor to: capture a first set of images using a first image capture device; identify a first set of visual identifiers within the first set of images; derive a first set of group identifiers as a function of the first set of visual identifiers using a group database; derive a first set of attributes as a function of the first set of group identifiers; count a number of portions in the first set of group identifiers to identify a number of audience members in each group; derive a set of media content as a function of the identified number of audience members in each group and as a function of the derived set of attributes using a media database; and play at least a portion of the set of media content on the media content playback device.

Point 36: The apparatus of point 35, wherein the derived set of attributes comprises a time restriction attribute, and wherein the set of media content is selected as a function of the time restriction attribute.

Point 37: The apparatus of point 36, wherein the media content computer system is programmed to generate the set of media content to have routing guidance media that directs a group to a destination to satisfy the time restriction attribute.

Point 38: The apparatus of point 35, wherein the derived set of attributes comprises a time restriction attribute, and wherein the memory readable by the processor stores instructions that, when read by the processor, further directs the processor to modify the derived set of attributes as a function of the time restriction attribute.

Point 39: The apparatus of point 38, wherein the derived set of attributes comprises a time restriction attribute, and the memory readable by the processor stores instructions that, when read by the processor, further directs the processor to generate the set of media content as a function of the modified derived set of attributes for a group identifier.

Point 40: The apparatus of point 39, wherein deriving the first set of attributes comprises deriving a time restriction attribute, and the memory readable by the processor stores instructions that, when read by the processor, further directs the processor to derive a set of occupancy metrics for a set of exhibits from an occupancy database, and further directs the processor to derive the set of media content to have routing guidance media that directs a group to an exhibit to as a function of the set of occupancy metrics and the time restriction attribute.

What is claimed is:

1. A system for providing media content, comprising:
   a first image capture device configured to capture a first set of images, wherein the first set of images comprises a first set of visual identifiers;
   a media content playback device;
   a group database that correlates the visual identifiers in the first set of visual identifiers with group identifiers;
   a media database that correlates the group identifiers with media content;
   an attribute database that correlates the group identifiers with a set of attributes;
   a media content computer system programmed to:
      identify a group identifier for each visual identifier in the first set of visual identifiers;
      generate a first set of group identifiers as a function of the first set of visual identifiers using the group database;
      generate a derived set of attributes as a function of the first set of group identifiers;
      count a number of portions for each group in the first set of group identifiers to identify a number of audience members in each group;
      generate a set of media content as a function of the identified number of audience members in each group and as a function of the derived set of attributes using the media database; and
      play at least a portion of the set of media content on the media content playback device.

2. The system of claim 1, wherein the derived set of attributes comprises a time restriction attribute, and wherein the set of media content is selected as a function of the time restriction attribute.

3. The system of claim 2, wherein the set of media content comprises routing guidance media, and wherein the media content computer system is programmed to generate the set of media content to have routing guidance media that directs a group to a destination to satisfy the time restriction attribute.

4. The system of claim 1, wherein the derived set of attributes comprises a time restriction attribute, and wherein the media content computer system is further programmed to modify the derived set of attributes as a function of the time restriction attribute.

5. The system of claim 4, wherein the media content computer system is further programmed to generate the set of media content as a function of the modified derived set of attributes for a group identifier.

6. The system of claim 1, wherein the first image capture device comprises a location attribute, and wherein the media content computer system is further programmed to generate the set of media content as a function of the location attribute.

7. The system of claim 6, wherein the derived set of attributes comprises a time restriction attribute, wherein the set of media content comprises routing guidance media, and wherein the media content computer system is programmed to generate the set of media content to have routing guidance media that directs a group to a destination as a function of both the time restriction attribute and the location attribute.

8. The system of claim 1, further comprising an occupancy database that correlates exhibits with an occupancy, wherein the media content computer system is further configured to update an occupancy of an exhibit in the occupancy database as a function of the first set of visual identifiers.

9. The system of claim 8, wherein the derived set of attributes comprises a time restriction attribute, wherein the set of media content comprises routing guidance media, and wherein the media content computer system is programmed to generate the set of media content to have routing guidance media that directs a group to an exhibit as a function of the time restriction attribute and an occupancy of the exhibit.

10. A method for generating targeted media content, comprising:
capturing a first set of images using a first image capture device;
identifying a first set of visual identifiers within the first set of images;
deriving a first set of group identifiers as a function of the first set of visual identifiers using a group database;
deriving a first set of attributes as a function of the first set of group identifiers;
counting a number of portions in the first set of group identifiers to identify a number of audience members in each of one or more groups of audience members;
deriving a set of media content as a function of the identified number of audience members in each group of audience members and as a function of the derived set of attributes using a media database; and
playing at least a portion of the set of media content on a media content playback device.

11. The method for generating targeted media content of claim 10, wherein deriving the first set of attributes comprises deriving a time restriction attribute, and wherein deriving the set of media content comprises deriving a set of media content having routing guidance media that directs each group of audience members to a destination to satisfy the time restriction attribute.

12. The method for generating targeted media content of claim 11, further comprising retrieving a location attribute from the first image capture device, wherein deriving the set of media content comprises deriving a set of media content having routing guidance media that directs each group of audience members to a destination as a function of both the time restriction attribute and the location attribute.

13. The method for generating targeted media content of claim 10, further comprising deriving a set of occupancy metrics of a plurality of exhibits from an occupancy database, and wherein deriving the set of media content comprises deriving a set of media content having routing guidance media that directs each group of audience members to an exhibit as a function of the set of occupancy metrics.

14. The method for generating targeted media content of claim 13, wherein deriving the first set of attributes comprises deriving a time restriction attribute, and wherein deriving the set of media content comprises deriving a set of media content having routing guidance media that directs each group of audience members to an exhibit to as a function of the set of occupancy metrics and the time restriction attribute.

15. An apparatus for providing media content for an exhibit to a media content playback device associated with the exhibit, the apparatus comprising:

a processor; and
a memory readable by the processor that stores instructions that, when read by the processor, directs the processor to:
capture a first set of images using a first image capture device;
identify a first set of visual identifiers within the first set of images;
derive a first set of group identifiers as a function of the first set of visual identifiers using a group database;
derive a first set of attributes as a function of the first set of group identifiers;
count a number of portions in the first set of group identifiers to identify a number of audience members in each of one or more groups of audience members;
derive a set of media content as a function of the identified number of audience members in each group and as a function of the derived set of attributes using a media database; and
play at least a portion of the set of media content on the media content playback device.

16. The apparatus of claim 15, wherein the derived set of attributes comprises a time restriction attribute, and wherein the set of media content is selected as a function of the time restriction attribute.

17. The apparatus of claim 16, wherein the instructions, when read by the processor, further direct the processor to generate the set of media content to have routing guidance media that directs each group of audience members to a destination to satisfy the time restriction attribute.

18. The apparatus of claim 15, wherein the derived set of attributes comprises a time restriction attribute, and wherein the instructions, when read by the processor, further direct the processor to modify the derived set of attributes as a function of the time restriction attribute.

19. The apparatus of claim 18, wherein the derived set of attributes comprises a time restriction attribute, and wherein the instructions, when read by the processor, further direct the processor to generate the set of media content as a function of the modified derived set of attributes for each group identifier.

20. The apparatus of claim 15, wherein deriving the first set of attributes comprises deriving a time restriction attribute, and wherein the instructions, when read by the processor, further direct the processor to derive a set of occupancy metrics for a set of exhibits from an occupancy database, and further direct the processor to derive the set of media content to have routing guidance media that direct each group of audience members to an exhibit as a function of the set of occupancy metrics and the time restriction attribute.

* * * * *